United States Patent
Takahashi et al.

(10) Patent No.: US 12,392,720 B2
(45) Date of Patent: Aug. 19, 2025

(54) TIME RESPONSE MEASUREMENT APPARATUS AND TIME RESPONSE MEASUREMENT METHOD

(71) Applicant: HAMAMATSU PHOTONICS K.K., Hamamatsu (JP)

(72) Inventors: Hisanari Takahashi, Hamamatsu (JP); Koyo Watanabe, Hamamatsu (JP); Hiroshi Satozono, Hamamatsu (JP); Kyohei Shigematsu, Hamamatsu (JP); Takashi Inoue, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 61 days.

(21) Appl. No.: 18/120,533

(22) Filed: Mar. 13, 2023

(65) Prior Publication Data
US 2023/0304926 A1 Sep. 28, 2023

(30) Foreign Application Priority Data
Mar. 23, 2022 (JP) ................................ 2022-046446

(51) Int. Cl.
*G01N 21/17* (2006.01)
*G01N 21/27* (2006.01)
(Continued)

(52) U.S. Cl.
CPC ............. *G01N 21/39* (2013.01); *G01N 21/27* (2013.01); *G01N 21/314* (2013.01); *G01N 2021/1789* (2013.01); *G01N 2021/3166* (2013.01)

(58) Field of Classification Search
CPC ...... G01N 21/39; G01N 21/27; G01N 21/314; G01N 2021/1789; G01N 2021/3166; G01N 2201/0697; G01N 21/636
(Continued)

(56) References Cited

U.S. PATENT DOCUMENTS 5,682,262 A * 10/1997 Wefers .................... H01S 3/005
 349/1
2005/0270616 A1* 12/2005 Weiner ................ G02F 1/13471
 359/246
(Continued)

FOREIGN PATENT DOCUMENTS

CN 1808103 A 7/2006
JP 2006-516730 A 7/2006
(Continued)

OTHER PUBLICATIONS

Dawlaty, Jahan M. et al., "Measurement of ultrafast carrier dynamics in epitaxial graphene," Applied Physics Letters, 92, 042116(2008).
(Continued)

*Primary Examiner* — Isiaka O Akanbi
(74) *Attorney, Agent, or Firm* — Faegre Drinker Biddle & Reath LLP

(57) ABSTRACT

A time response measurement apparatus includes a pulse formation unit, an attenuation unit, a waveform measurement unit, and an analysis unit. The pulse formation unit generates first pulsed light including a wavelength of pump light, second pulsed light including a wavelength of probe light, and third pulsed light including the wavelength of the pump light and the wavelength of the probe light, on a common optical axis. The attenuation unit transmits the first pulsed light, the second pulsed light, and the third pulsed light output from a sample arranged on the optical axis after being incident on the sample. An attenuation rate for the pump light is larger than an attenuation rate for the probe light. The analysis unit obtains a time response of the sample based on temporal waveforms of the first pulsed light, the second pulsed light, and the third pulsed light having passed through the attenuation unit.

14 Claims, 36 Drawing Sheets

(51) Int. Cl.
*G01N 21/31* (2006.01)
*G01N 21/39* (2006.01)

(58) Field of Classification Search
USPC .............................. 356/326, 303, 450, 484
See application file for complete search history.

(56) References Cited

U.S. PATENT DOCUMENTS

| | | | |
|---|---|---|---|
| 2006/0027021 A1* | 2/2006 | Choi ..................... | G01N 29/11 |
| | | | 73/579 |
| 2008/0309931 A1 | 12/2008 | Silberberg et al. | |
| 2011/0026105 A1* | 2/2011 | Bayramian ........... | H01S 3/0057 |
| | | | 700/117 |
| 2011/0211600 A1* | 9/2011 | Dantus ................. | H01S 3/0057 |
| | | | 372/25 |
| 2021/0218215 A1 | 7/2021 | Misawa et al. | |
| 2022/0107221 A1* | 4/2022 | Watanabe ............ | G01J 3/2823 |
| 2022/0178752 A1* | 6/2022 | Watanabe ............ | H01S 3/0057 |

FOREIGN PATENT DOCUMENTS

| | | | | |
|---|---|---|---|---|
| JP | 2017-181259 A | 10/2017 | | |
| JP | 2018-036484 A | 3/2018 | | |
| JP | 2020169946 A | * 10/2020 | ............. | G01J 11/00 |
| WO | 2004/068126 A1 | 8/2004 | | |
| WO | 2017/169788 A1 | 10/2017 | | |

OTHER PUBLICATIONS

Kobayashi, Masataka et al., "Fast-frame single-shot pump-probe spectroscopy with chirped-fiber Bragg gratings," Optics Letters, vol. 44, Issue 1, pp. 163-166 (2019).

Kobayashi Masataka et al., "Fast-frame single-shot pump-probe spectroscopy with chirped-fiber Bragg gratings", Optics Letters us ISSN:0146-9592, DOI:10.1364/0L.44.000163, Dec. 21, 2018, vol. 44, No. 1, p. 163-p. 166, XP093056295.

* cited by examiner

TIME RESPONSE MEASUREMENT APPARATUS AND TIME RESPONSE MEASUREMENT METHOD

CROSS-REFERENCE TO RELATED APPLICATION

Priority is claimed on Japanese Patent Application No. 2022-046446, filed Mar. 23, 2022, the content of which is incorporated herein by reference.

TECHNICAL FIELD

The present disclosure relates to a time response measurement apparatus and a time response measurement method.

BACKGROUND

Patent Document 1 (Japanese Unexamined Patent Publication No. 2020-169946) discloses a technology relating to a dispersion measurement apparatus. This dispersion measurement apparatus includes a pulse formation unit, a correlation optical system, a light detection unit, and a computation unit. The pulse formation unit forms a light pulse train including a plurality of second light pulses having a time difference therebetween and having center wavelengths different from each other from a first light pulse output from a sample. The correlation optical system receives the light pulse train output from the pulse formation unit and outputs correlation light including a cross-correlation or an auto-correlation of the light pulse train. The light detection unit detects a temporal waveform of the correlation light. The computation unit estimates a wavelength dispersion amount of the sample based on a feature value of the temporal waveform.

Non-Patent Document 1 (Jahan M. Dawlaty et al., "Measurement of ultrafast carrier dynamics in epitaxial graphene", Applied Physics Letters, 92, 042116 (2008)) discloses time-resolved spectroscopic measurement. In the method described in that document, a time response of a sample is evaluated by changing a time difference between pump light for exciting the sample and probe light for detecting change in characteristics of the sample. Non-Patent Document 2 (Masataka Kobayashi et al., "Fast-frame single-shot pump-probe spectroscopy with chirped-fiber Bragg gratings", Optics Letters, Volume 44, Issue 1, pp. 163-166 (2019)) discloses a time-resolved measurement method using a plurality of light pulses having center wavelengths different from each other. In the method described in that document, a plurality of light pulses having wavelengths different from each other are generated by performing wavelength conversion using an optical parametric amplifier (OPA).

SUMMARY

There is known a method (time-resolved spectroscopic measurement method) in which pump light and probe light having wavelengths different from each other are incident on a sample, and property change inside the sample caused by irradiation of the pump light is evaluated based on change over time in the probe light output from the sample. FIG. 36 is a simplified diagram of an apparatus 100 used for a time-resolved spectroscopic measurement method in the related art. Probe light Lprobe output from a light source 101 passes through a sample 102 and is incident on a photodetector 103. Pump light Lpump output from the light source 101 passes through the sample 102 after a time difference between the pump light Lpump and the probe light Lprobe is adjusted by a delay optical system 104. An optical axis of the pump light Lpump when passing through the sample 102 is inclined with respect to an optical axis of the probe light Lprobe. As a result, the photodetector 103 can detect only the probe light Lprobe without detecting the pump light Lpump. Further, temporal change in light intensity of the probe light Lprobe incident on the photodetector 103 is observed, while changing the time difference between the pump light Lpump and the probe light Lprobe applied by the delay optical system 104. In this way, it is possible to evaluate property change inside the sample 102 caused by incidence of the pump light Lpump based on temporal change in the probe light Lprobe output from the sample 102.

In the apparatus 100 illustrated in FIG. 36, as described above, the optical axis of the pump light Lpump when passing through the sample 102 is inclined with respect to the optical axis of the probe light Lprobe. In that case, in order for an irradiation position of the pump light Lpump is aligned with an emission position of the probe light Lprobe inside the sample 102, it is necessary to adjust the irradiation positions thereof on a micrometer order. Therefore, accuracy of spatial and temporal optical adjustment is required, and thus work becomes very complicated.

An object of embodiment of the present invention is to provide a time response measurement apparatus and a time response measurement method in which measurement work can be simplified.

An embodiment of the present invention is a time response measurement apparatus. The time response measurement apparatus according to the present disclosure is an apparatus for measuring a time response inside a sample caused by irradiation with light. The time response measurement apparatus includes a pulse formation unit, an attenuation unit, a waveform measurement unit, and an analysis unit. The pulse formation unit generates first pulsed light including a wavelength of pump light, second pulsed light including a wavelength of probe light, and third pulsed light including the wavelength of the pump light and the wavelength of the probe light, on a common optical axis. The attenuation unit transmits the first pulsed light, the second pulsed light, and the third pulsed light output from the sample arranged on the optical axis after being incident on the sample. An attenuation rate of the attenuation unit with respect to the pump light is larger than an attenuation rate of the attenuation unit with respect to the probe light. The waveform measurement unit measures a first temporal waveform that is a temporal waveform of the first pulsed light having passed through the attenuation unit, a second temporal waveform that is a temporal waveform of the second pulsed light having passed through the attenuation unit, and a third temporal waveform that is a temporal waveform of the third pulsed light having passed through the attenuation unit. The analysis unit obtains the time response of the sample based on the first temporal waveform, the second temporal waveform, and the third temporal waveform.

Another embodiment of the present invention is a time response measurement method. The time response measurement method according to the present disclosure is a method for measuring a time response inside a sample caused by irradiation with light. The time response measurement method includes: irradiating the sample with first pulsed light including a wavelength of pump light along a predetermined optical axis, and measuring a first temporal waveform that is a temporal waveform of the first pulsed light output from the sample and having passed through an attenuation unit attenuating a light intensity in a wavelength of the pump light; irradiating the sample with second pulsed light including a wavelength of probe light along the predetermined optical axis, and measuring a second temporal waveform that is a temporal waveform of the second pulsed light output from the sample and having passed through the attenuation unit; irradiating the sample with third pulsed light including the wavelength of the pump light and the wavelength of the probe light along the predetermined optical axis, and measuring a third temporal waveform that is a temporal waveform of the third pulsed light output from the sample and having passed through the attenuation unit; and obtaining the time response of the sample based on the first temporal waveform, the second temporal waveform, and the third temporal waveform.

The present invention will be more fully understood from the detailed description given herein below and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIGS. 3A to 3C are explanatory diagrams of a temporal waveform and a spectral waveform of third pulsed light. FIG. 3A is a spectrogram in which the horizontal axis indicates time, the vertical axis indicates wavelength, and light intensity is indicated by contrast of color. FIG. 3B illustrates temporal waveforms of two component pulses included in the third pulsed light. FIG. 3C illustrates a composite spectral waveform of two component pulses, that is, a spectral waveform of the third pulsed light.

DETAILED DESCRIPTION

Figure 1:
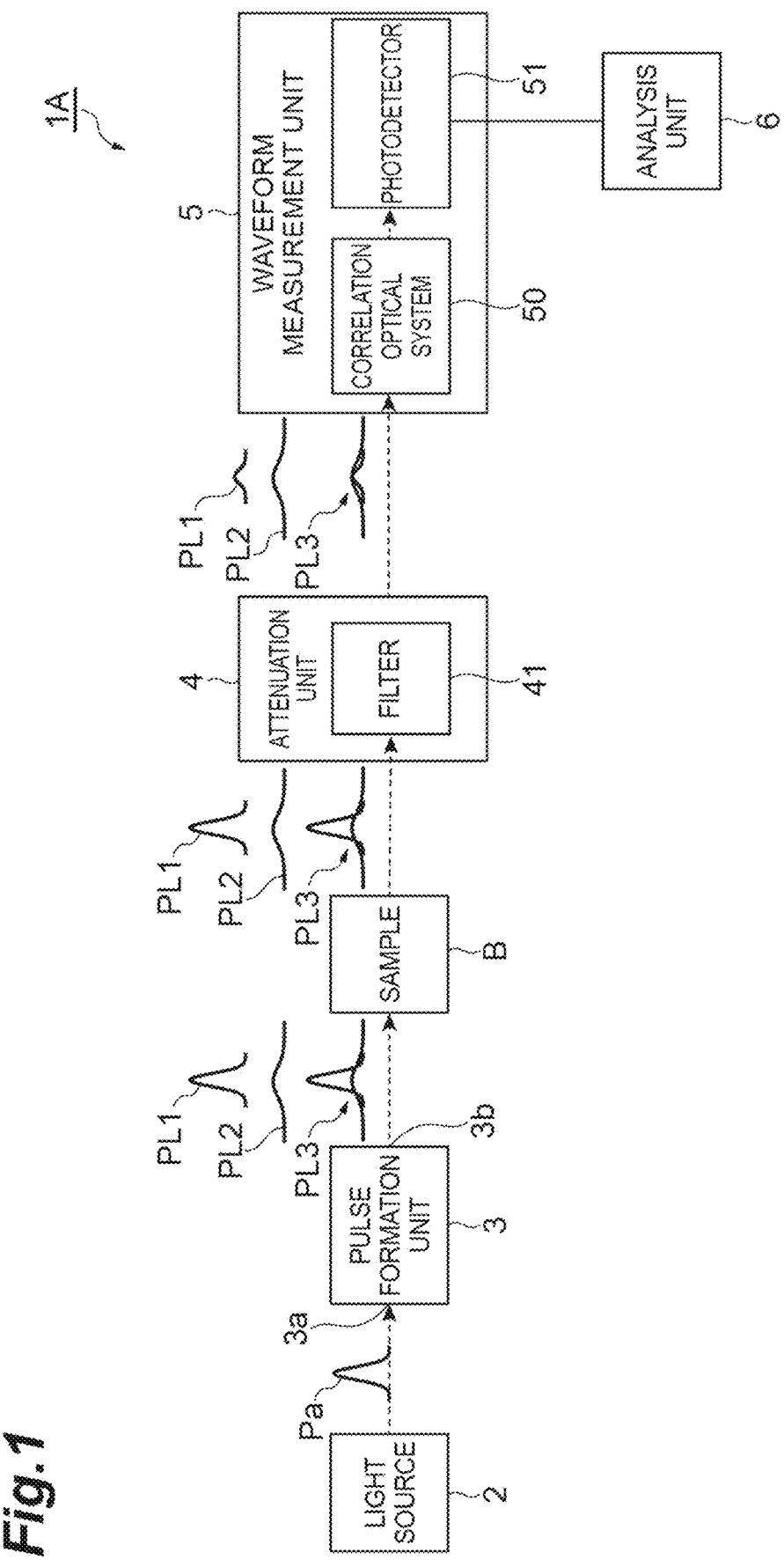
FIG. 1 is a diagram schematically illustrating a configuration of a time response measurement apparatus according to an embodiment of the present disclosure.

Specific examples of a time response measurement apparatus and a time response measurement method according to an embodiment of the present disclosure will be described in detail with reference to the drawings. The present invention is not limited to the embodiments to be described below. A technical scope of the present invention is determined on the basis of description of claims. In the description of the drawings, the same elements are denoted by the same reference numerals, and repeated description will be omitted. In the present disclosure, unless otherwise described, a temporal waveform denotes a temporal waveform relating to a light intensity.

FIG. 1 is a diagram schematically illustrating a configuration of a time response measurement apparatus 1A according to an embodiment of the present disclosure. The time response measurement apparatus 1A is an apparatus for measuring a time response inside a sample B caused by irradiation with light. The time response measurement apparatus 1A includes a pulsed laser light source 2, a pulse formation unit 3, an attenuation unit 4, a waveform measurement unit 5, and an analysis unit 6. The pulse formation unit 3 has a light input end 3a and a light output end 3b. The light input end 3a is optically coupled to the pulsed laser light source 2 spatially or via an optical waveguide such as an optical fiber. The light output end 3b is optically coupled to the sample B spatially or via an optical waveguide such as an optical fiber. Moreover, the sample B is optically coupled to the waveform measurement unit 5 spatially or via an optical waveguide such as an optical fiber. The attenuation unit 4 is arranged on an optical path between the sample B and the waveform measurement unit 5. The analysis unit 6 is electrically connected to the waveform measurement unit 5.

The pulsed laser light source 2 outputs coherent pulsed light Pa. For example, the pulsed laser light source 2 is a femtosecond laser, and in one example, it is a solid laser light source such as an LD direct pumped type Yb:YAG pulse laser. For example, a temporal waveform of the pulsed light Pa has a shape of a Gaussian function. For example, the full width at half maximum (FWHM) of the pulsed light Pa is within a range of 10 fs to 10,000 fs and is 100 fs as an example. The pulsed light Pa is a light pulse having a certain bandwidth and includes a plurality of consecutive wavelength components. In one example, a bandwidth of the pulsed light Pa is 10 nm, and a center wavelength of the pulsed light Pa is 1,030 nm.

The pulse formation unit 3 generates first pulsed light PL1, second pulsed light PL2, and third pulsed light PL3 from the pulsed light Pa, on a common optical axis leading to the sample B. The pulse formation unit 3 can individually output the first pulsed light PL1, the second pulsed light PL2, and the third pulsed light PL3 at arbitrary timings with time intervals therebetween. The output order of the first pulsed light PL1, the second pulsed light PL2, and the third pulsed light PL3 is also arbitrary. In an example, the third pulsed light PL3 is output after the first pulsed light PL1 and the second pulsed light PL2 are output.

Figure 2A:
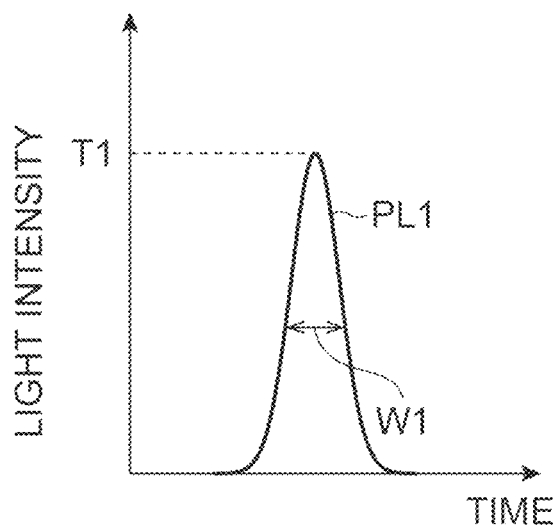
FIG. 2A schematically illustrates a temporal waveform of first pulsed light.

FIG. 2A schematically illustrates a temporal waveform of the first pulsed light PL1. A wavelength band of the first pulsed light PL1 includes a wavelength of the pump light. The wavelength of the pump light is included in a plurality of wavelength components constituting the pulsed light Pa. For example, the wavelength of the pump light is within a range of 770 nm to 820 nm. The first pulsed light PL1 may be constituted of only light having a wavelength of the pump light. For example, the temporal waveform of the first pulsed light PL1 has a shape of a Gaussian function.

Figure 2B:
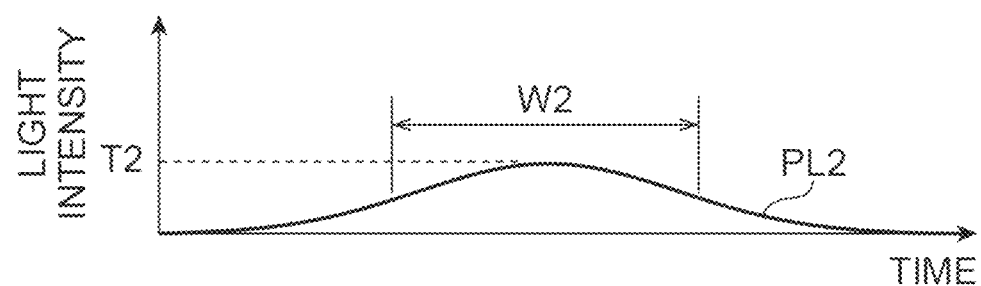
FIG. 2B schematically illustrates a temporal waveform of second pulsed light.

FIG. 2B schematically illustrates a temporal waveform of the second pulsed light PL2. A wavelength band of the second pulsed light PL2 includes a wavelength of the probe light. In the plurality of wavelength components included in the pulsed light Pa, the wavelength of the probe light is included in the wavelength component longer than the wavelength of the pump light. The wavelength of the probe light is included in the wavelength component on the long-wavelength side in the plurality of wavelength components included in the pulsed light Pa. The wavelength of the probe light is, for example, within a range of 820 nm to 840 nm. The second pulsed light PL2 may be constituted of only light having a wavelength of the probe light. A part of the wavelength band of the second pulsed light PL2 may be superimposed on a part of the wavelength band of the first pulsed light PL1. For example, the temporal waveform of the second pulsed light PL2 has a shape of a Gaussian function. A peak intensity T2 of the second pulsed light PL2 is lower than a peak intensity T1 of the first pulsed light PL1. For example, the peak intensity T2 of the second pulsed light PL2 is equal to or lower than one tenth of the peak intensity T1 of the first pulsed light PL1. A pulse width W2 that is a full width at half maximum of the second pulsed light PL2 is larger than a pulse width W1 that is a full width at half maximum of the first pulsed light PL1. For example, the pulse width W2 of the second pulsed light PL2 is one time to 100 times the pulse width W1 of the first pulsed light PL1.

Figures 3B, 3C:
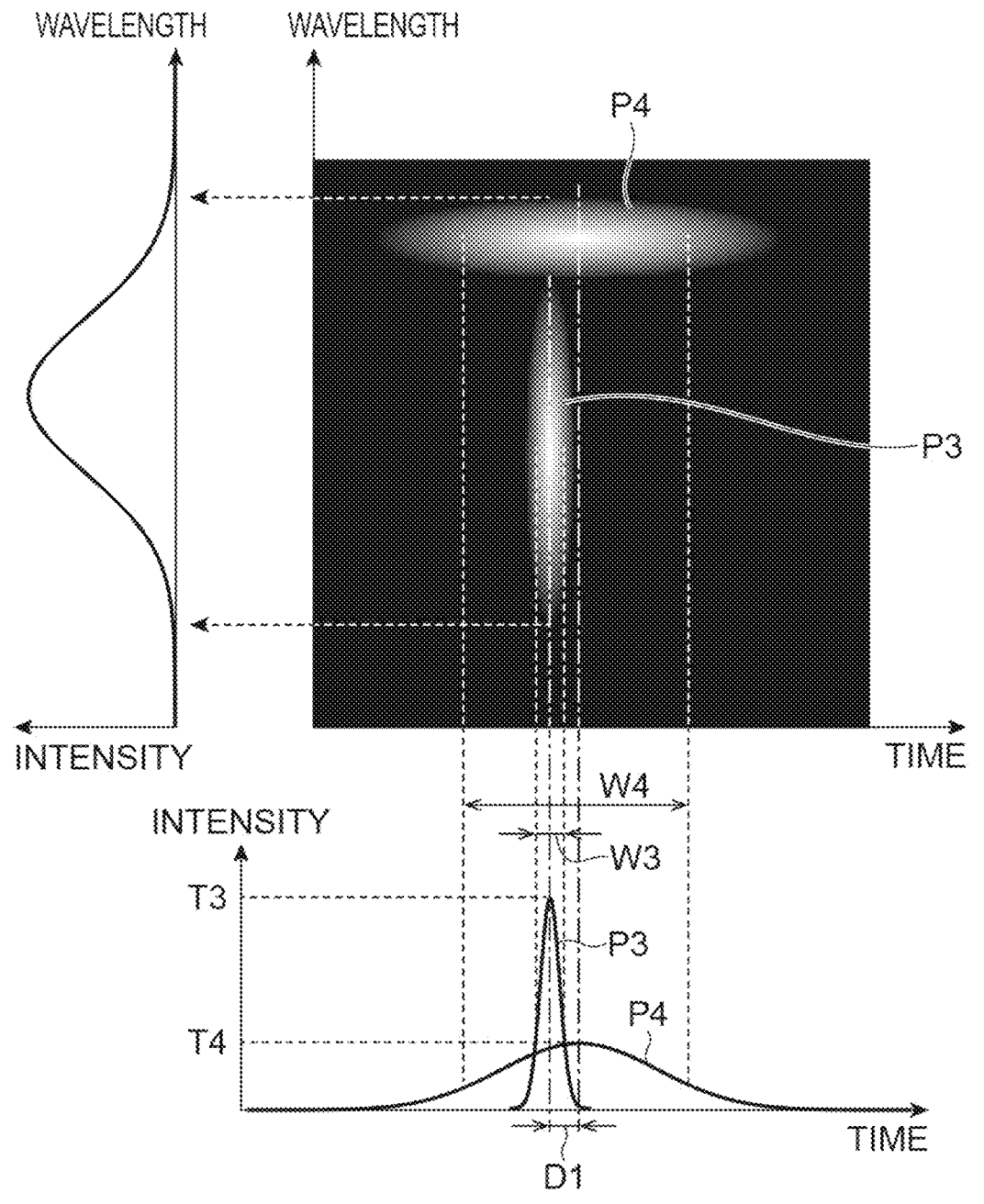

FIGS. 3A to 3C are explanatory diagrams of a temporal waveform and a spectral waveform of the third pulsed light PL3. FIG. 3A is a spectrogram showing the time on the horizontal axis, the wavelength on the vertical axis, and the light intensity is represented by contrast of color. FIG. 3B shows temporal waveforms of a component pulse P3 and a component pulse P4 included in the third pulsed light PL3. FIG. 3C shows a spectral waveform obtained by combining the component pulse P3 and the component pulse P4, that is, a spectral waveform of the third pulsed light PL3.

A spectrum of the third pulsed light PL3 includes both a wavelength of the pump light and a wavelength of the probe light. The wavelength component of the pump light included in the third pulsed light PL3 forms the component pulse P3. In an example, a peak intensity T3, a pulse width W3, and a wavelength component of the component pulse P3 are respectively the same as the peak intensity T1, the pulse width W1, and the wavelength component of the first pulsed light PL1. The wavelength component of the probe light included in the third pulsed light PL3 forms the component pulse P4. In an example, a peak intensity T4, a pulse width W4, and a wavelength component of the component pulse P4 are respectively the same as the peak intensity T2, the pulse width W2, and the wavelength component of the second pulsed light PL2. The pulse width W3 of a component of the wavelength of the pump light, that is the component pulse P3, included in the third pulsed light PL3 is smaller than the pulse width W4 of a component of the wavelength of the probe light, that is the component pulse P4, included in the third pulsed light PL3. The third pulsed light PL3 is obtained by superimposing the component pulse P4 on the component pulse P3. The third pulsed light PL3 may not include any other components except for the component pulse P3 and the component pulse P4.

As shown in FIG. 3C, a spectrum obtained by combining the component pulses P3 and P4 has a single peak. However, with reference to FIG. 3A, the center wavelengths of the component pulses P3 and P4 are different from each other. The single peak illustrated in FIG. 3C substantially corresponds to the spectrum of the pulsed light Pa. An interval between the peak wavelengths of the component pulses P3 and P4 is determined by the spectral bandwidth of the pulsed light Pa. In an example, the interval is within a range of substantially two times a full width at half maximum of the spectral bandwidth of the pulsed light Pa.

The pulse formation unit 3 makes it possible to change a time interval D1 between an intensity peak of the component of the wavelength of the pump light included in the third pulsed light PL3 (component pulse P3) and an intensity peak of the component of the wavelength of the probe light (component pulse P4). The time interval may be suitably changed in accordance with type or characteristics of the sample B. The time interval D1 may be zero. The pulse formation unit 3 makes it possible to change a ratio (W3/W4) of the pulse width W3 of the component of the wavelength of the pump light included in the third pulsed light PL3 (component pulse P3) to the pulse width W4 of the component of the wavelength of the probe light (component pulse P4). The ratio (W3/W4) may be suitably changed in accordance with type or characteristics of the sample B. In that case, a ratio (W1/W2) between the pulse width W1 of the first pulsed light PL1 and the pulse width W2 of the second pulsed light PL2 is also changed in accordance with the ratio (W3/W4).

Figure 4:
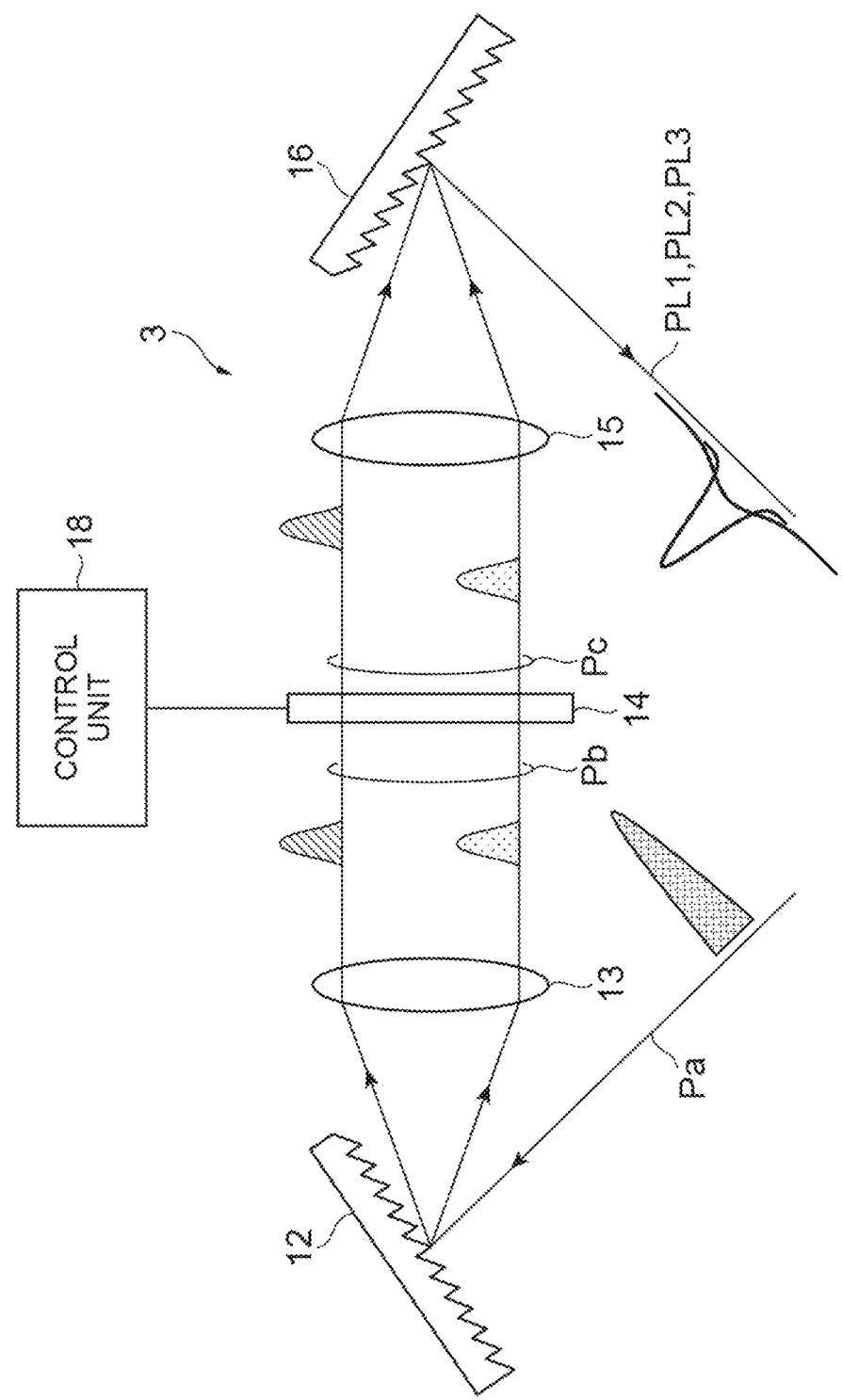
FIG. 4 is a diagram illustrating an example of a configuration of a pulse formation unit.

FIG. 4 is a diagram illustrating an example of a configuration of the pulse formation unit 3. The pulse formation unit 3 has a diffraction grating 12, a lens 13, a spatial light modulator (SLM) 14, a lens 15, and a diffraction grating 16. The diffraction grating 12 is a spectroscopic element and is optically coupled to the pulsed laser light source 2. The SLM 14 is optically coupled to the diffraction grating 12 via the lens 13. The diffraction grating 12 spatially separates a plurality of wavelength components included in the pulsed light Pa for each wavelength. Regarding a spectroscopic element, a different optical component such as a prism may also be used in place of the diffraction grating 12. The pulsed light Pa is obliquely incident on the diffraction grating 12 and is spectrally dispersed into a plurality of wavelength components. Light Pb including the plurality of wavelength components is focused by the lens 13 for each wavelength component and is image-formed on a modulation plane of the SLM 14. The lens 13 may be a convex lens constituted of a light transmitting member or a concave mirror having a concave-shaped light reflection surface.

The SLM 14 applies a phase shift for each wavelength to the pulsed light Pa in order to transform the pulsed light Pa into the first pulsed light PL1, the second pulsed light PL2, and the third pulsed light PL3. Specifically, in order to apply a phase shift to the pulsed light Pa and generate the first pulsed light PL1, the second pulsed light PL2, and the third pulsed light PL3, the SLM 14 receives a control signal from a control unit 18. The SLM 14 presents a phase pattern by receiving a control signal output from the control unit 18. For example, the control unit 18 may be constituted of a computer. The SLM 14 simultaneously performs phase modulation and intensity modulation of the light Pb using the presented phase pattern. In this manner, the SLM 14 mutually shifts the phases of a plurality of wavelength components output from the diffraction grating 12. For example, the SLM 14 is a phase modulation type. In one Example, the SLM 14 is a liquid crystal on silicon (LCOS) type. Although the diagram illustrates a transmission-type SLM 14, the SLM 14 may be a reflection type.

Figure 5:
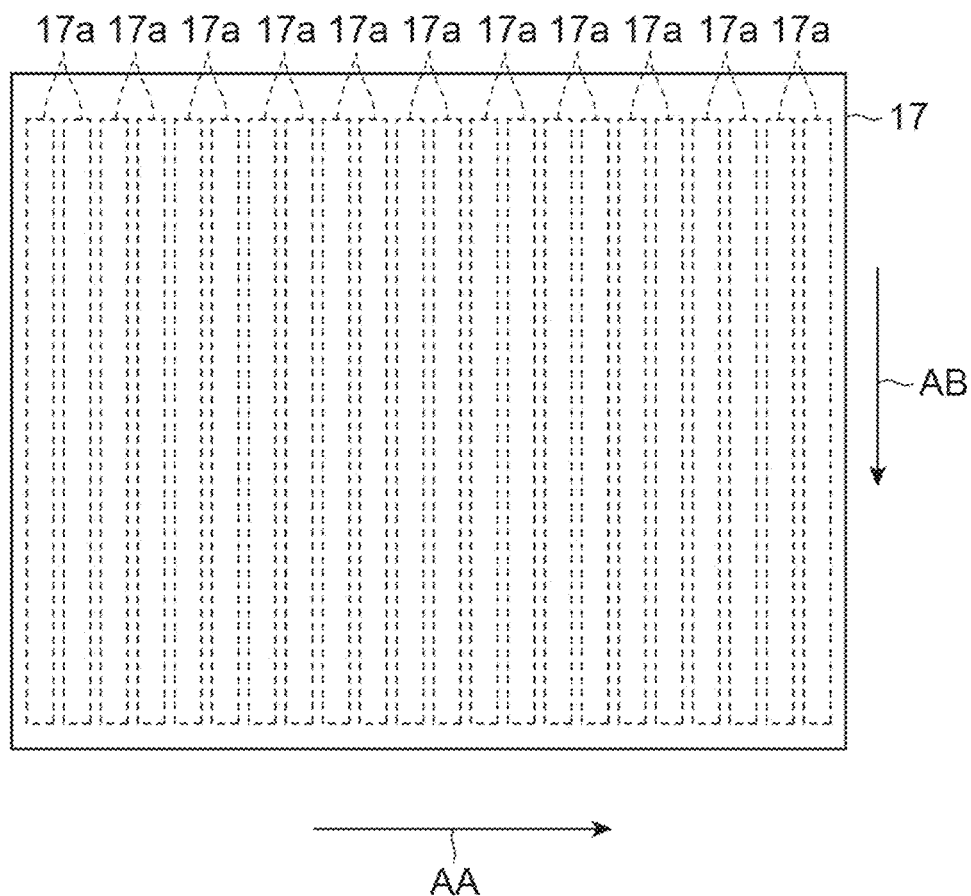
FIG. 5 is a diagram illustrating a modulation plane of a spatial light modulator.

FIG. 5 is a diagram illustrating a modulation plane 17 of the SLM 14. In the modulation plane 17, a plurality of modulation regions 17a are arranged along a certain direction AA, and each of the modulation regions 17a extends in a direction AB intersecting with the direction AA. The direction AA is a dispersing direction by the diffraction grating 12. The modulation plane 17 functions as a Fourier transform plane, and each of corresponding wavelength components after the dispersion is incident on each of the plurality of modulation regions 17a. The SLM 14 modulates a phase and an intensity of each of the incident wavelength components, independently from the other wavelength components, in each of the modulation regions 17a. When the SLM 14 is a phase modulation type, the intensity modulation is realized by a phase pattern (phase image) presented on the modulation plane 17.

The wavelength components of modulated light Pc modulated by the SLM 14 are focused by the lens 15 at one point on the diffraction grating 16. The lens 15 at that time functions as a focusing optical system for focusing the modulation light Pc. The lens 15 may be a convex lens constituted of a light transmitting member or a concave mirror having a concave-shaped light reflection surface. The diffraction grating 16 functions as a combining optical system, and combines the modulated wavelength components. That is, by the lens 15 and the diffraction grating 16, the plurality of wavelength components of the modulated light Pc are focused and combined to form the first pulsed light PL1, the second pulsed light PL2, and the third pulsed light PL3.

The control unit 18 stores a first phase pattern for generating the first pulsed light PL1, a second phase pattern for generating the second pulsed light PL2, and a third phase pattern for generating the third pulsed light PL3 in advance.

The control unit 18 selectively outputs the first phase pattern, the second phase pattern, and the third phase pattern to the SLM 14.

Figure 6:
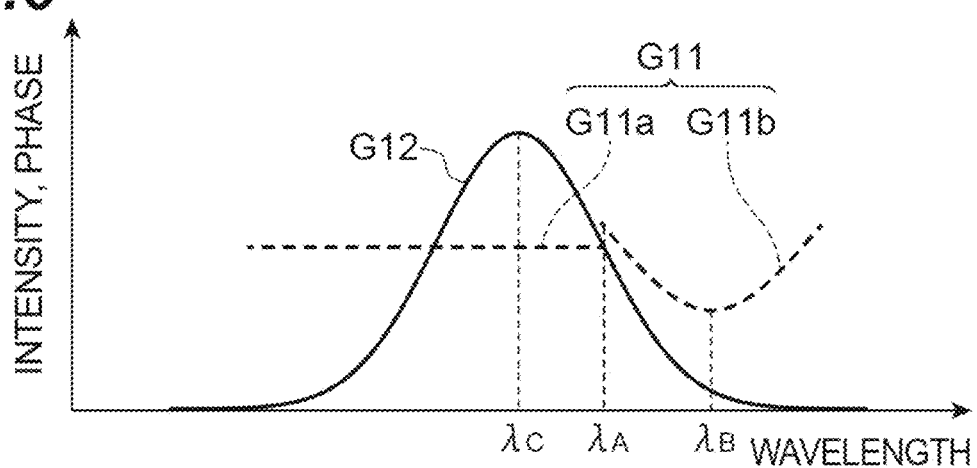
FIG. 6 schematically illustrates an example of a spectral waveform applied to initial pulsed light using a third phase pattern.

FIG. 6 schematically illustrates an example of a spectral waveform (a spectrum phase G11 and a spectrum intensity G12) applied to the pulsed light Pa using the third phase pattern. FIG. 6 shows the wavelength on the horizontal axis, each value of the spectrum intensity and the spectrum phase on the vertical axis. FIG. 6 is an example when the wavelength of the probe light is longer than the wavelength of the pump light. In the spectral waveform shown in FIG. 6, the wavelength property of the spectrum phase G11 include a part G11a which is constant in a band smaller than a certain wavelength $\lambda_A$, and a part G11b which has a curving shape projecting downward in a band larger than the wavelength $\lambda_A$. The part G11b is represented by the following Formula using a phase $\varphi(\lambda)$.

$$\varphi(\lambda)=\varphi_2(\omega(\lambda)-\omega_B)^2/2$$

The factor $\varphi_2$ is a constant. The factors $\omega(\lambda)$ and $\omega_B$ are angular frequencies, and $\omega(\lambda)=2\pi c/\lambda$, and $\omega_B=2\pi c/\lambda_B$ (the factor c is a velocity of light). The wavelength AB in which the part G11b has a local minimum value is larger than the wavelength $\lambda_A$. The wavelength $\lambda_A$ is larger than the peak wavelength $\lambda_C$ of the spectrum intensity. The part G11a forms the component pulse P3 that is a component of the wavelength of the pump light in the third pulsed light PL3, and the part G11b forms the component pulse P4 that is a component of the wavelength of the probe light in the third pulsed light PL3. In this manner, in the spectrum phase G11, a boundary between the part forming the component pulse P3 and the part forming the component pulse P4 is discontinuous.

The sample B is arranged on the optical axes of the first pulsed light PL1, the second pulsed light PL2, and the third pulsed light PL3, output from the pulse formation unit 3. The first pulsed light PL1, the second pulsed light PL2, and the third pulsed light PL3 which are output from the pulse formation unit 3 are incident on the sample B. The first pulsed light PL1, the second pulsed light PL2, and the third pulsed light PL3 which have been transmitted through the sample B are output from the sample B. Alternatively, the first pulsed light PL1, the second pulsed light PL2, and the third pulsed light PL3 which have been reflected or scattered in the sample B may be output from the sample B. The sample B is activated by the pump light, and the optical property thereof is changed. Therefore, compared to the temporal waveform of the probe light when the pump light is not incident at the same time, that is the temporal waveform of the second pulsed light PL2, the temporal waveform of the probe light when the pump light is incident at the same time, that is the temporal waveform of the component pulse P4 of the third pulsed light PL3, significantly changes immediately after incidence of the component pulse P3.

Figure 7A:
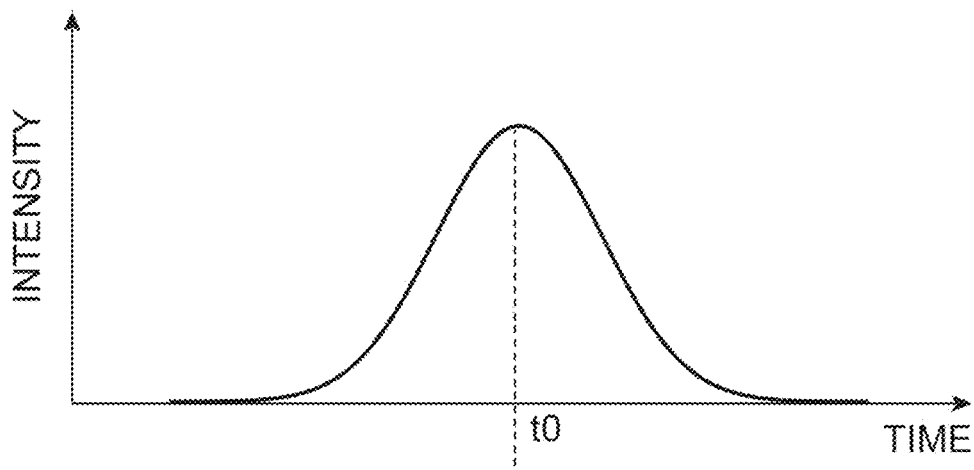
FIG. 7A is a graph schematically illustrating an example of a temporal waveform of probe light having passed through the sample when pump light is not incident on the sample.
Figure 7B:
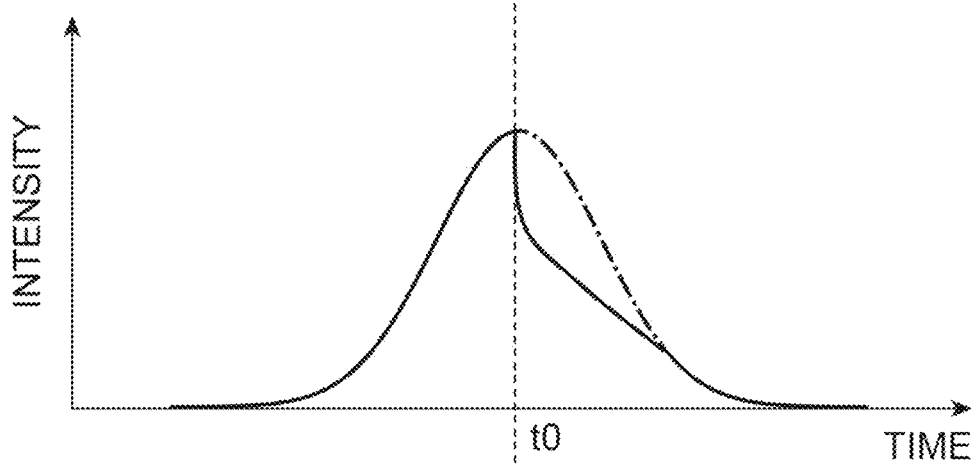
FIG. 7B is a graph schematically illustrating an example of a temporal waveform of the probe light having passed through the sample when the pump light is incident on the sample.
Figure 7C:
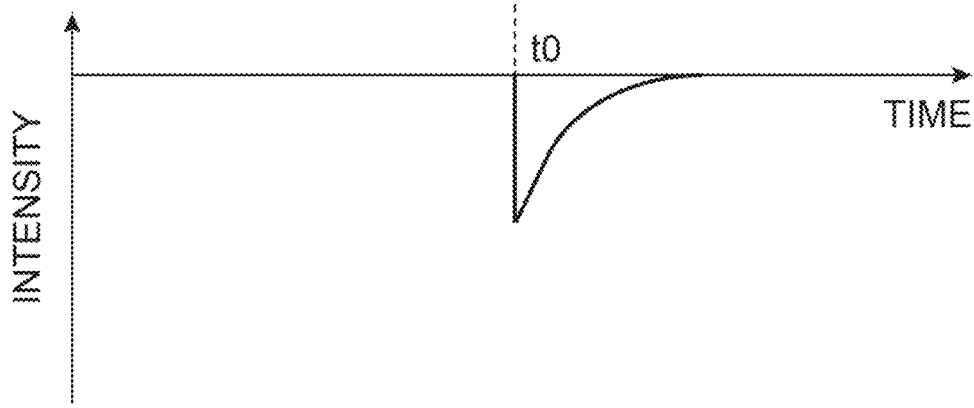
FIG. 7C is a graph obtained by subtracting the temporal waveform illustrated in FIG. 7A from the temporal waveform illustrated in FIG. 7B.

FIG. 7A is a graph schematically illustrating an example of the temporal waveform of the probe light having passed through the sample B when the pump light is not incident on the sample B. FIG. 7B is a graph schematically illustrating an example of the temporal waveform of the probe light having passed through the sample B when the pump light is incident on the sample B at a time to. In FIG. 7B, the graph illustrated in FIG. 7A is shown by a one-dot dashed line. In this example, as the optical property of the sample B changes at the time to when the pump light is incident, a light transmittance of the sample B at the wavelength of the probe light sharply drops. Thereafter, the light transmittance of the sample B returns to the original level over time. By the temporal waveform shown in FIG. 7A is subtracted from the temporal waveform shown in FIG. 7B, the time response of the sample B on the incidence of the pump light can be obtained as illustrated in FIG. 7C.

The attenuation unit 4 passes the first pulsed light PL1, the second pulsed light PL2, and the third pulsed light PL3 output from the sample B. At that time, the attenuation unit 4 passes the component of the wavelength of the probe light included in the second pulsed light PL2 and the third pulsed light PL3, typically, the second pulsed light PL2 and the component pulse P4 to be transmitted therethrough substantially without being attenuated. Further, the attenuation unit 4 attenuates the component of the wavelength of the pump light included in the first pulsed light PL1 and the third pulsed light PL3, typically, the first pulsed light PL1 and the component pulse P3. In other words, the attenuation rate in the attenuation unit 4 at the wavelength of the pump light is larger than the attenuation rate in the attenuation unit 4 at the wavelength of the probe light. In one example, the attenuation unit 4 includes a wavelength filter 41. The cutoff band of the wavelength filter 41 includes the wavelength of the pump light, and the transmission band of the wavelength filter 41 includes the wavelength of the probe light. The wavelength filter 41 may be any one of a band-pass filter, a high-pass filter and a low-pass filter. The transmittance of the wavelength filter 41 at the wavelength of the pump light is, for example, within a range of 0% to 50%. The transmittance of the wavelength filter 41 at the wavelength of the probe light is, for example, within a range of 50% to 99%.

Figure 8:
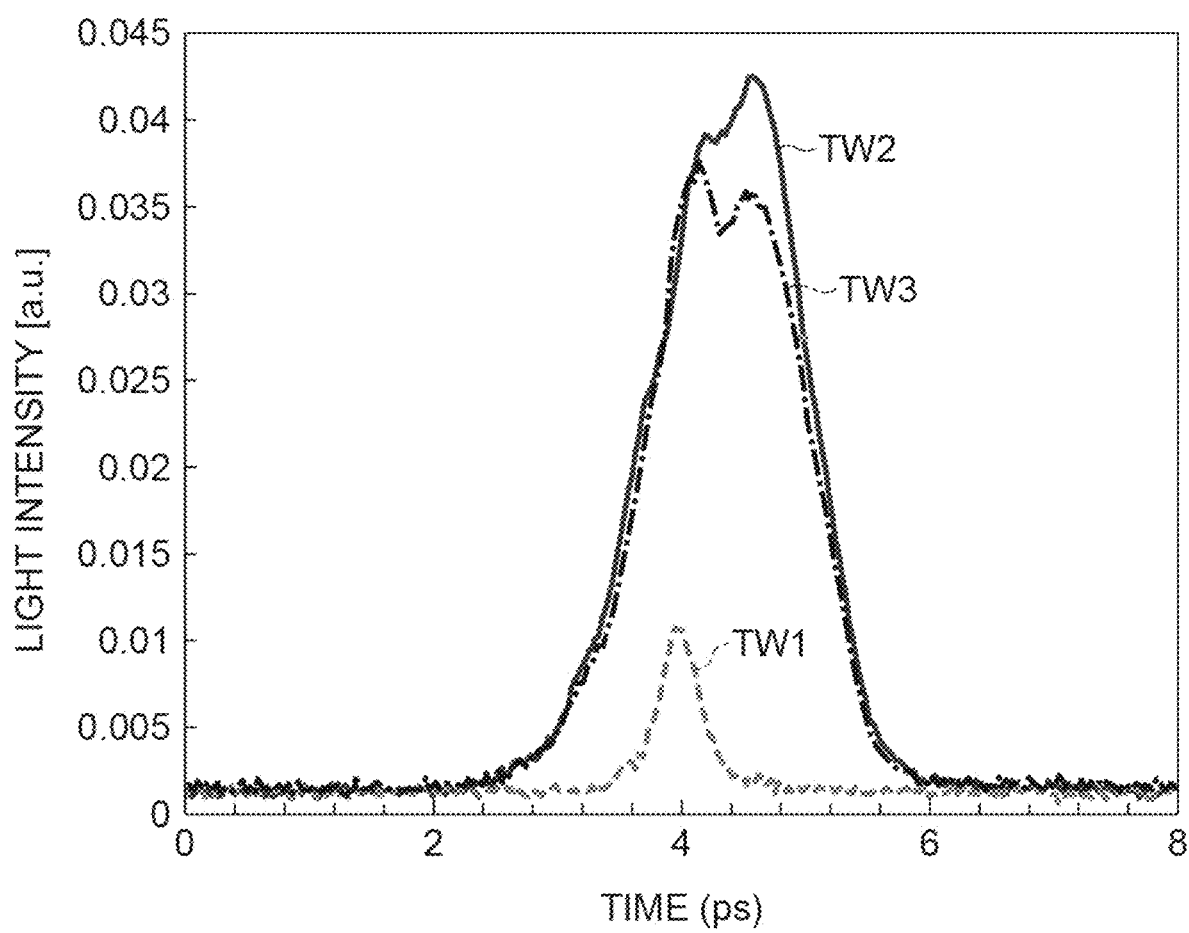
FIG. 8 is a graph illustrating an example of each of a first temporal waveform that is a temporal waveform of the first pulsed light having passed through the attenuation unit, a second temporal waveform that is a temporal waveform of the second pulsed light having passed through the attenuation unit, and a third temporal waveform that is a temporal waveform of the third pulsed light having passed through the attenuation unit, in a superimposed manner.

FIG. 8 is a graph illustrating examples of a first temporal waveform TW1 that is a temporal waveform of the first pulsed light PL1 having passed through the attenuation unit 4, a second temporal waveform TW2 that is a temporal waveform of the second pulsed light PL2 having passed through the attenuation unit 4, and a third temporal waveform TW3 that is a temporal waveform of the third pulsed light PL3 having passed through the attenuation unit 4, in a superimposed manner FIG. 8 shows the time (picosecond (ps)) on the horizontal axis, and the light intensity (arbitrary units) on the vertical axis. The first temporal waveform TW1 includes only the temporal waveform of the pump light attenuated by the attenuation unit 4. The third temporal waveform TW3 includes a waveform in which the temporal waveform of the pump light attenuated by the attenuation unit 4 and the temporal waveform of the probe light when the pump light is incident are superimposed. Therefore, by performing correction processing such as calculation of the difference between the third temporal waveform TW3 and the first temporal waveform TW1, it is possible to obtain the temporal waveform of the probe light when the pump light is incident, while eliminating an influence of the pump light. The second temporal waveform TW2 includes only the temporal waveform of the probe light when the pump light is not incident. Therefore, by comparison between the second temporal waveform TW2 and the difference between the third temporal waveform TW3 and the first temporal waveform TW1, it is possible to compare the temporal waveform of the probe light when the pump light is incident with the temporal waveform of the probe light when the pump light is not incident to obtain the time response inside the sample B. The time response inside the sample B is evaluated on the basis of the above principle by the analysis unit 6 which will be described below.

Figure 9:
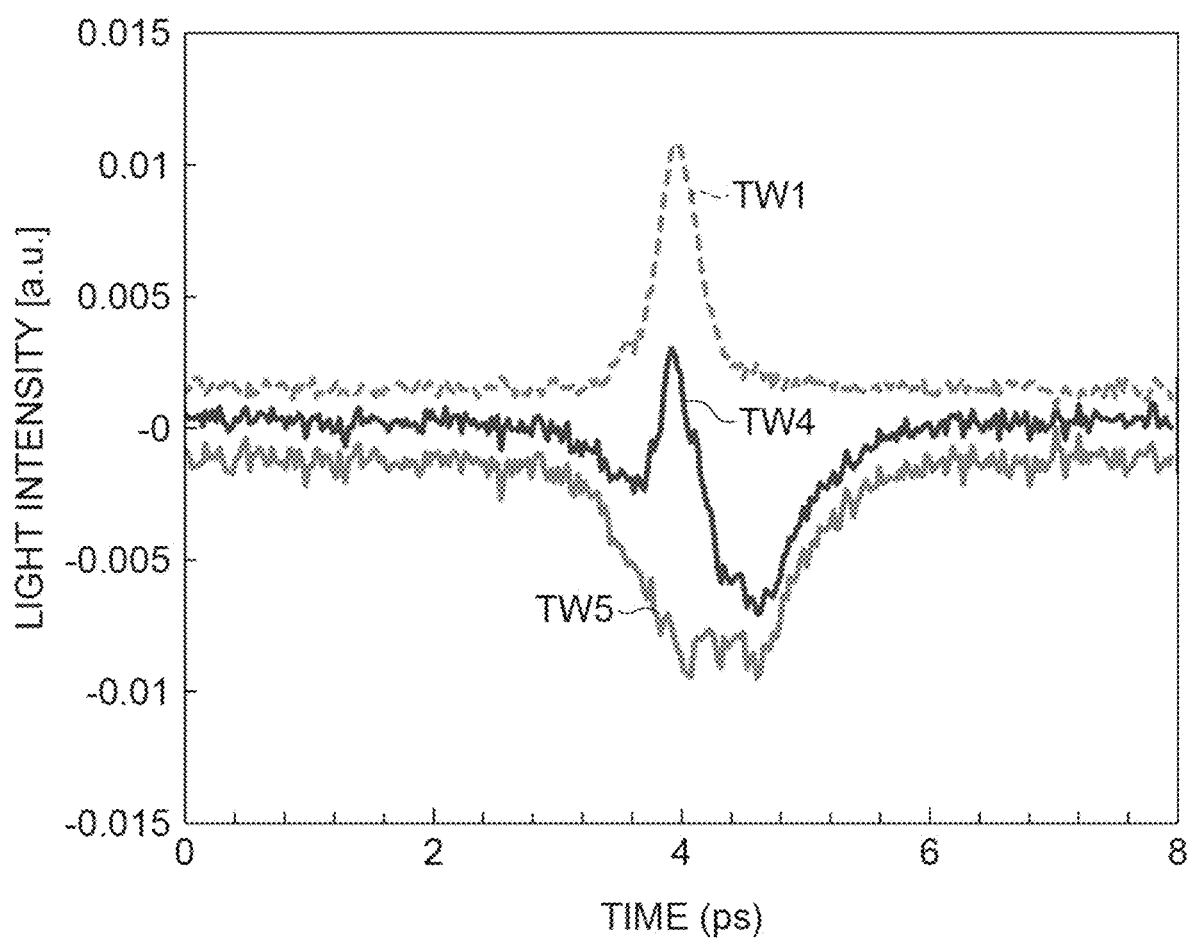
FIG. 9 is a graph illustrating the first temporal waveform, a temporal waveform obtained by subtracting the second temporal waveform from the third temporal waveform, and another temporal waveform obtained by subtracting the first temporal waveform from the temporal waveform.

For comparison between the second temporal waveform TW2 and the difference between the third temporal waveform TW3 and the first temporal waveform TW1, various methods such as evaluation of a difference therebetween, evaluation of ratios thereof, and the like can be used. The order of the above calculation based on the first temporal waveform TW1, the second temporal waveform TW2, and the third temporal waveform TW3 is arbitrary. FIG. 9 is a graph illustrating the first temporal waveform TW1, a temporal waveform TW4 that is a temporal waveform obtained by subtracting the second temporal waveform TW2 from the third temporal waveform TW3, and a temporal waveform TW5 that is a temporal waveform obtained by subtracting the first temporal waveform TW1 from the temporal waveform TW4. FIG. 9 shows the time (ps) on the horizontal axis, and the light intensity (arbitrary units) on the vertical axis. For example, as shown in FIG. 9, a first difference between the third temporal waveform TW3 and the second temporal waveform TW2 may be first calculated, and then a second difference between the first difference and the first temporal waveform TW1 may be calculated.

FIG. 1 will be referred to again. The waveform measurement unit 5 measures each of the temporal waveforms of the first pulsed light PL1, the second pulsed light PL2, and the third pulsed light PL3 having passed through the attenuation unit 4, that is, the first temporal waveform TW1, the second temporal waveform TW2, and the third temporal waveform TW3. The waveform measurement unit 5 of the present embodiment has a correlation optical system 50 and a photodetector 51.

The correlation optical system 50 is optically coupled to the attenuation unit 4 and receives the pulsed light PL having passed through the attenuation unit 4. The correlation optical system 50 transforms each of the first pulsed light PL1, the second pulsed light PL2, and the third pulsed light PL3 into correlation light including a cross-correlation or an auto-correlation. The first pulsed light PL1, the second pulsed light PL2, and the third pulsed light PL3 transformed into correlation light are output from the correlation optical system 50.

Figure 10:
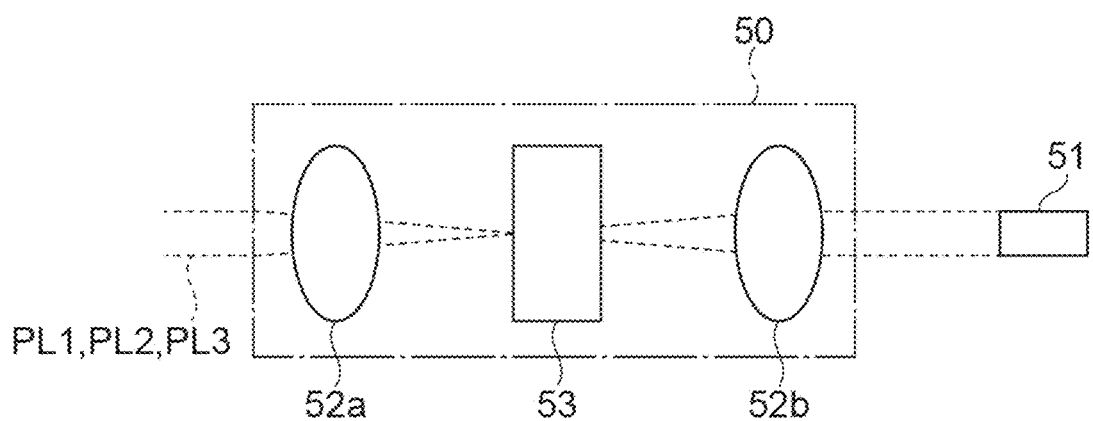
FIG. 10 is a diagram illustrating an example of a configuration of a correlation optical system.

FIG. 10 is a diagram illustrating an example of a configuration of the correlation optical system 50. The correlation optical system 50 may be constituted to include a lens 52a, an optical element 53, and a lens 52b. The lens 52a is provided on an optical path between the attenuation unit 4 and the optical element 53 and focuses the first pulsed light PL1, the second pulsed light PL2, and the third pulsed light PL3 having passed through the attenuation unit 4 on the optical element 53. For example, the optical element 53 is a luminous body including either one or both of a nonlinear optical crystal generating second-harmonic wave (SHG), and a fluorescent body. Examples of the nonlinear optical crystal include a KTP (KTiOPO$_4$) crystal, an LBO (LiB$_3$O$_5$) crystal, and a BBO (β-BaB$_2$O$_4$) crystal. Examples of the fluorescent body include coumarin, stilbene, and rhodamine. The optical element 53 inputs the first pulsed light PL1, the second pulsed light PL2, and the third pulsed light PL3 and transforms each of the first pulsed light PL1, the second pulsed light PL2, and the third pulsed light PL3 into correlation light including a cross-correlation or an auto-correlation. The lens 52b causes the first pulsed light PL1, the second pulsed light PL2, and the third pulsed light PL3, which have been transformed into correlation light and output from the optical element 53, to be collimated or focused. The first pulsed light PL1, the second pulsed light PL2, and the third pulsed light PL3 are transformed into correlation light in order to more accurately detect temporal waveforms of the first pulsed light PL1, the second pulsed light PL2, and the third pulsed light PL3.

Here, an example of a configuration of the correlation optical system 50 will be described in detail. In the following description, the first pulse light PL1, the second pulse light PL2, and the third pulse light PL3 are referred to as pulse light PL.

Figure 11:
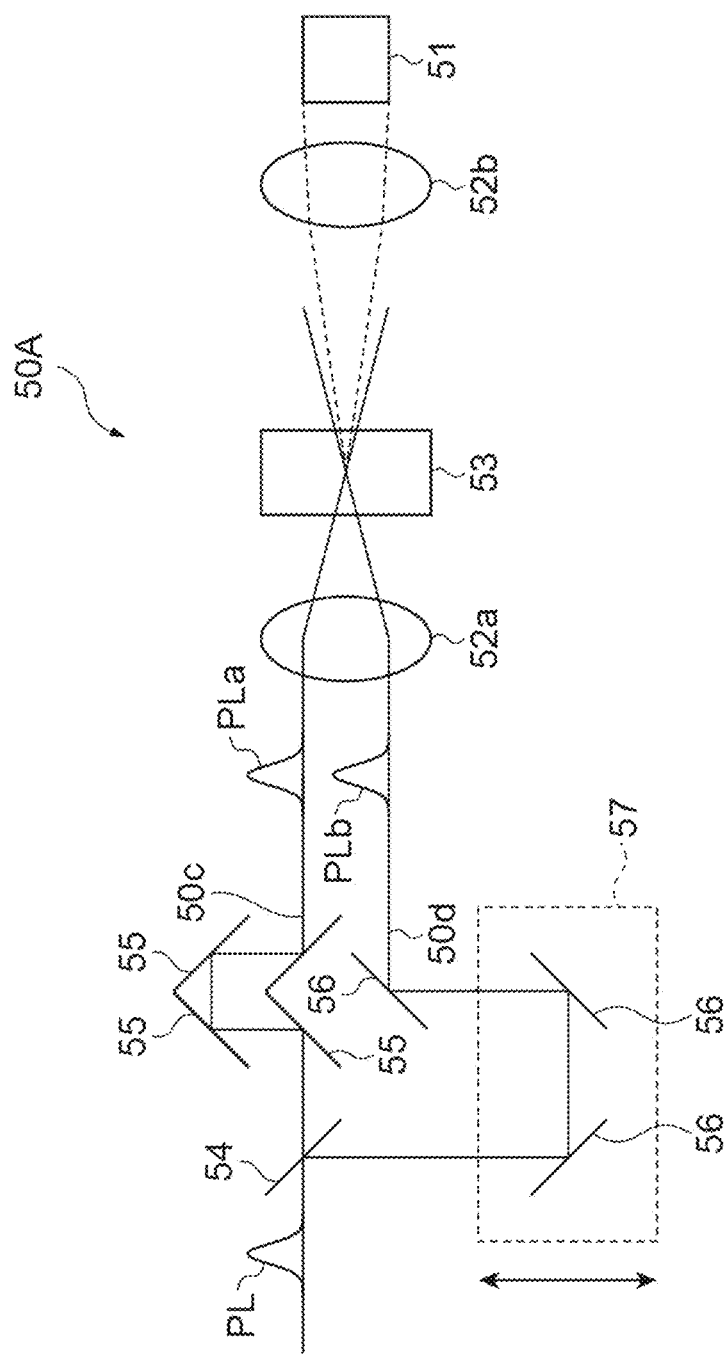
FIG. 11 is a diagram schematically illustrating a correlation optical system for transforming incident pulsed light into correlation light including an auto-correlation.

FIG. 11 is a diagram schematically illustrating a correlation optical system 50A, as an example of a configuration of the correlation optical system 50, for transforming the incident pulsed light PL into correlation light including an auto-correlation. The correlation optical system 50A has a beam splitter 54 as an optical branching component for branching the pulsed light PL into two beams. The beam splitter 54 is optically coupled to the attenuation unit 4, allows a part of the pulsed light PL which has been input from the attenuation unit 4 to be transmitted therethrough, and reflects the remaining part of the pulsed light PL. For example, a branching ratio of the beam splitter 54 is 1:1. Pulsed light PLa which is one pulsed light branched by the beam splitter 54 reaches the lens 52a through an optical path 50c including a plurality of mirrors 55. Pulsed light PLb which is the other pulsed light branched by the beam splitter 54 reaches the lens 52a through an optical path 50d including a plurality of mirrors 56. An optical length of the optical path 50c is different from an optical length of the optical path 50d. Therefore, the plurality of mirrors 55 and the plurality of mirrors 56 constitute a delay optical system for providing a time difference between the pulsed light PLa and the pulsed light PLb which have branched by the beam splitter 54. Moreover, at least some of the plurality of mirrors 56 are mounted on a movable stage 57, and the optical length of the optical path 50d is variable. Hence, in this configuration, a time difference between the pulsed light PLa and the pulsed light PLb can be made variable.

In this example, the optical element 53 includes a nonlinear optical crystal. The lens 52a focuses each of the pulsed light PLa and the pulsed light PLb toward the optical element 53 and causes optical axes of the pulsed light PLa and the pulsed light PLb to intersect with each other at a predetermined angle in the optical element 53. As a result, in the optical element 53 that is a nonlinear optical crystal, second-harmonic wave is generated from the intersection of the pulsed light PLa and the pulsed light PLb as a starting point. The second-harmonic wave is correlation light and includes the auto-correlation of the pulsed light PL. The correlation light is collimated or focused by the lens 52b and then input to the photodetector 51.

Figure 12:
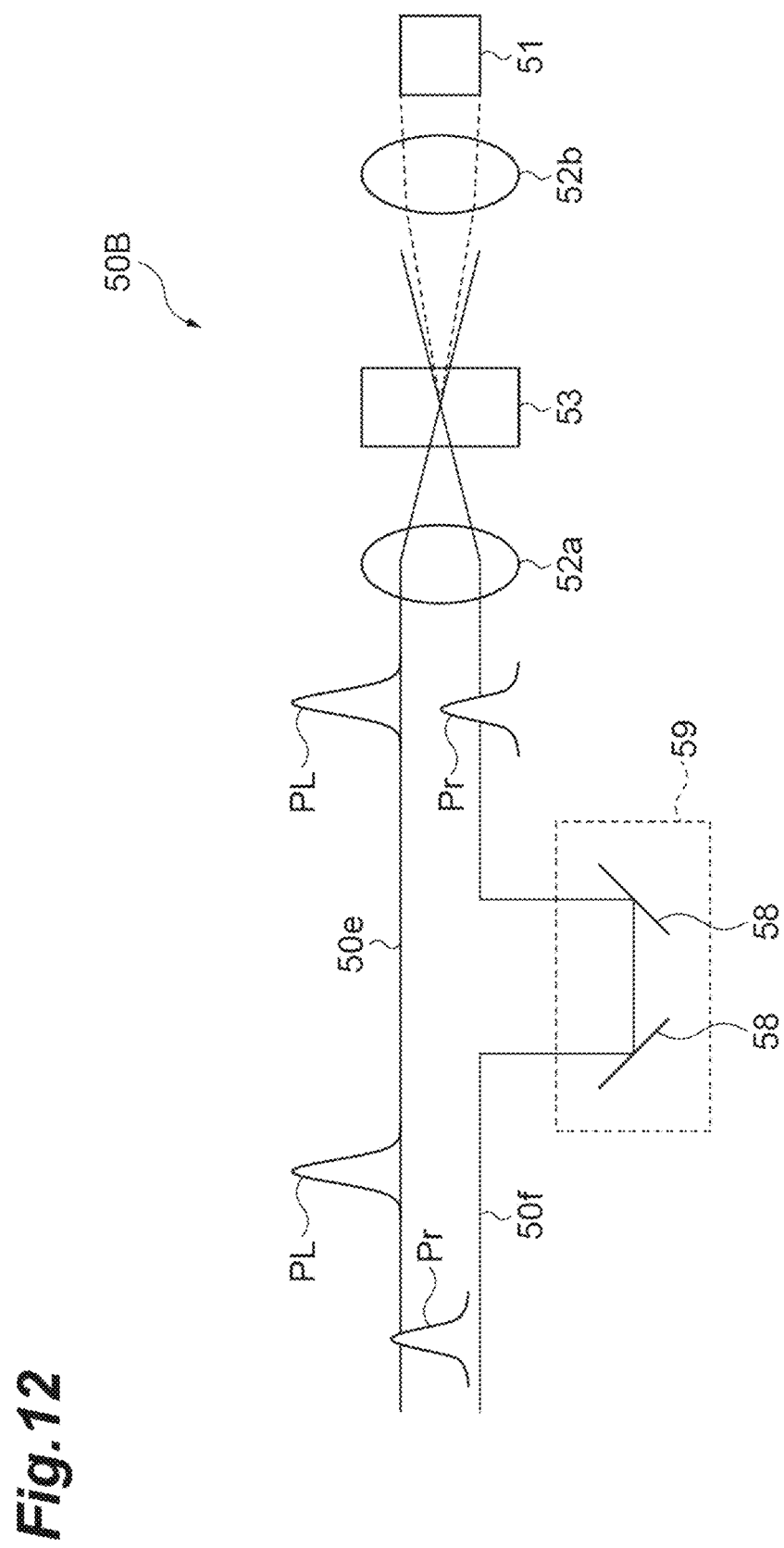
FIG. 12 is a diagram schematically illustrating a correlation optical system for transforming pulsed light into correlation light including a cross-correlation.

FIG. 12 is a diagram schematically illustrating a correlation optical system 50B, as an example of a configuration of a correlation optical system 50, for transforming pulsed light PL into correlation light including a cross-correlation. In the correlation optical system 50B, the pulsed light PL reaches a lens 52a through an optical path 50e, and reference pulsed light Pr reaches the lens 52a through an optical path 50f. The optical path 50f includes a plurality of mirrors 58 and is curved in a U-shape. Moreover, at least some of the plurality of mirrors 58 are mounted on a movable stage 59, and an optical length of the optical path 50f is variable. Hence, in this constitution, a time difference (a difference in timing of arrival at the lens 52a) between the pulsed light PL and the reference pulsed light Pr can be made variable.

In this example also, an optical element 53 includes a nonlinear optical crystal. The lens 52a focuses the pulsed light PL and the reference pulsed light Pr toward the optical element 53, and causes the optical axis of the pulsed light PL and the optical axis of the reference pulsed light Pr to intersect each other at a predetermined angle in the optical element 53. As a result, in the optical element 53 that is a nonlinear optical crystal, second-harmonic wave is generated from the intersection of the pulsed light PL and the reference pulsed light Pr as a starting point. The second-harmonic wave is correlation light and includes the cross-correlation of the pulsed light PL. The correlation light is collimated or focused by a lens 52b and then input to a photodetector 51.

Figure 13:
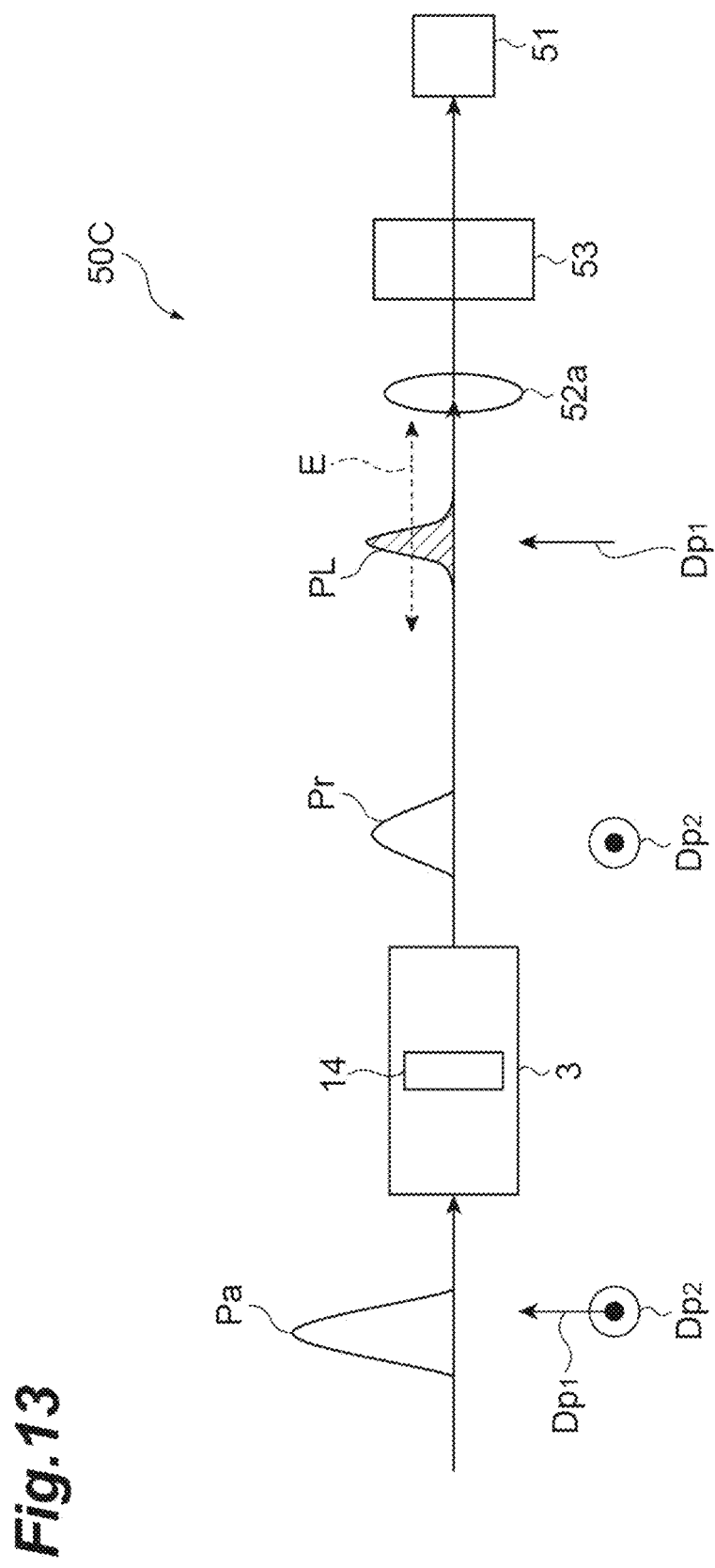
FIG. 13 is a diagram schematically illustrating a correlation optical system for transforming pulsed light into correlation light including a cross-correlation.

FIG. 13 is a diagram schematically illustrating a correlation optical system 50C, as still another example of a configuration of the correlation optical system 50, for transforming the pulsed light PL into correlation light including a cross-correlation. In this example, the SLM 14 of the pulse formation unit 3 is a polarization dependent type spatial light modulator having modulation function in a first polarization direction. In addition, a polarization plane of the pulsed light Pa input to the pulse formation unit 3 is inclined with respect to the polarization direction in which the SLM 14 has the modulation function, and the pulsed light Pa includes a polarization component (arrow $Dp_1$ in the drawing) in the first polarization direction and a polarization component (symbol $Dp_2$ in the drawing) in a second polarization direction orthogonal to the first polarization direction. The polarization of the pulsed light Pa is not limited to the foregoing polarization (inclined linear polarization) and may be elliptical polarization.

The polarization component of the first polarization direction in the pulsed light Pa is modulated by the SLM 14 and is output from the pulse formation unit 3 as the pulsed light PL. Meanwhile, the polarization component of the second polarization direction in the pulsed light Pa is not modulated by the SLM 14, and is output from the pulse formation unit 3 without change. The polarization component which has not been modulated is provided to the correlation optical system 50C coaxially with the pulsed light PL as the reference pulsed light Pr. The correlation optical system 50C generates correlation light including the cross-correlation of the pulsed light PL from the pulsed light PL and the reference pulsed light Pr. In this example of a configuration, the time difference (a difference in timing of arrival at the lens 52a) between the pulsed light PL and the reference pulsed light Pr can be made variable by providing a delay to the pulsed light PL by the SLM 14 and making the delay time variable (arrow E in the drawing), and the correlation light including the cross-correlation of the pulsed light PL can be generated in the correlation optical system 50C.

As illustrated in FIGS. 11 to 13, the correlation optical system 50 is an optical system in which the pulsed light PL is superimposed spatially and temporally on the pulsed light PL itself or different pulsed light. Specifically, a correlation waveform in proportion to the shape of the temporal waveform of the pulsed light PL is detected by temporally sweeping one of these pulsed light. Here, generally, since sweeping of the pulsed light is performed by spatially changing the optical path length using a driving stage or the like, a movement length of the stage corresponds to a time delay of the correlation waveform. At that time, the time delay is extremely smaller than the stage movement length. Therefore, since a pulse shape is observed with a high time-resolved scale reaching a femtosecond order in the photodetector 51 by employing the correlation optical system 50, the temporal waveform of the pulsed light PL, that is, each of the first temporal waveform TW1 of the first pulsed light PL1, the second temporal waveform TW2 of the second pulsed light PL2, and the third temporal waveform TW3 of the third pulsed light PL3, is more accurately detected.

FIG. 1 will be referred to again. The photodetector 51 receives the first pulsed light PL1, the second pulsed light PL2, and the third pulsed light PL3 that have been transformed into correlation light and output from the correlation optical system 50. The photodetector 51 detects the temporal waveform of the first pulsed light PL1, the second pulsed light PL2, and the third pulsed light PL3. For example, the photodetector 51 is constituted to include a photodetector such as a photodiode. The photodetector 51 detects each of the temporal waveforms of the first pulsed light PL1, the second pulsed light PL2, and the third pulsed light PL3 by transforming the intensity of each of the first pulsed light PL1, the second pulsed light PL2, and the third pulsed light PL3 into an electrical signal. The electrical signal which is a detection result is provided to the analysis unit 6.

The analysis unit 6 is electrically connected to the photodetector 51. The analysis unit 6 obtains time response of the sample B based on the temporal waveforms of the first pulsed light PL1, the second pulsed light PL2, and the third pulsed light PL3 transformed into correlation light. Each of the temporal waveforms of the first pulse light PL1, the second pulse light PL2, and the third pulse light PL3 that are transformed into the correlation light has a correlation with each of the first temporal waveform TW1 which is a temporal waveform of the first pulse light PL1 having passed through the sample B, the second temporal waveform TW2 which is a temporal waveform of the second pulse light PL2 having passed through the sample B, and the third temporal waveform TW3 which is a temporal waveform of the third pulse light PL3 having passed through the sample B. Therefore, the above-described principle of determining the time response of the sample B based on the first temporal waveform TW1, the second temporal waveform TW2, and the third temporal waveform TW3 can be applied as it is to the case where the first pulse light PL1, the second pulse light PL2, and the third pulse light PL3 are transformed into the correlation light. The analysis unit 6 may be constituted by a computer, for example. The analysis unit 6 may be constituted by a computer separate from the control section 18 (see FIG. 4), or by a computer common to the control section 18.

Figure 14:
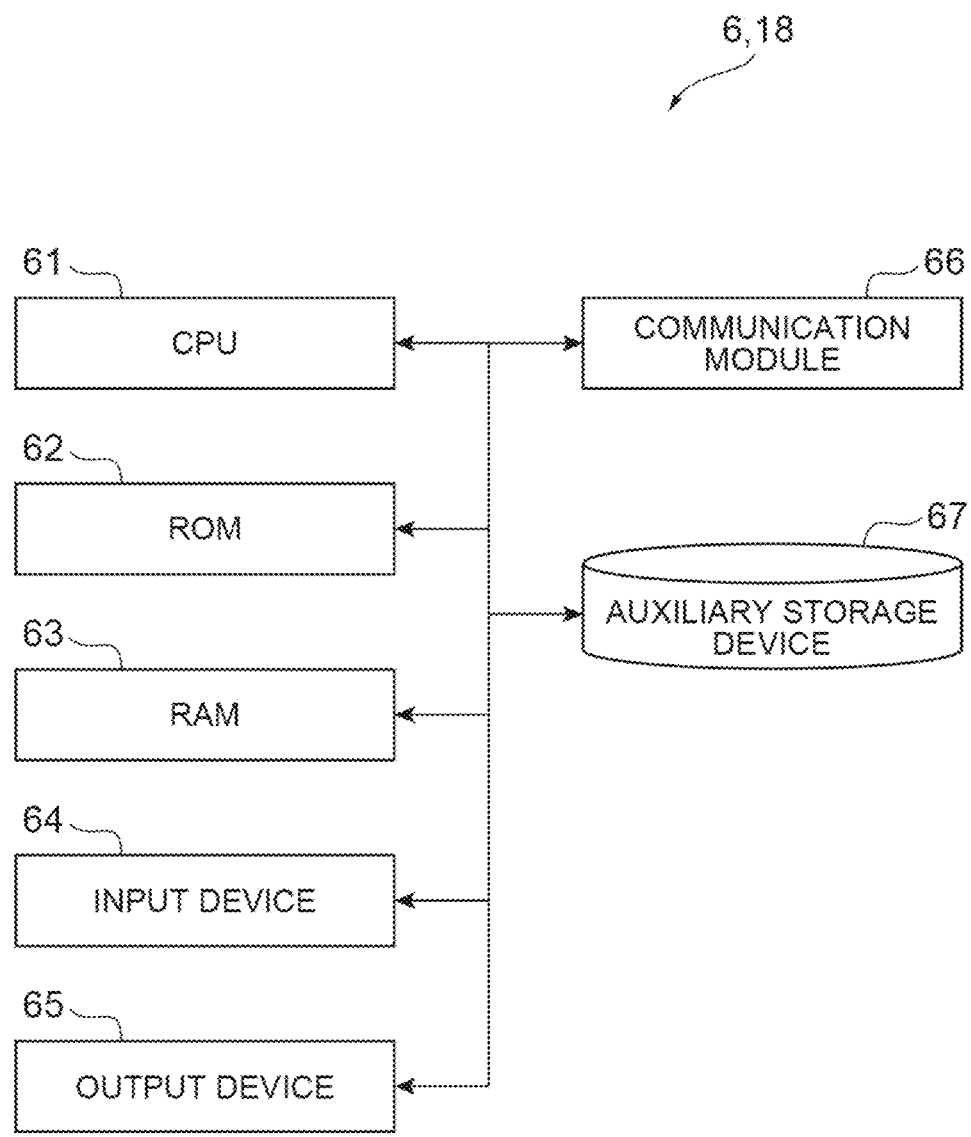
FIG. 14 is a diagram schematically illustrating an example of a configuration of hardware of an analysis unit and a control unit.

FIG. 14 is a diagram schematically illustrating an example of a configuration of hardware of the analysis unit 6 and the control unit 18. As illustrated in FIG. 14, the analysis unit 6 and the control unit 18 may be constituted as an ordinary computer physically including a processor (CPU) 61; a main storage device such as a ROM 62 or a RANI 63; an input device 64 such as a keyboard, a mouse, or a touch screen; an output device 65 such as a display (including a touch screen); a communication module 66 such as a network card for transmitting and receiving data with respect to other devices; an auxiliary storage device 67 such as a hard disk; and the like.

The auxiliary storage device 67 of the control unit 18 stores data relating to a phase modulation pattern for generating the first pulsed light PL1, data relating to a phase modulation pattern for generating the second pulsed light PL2, and data relating to a phase modulation pattern for generating the third pulsed light PL3. The processor 61 reads one of the pieces of these data as necessary and controls a phase modulation pattern presented to the SLM 14 based on the data.

The auxiliary storage device 67 of the analysis unit 6 stores a program for obtaining time response of the sample B based on the temporal waveforms of the first pulsed light PL1, the second pulsed light PL1, and the third pulsed light PL3 that are transformed into correlation light. In other words, the program for obtaining time response of the sample B causes the processor 61 of the computer to operate as the analysis unit 6. The processor 61 obtains time response of the sample B by executing this program. A storage device storing a program for obtaining time response of the sample B may be a non-transitory recording medium. Examples of the recording medium include a recording medium such as a flexible disk, a CD, or a DVD; a recording medium such as a ROM; a semiconductor memory; a cloud server, and the like. Information relating to obtained time response of the sample B is output to the output device 65 or output to an external device via the communication module 66.

Figure 15:
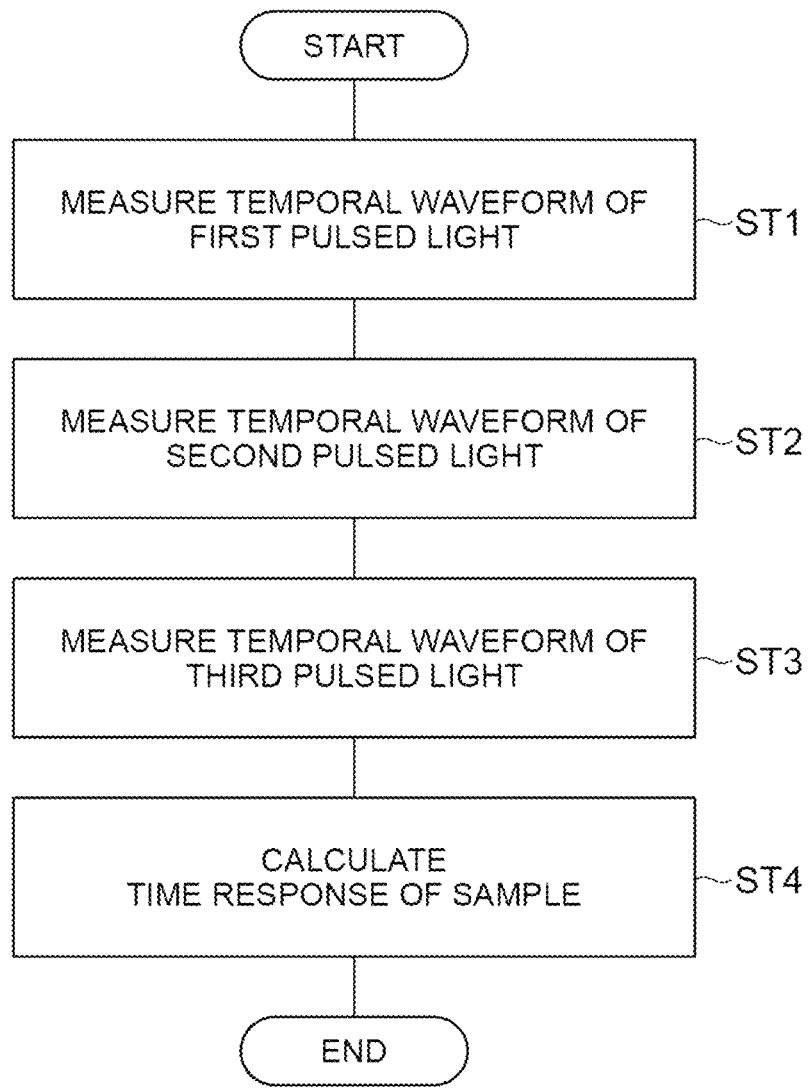
FIG. 15 is a flowchart showing a time response measurement method according to the embodiment.

Here, the time response measurement method of the present embodiment will be described. FIG. 15 is a flowchart showing the time response measurement method of the present embodiment. The time response measurement method is a method for measuring the time response inside the sample B caused by irradiation with light. For example, the time response measurement method is performed using the time response measurement apparatus 1A described above.

First, in Step ST1, the sample B is irradiated with the first pulsed light PL1 along a predetermined optical axis, and a first temporal waveform TW1 that is a temporal waveform of the first pulsed light PL1 output from the sample B and having passed through the attenuation unit 4 is measured. Next, in Step ST2, the sample B is irradiated with the second pulsed light PL2 along the predetermined optical axis, and a second temporal waveform TW2 that is a temporal waveform of the second pulsed light PL2 output from the sample B and having passed through the attenuation unit 4 is measured. Next, in Step ST3, the sample B is irradiated with the third pulsed light PL3 along the predetermined optical axis, and a third temporal waveform TW3 that is a temporal waveform of the third pulsed light PL3 output from the sample B and having passed through the attenuation unit 4 is measured. In these Steps ST1 to ST3, the first pulsed light PL1, the second pulsed light PL2, and the third pulsed light PL3 are generated using an SLM 14 simultaneously performing phase modulation and intensity modulation of the input pulsed light Pa.

The order of Steps ST1 to ST3 is arbitrary. Step ST2 may be performed first, or Step ST3 may be performed first. However, the light intensity of the third pulsed light PL3 is larger than each of the light intensities of the first pulsed light PL1 and the second pulsed light PL2. Depending on the sample B, irreversible change in properties may occur due to incidence of light with a large light intensity. In such a case, when Step ST3 is performed prior to at least one of Steps ST1 and ST2, there is concern that the first temporal waveform TW1 and/or the second temporal waveform TW2 measured thereafter may lack accuracy. Such concern can be reduced by performing Step ST3 after Steps ST1 and ST2.

Thereafter, in Step ST4, the time response of the sample B is calculated based on the first temporal waveform TW1, the second temporal waveform TW2, and the third temporal waveform TW3. In this Step ST4, the time response of the sample B may be calculated based on a comparison between the second temporal waveform TW2 and a difference between the third temporal waveform TW3 and the first temporal waveform TW1, based on the principle described above.

Here, phase modulation for generating the first pulsed light PL1, the second pulsed light PL2, and the third pulsed light PL3 in the SLM 14 of the pulse formation unit 3 illustrated in FIG. 4 will be described in detail. A domain in front of a lens 15 (spectrum domain) and a domain behind a diffraction grating 16 (time domain) have a relationship of Fourier transform therebetween, and the phase modulation in the spectrum domain affects a time-intensity waveform in the time domain. Therefore, light output from the pulse formation unit 3 can have various time intensity waveforms (the first temporal waveform TW1, the second temporal waveform TW2, and the third temporal waveform TW3) different from the pulsed light Pa according to the modulation pattern of the SLM 14.

Figure 16:
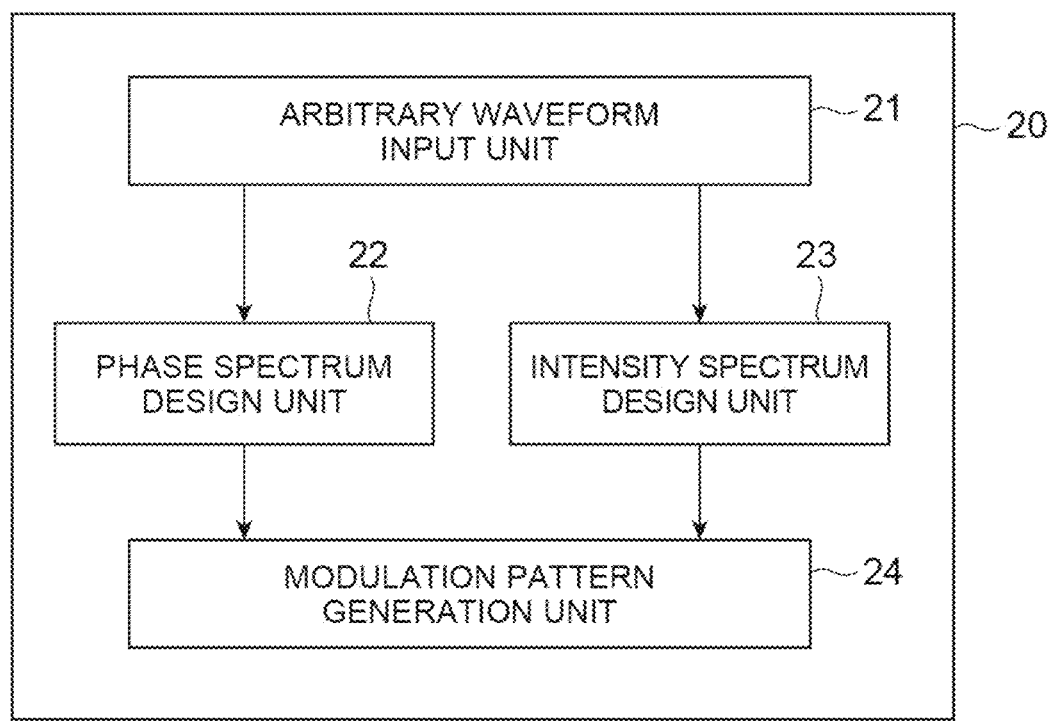
FIG. 16 is a diagram illustrating a configuration of a modulation pattern calculation apparatus for computing a modulation pattern of the spatial light modulator.

FIG. 16 is a diagram illustrating a configuration of a modulation pattern calculation apparatus 20 for computing a modulation pattern of the SLM 14. For example, the modulation pattern calculation apparatus 20 is a personal computer; a smart device such as a smartphone or a tablet terminal; or a computer having a processor such as a cloud server. The control unit 18 illustrated in FIG. 4 may also serve as the modulation pattern calculation apparatus 20. The modulation pattern calculation apparatus 20 calculates a phase modulation pattern for approximating a temporal intensity waveform of the output light of the pulse formation unit 3 to a desired waveform, and provides the phase modulation pattern to the control unit 18. The modulation pattern is data for controlling the SLM 14, and includes a table of intensity of a complex amplitude distribution or intensity of a phase distribution. For example, the modulation pattern is a computer-generated hologram (CGH).

The modulation pattern calculation apparatus 20 of the present embodiment causes the control unit 18 to store a phase pattern including a first phase pattern and a second phase pattern. The first phase pattern is a phase pattern for phase modulation applying a phase spectrum for obtaining a desired waveform to the output light. The second phase pattern is a phase pattern for intensity modulation applying an intensity spectrum for obtaining a desired waveform to the output light. For this reason, as illustrated in FIG. 16, the modulation pattern calculation apparatus 20 has an arbitrary waveform input unit 21, a phase spectrum design unit 22, an intensity spectrum design unit 23, and a modulation pattern generation unit 24. That is, the processor of the computer provided in the modulation pattern calculation apparatus 20 implements a function of the arbitrary waveform input unit 21, a function of the phase spectrum design unit 22, a function of the intensity spectrum design unit 23, and a function of the modulation pattern generation unit 24. The respective functions may be realized by the same processor or may be realized by different processors.

The processor of the computer can implement the above respective functions using a modulation pattern calculation program. Hence, the modulation pattern calculation program causes the processor of the computer to operate as the arbitrary waveform input unit 21, the phase spectrum design unit 22, the intensity spectrum design unit 23, and the modulation pattern generation unit 24 in the modulation pattern calculation apparatus 20. The modulation pattern calculation program is stored inside the computer or in an external storage device (storage medium). The storage device may be a non-transitory recording medium. Examples of the recording medium include a recording medium such as a flexible disk, a CD, or a DVD; a recording medium such as a ROM; a semiconductor memory; a cloud server, and the like.

The arbitrary waveform input unit 21 receives an input of a desired temporal intensity waveform from an operator. An operator inputs information relating to desired temporal intensity waveform to the arbitrary waveform input unit 21. The information relating to desired temporal intensity waveform includes, for example, the pulse width W1 and the peak intensity T1 of the first pulsed light PL1 shown in FIG. 2A, the pulse width W2 and the peak intensity T2 of the second pulsed light PL2 shown in FIG. 2B, the pulse widths W3 and W4 and the peak intensities T3 and T4 of the third pulsed light PL3 shown in FIG. 3B, and the time interval D1 shown in FIG. 3B. The magnitudes of these values are arbitrary and variable. Information relating to desired temporal intensity waveform is applied from the arbitrary waveform input unit 21 to the phase spectrum design unit 22 and the intensity spectrum design unit 23. The phase spectrum design unit 22 calculates the phase spectrum of the output light of the pulse formation unit 3 suitable for realizing desired temporal intensity waveform which has been applied. The intensity spectrum design unit 23 calculates the intensity spectrum of the output light of the pulse formation unit 3 suitable for realizing desired temporal intensity waveform which has been applied. The modulation pattern generation unit 24 calculates a phase modulation pattern (for example, a computer-generated hologram) for applying the phase spectrum obtained by the phase spectrum design unit 22 and the intensity spectrum obtained by the intensity spectrum design unit 23 to the output light of the pulse formation unit 3.

Figure 17:
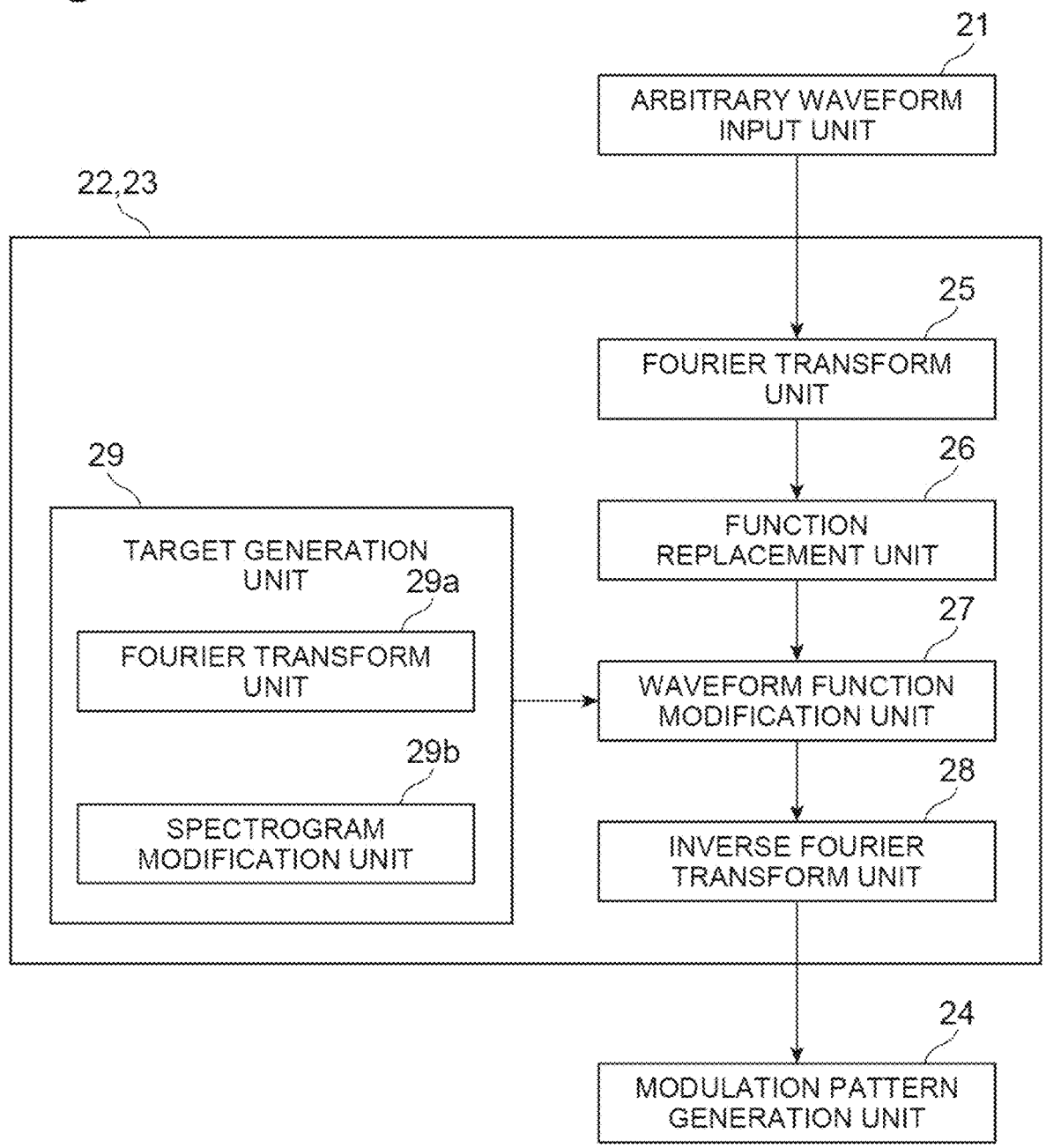
FIG. 17 is a block diagram illustrating internal configurations of a phase spectrum design unit and an intensity spectrum design unit.

FIG. 17 is a block diagram illustrating an internal configuration of the phase spectrum design unit 22 and the intensity spectrum design unit 23. As illustrated in FIG. 17, each of the phase spectrum design unit 22 and the intensity spectrum design unit 23 has a Fourier transform unit 25, a function replacement unit 26, a waveform function correction unit 27, an inverse Fourier transform unit 28, and a target generation unit 29. The target generation unit 29 includes a Fourier transform unit 29a and a spectrogram correction unit 29b. The functions of these components will be described below in detail later.

Figure 18:
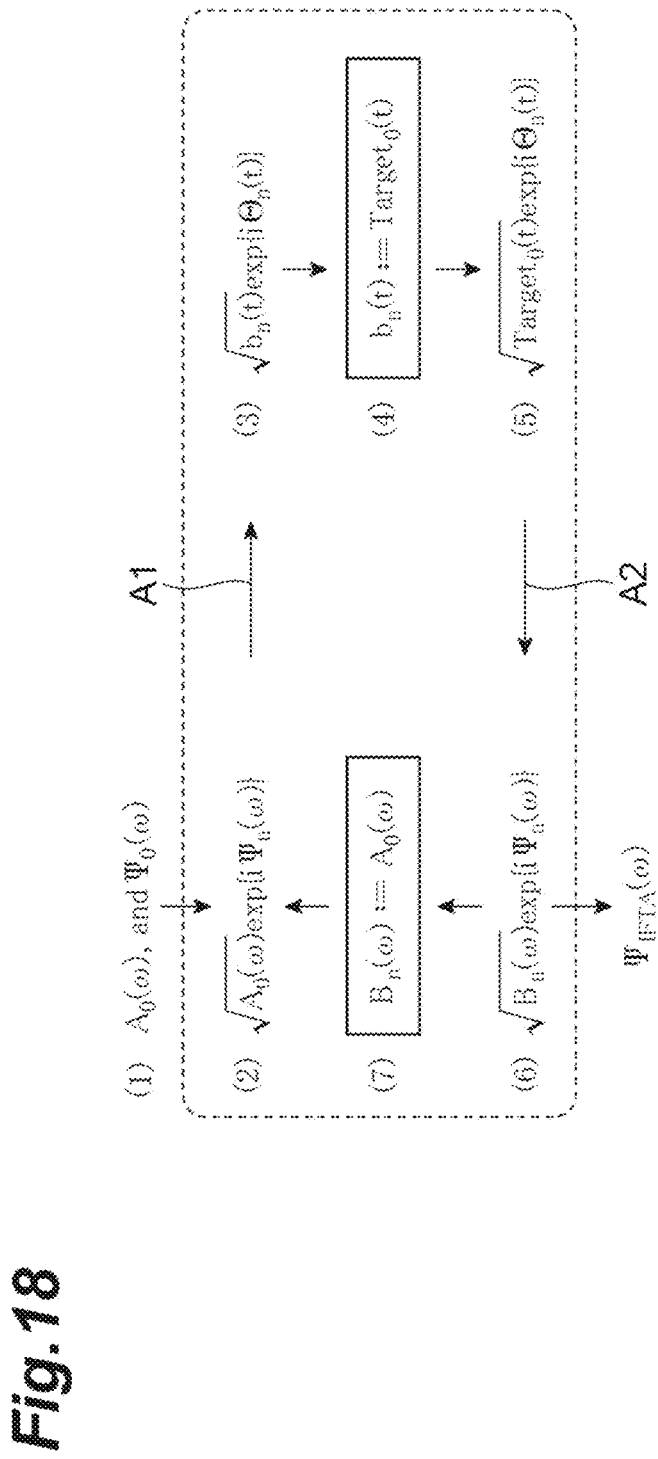
FIG. 18 is a diagram illustrating a procedure of calculation of a phase spectrum by an iterative Fourier transform method.

Here, the desired temporal intensity waveform is expressed as a function in the time domain, and the phase spectrum is expressed as a function in the frequency domain. Therefore, the phase spectrum corresponding to the desired temporal intensity waveform is obtained by iterative Fourier transform based on the desired temporal intensity waveform, for example. FIG. 18 is a diagram illustrating a procedure of calculation of the phase spectrum using the iterative Fourier transform method. First, an initial intensity spectrum function $A_0(\omega)$ and an initial phase spectrum function $\Psi_0(\omega)$ which are functions of a frequency co are prepared (process number (1) in the drawing). In an example, the intensity spectrum function $A_0(\omega)$ and the phase spectrum function $\Psi_0(\omega)$ represent the spectrum intensity and the spectrum phase of input light, respectively. Next, a waveform function (a) in the frequency domain including the intensity spectrum function $A_0(\omega)$ and a phase spectrum function $\Psi_n(\omega)$ is prepared (process number (2) in the drawing).

[Formula 1]

$$\sqrt{A_0(\omega)}\exp\{i\Psi_n(\omega)\} \quad (a)$$

A subscript n represents after an n-th Fourier transform process. Before an initial (first) Fourier transform process, the initial phase spectrum function $\Psi_0(\omega)$ described above is used as the phase spectrum function $\Psi_n(\omega)$. The factor i is an imaginary number.

Next, a Fourier transform from the frequency domain to the time domain is performed on the function (a) (arrow A1 in the drawing). As a result, a waveform function (b) in the time domain including a temporal intensity waveform function $b_n(t)$ and a temporal phase waveform function $\Theta_n(t)$ is obtained (process number (3) in the drawing).

[Formula 2]

$$\sqrt{b_n(t)}\exp\{i\Theta_n(t)\} \quad (b)$$

Next, the temporal intensity waveform function $b_n(t)$ included in the function (b) is replaced by a temporal intensity waveform function $Target_0(t)$ based on the desired waveform (process numbers (4) and (5) in the drawing).

[Formula 3]

$$b_n(t):=Target_0(t) \quad (c)$$

[Formula 4]

$$\sqrt{Target_0(t)}\exp\{i\Theta_n(t)\} \quad (d)$$

Next, an inverse Fourier transform from the time domain to the frequency domain is performed on the function (d) (arrow A2 in the drawing). As a result, a waveform function (e) in the frequency domain including an intensity spectrum function $B_0(\omega)$ and the phase spectrum function $\Psi_n(\omega)$ is obtained (process number (6) in the drawing).

[Formula 5]

$$\sqrt{B_n(\omega)}\exp\{i\Psi_n(\omega)\} \quad (e)$$

Next, in order to constrain the intensity spectrum function $B_n(\omega)$ included in the function (e), the intensity spectrum function $B_n(\omega)$ is replaced by the initial intensity spectrum function $A_0(\omega)$ (process number (7) in the drawing).

[Formula 6]

$$B_n(\omega):=A_0(\omega) \quad (f)$$

Subsequently, the process (2) to (7) are repeatedly performed a plurality of times, so that the shape of the phase spectrum represented by the phase spectrum function $\Psi_n(\omega)$ in the waveform function can be brought close to the shape of the phase spectrum corresponding to a desired temporal intensity waveform. An ultimately obtained phase spectrum function $\Psi_{IFTA}(\omega)$ becomes a basis of a modulation pattern for obtaining the desired temporal intensity waveform.

Figure 19:
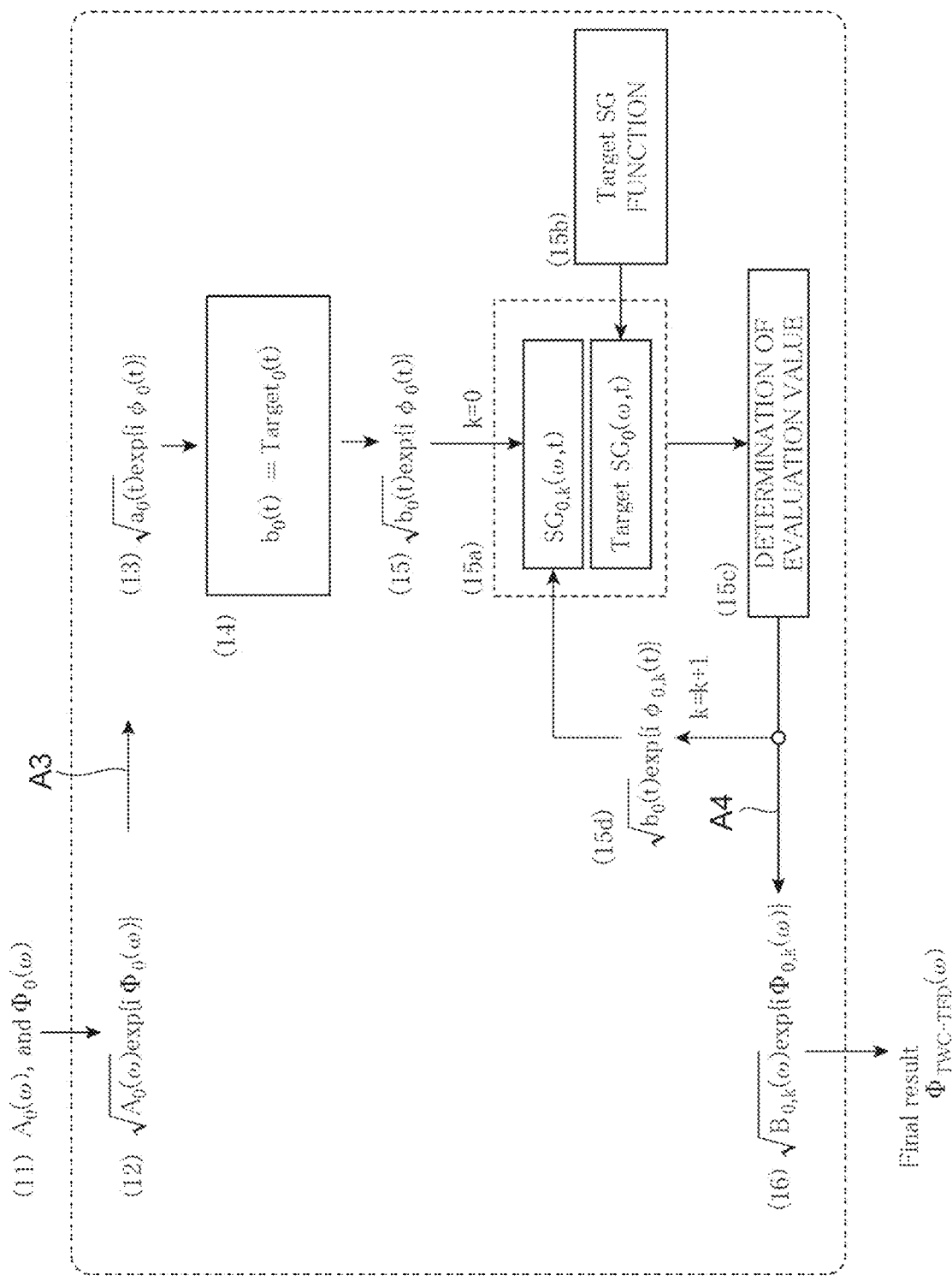
FIG. 19 is a diagram illustrating a procedure of calculation of a phase spectrum function in the phase spectrum design unit.

However, in the iterative Fourier method described above, although it is possible to control the temporal intensity waveform, there is a problem in that it is not possible to control a frequency component (spectrum) constituting the temporal intensity waveform. Therefore, the modulation pattern calculation apparatus 20 according to the present embodiment calculates the phase spectrum function and the intensity spectrum function on which the modulation pattern is based, using a calculation method described below. FIG. 19 is a diagram illustrating a procedure of calculation of the phase spectrum function in the phase spectrum design unit 22. First, the initial intensity spectrum function $A_0(\omega)$ and an initial phase spectrum function $\Phi_0(\omega)$ which are functions of the frequency co are prepared (process number (11) in the drawing). In an example, the intensity spectrum function $A_0(\omega)$ and the phase spectrum function $\Phi_0(\omega)$ represent the spectrum intensity and the spectrum phase of input light, respectively. Next, a first waveform function (g) in the frequency domain including the intensity spectrum function $A_0(\omega)$ and the phase spectrum function $\Phi_0(\omega)$ is prepared (process number (12)). Here, the factor i is an imaginary number.

[Formula 7]

$$\sqrt{A_0(\omega)}\exp\{i\Phi_0(\omega)\} \quad (g)$$

Next, the Fourier transform unit 25 of the phase spectrum design unit 22 performs Fourier transform from the frequency domain to the time domain on the function (g) (arrow A3 in the drawing). As a result, a second waveform function (h) in the time domain including a temporal intensity waveform function $a_0(t)$ and a temporal phase waveform function $\varphi_0(t)$ is obtained (process number (13) in the drawing).

[Formula 8]

$$\sqrt{a_0(t)}\exp\{i\varphi_0(t)\} \quad (h)$$

Next, as shown in the following Formula (i), the function replacement unit 26 of the phase spectrum design unit 22 replaces a temporal intensity waveform function $b_0(t)$ by the temporal intensity waveform function $Target_0(t)$ based on the desired waveform input in the arbitrary waveform input unit 21 (process number (14) in the drawing).

[Formula 9]

$$b_0(t) = Target_0(t) \quad (i)$$

Next, as shown in the following Formula (j), the function replacement unit 26 of the phase spectrum design unit 22 replaces the temporal intensity waveform function $a_0(t)$ by the temporal intensity waveform function $b_0(t)$. That is, the temporal intensity waveform function $a_0(t)$ included in the function (h) is replaced by the temporal intensity waveform function $Target_0(t)$ based on the desired waveform (process number (15) in the drawing).

[Formula 10]

$$\sqrt{b_0(t)}\exp\{i\varphi_0(t)\} \quad (j)$$

Next, the waveform function correction unit 27 of the phase spectrum design unit 22 modifies the second waveform function so as to bring a spectrogram of the second waveform function (j) after the replacement close to a target spectrogram generated in advance in accordance with a desired wavelength band. First, the second waveform function (j) is transformed into a spectrogram $SG_{0,k}(\omega,t)$ by performing a time-frequency transform on the second waveform function (j) after the replacement (process number (15a) in the drawing). The subscript k represents k-th transform processing.

Here, time-frequency transform refers to performing frequency filter processing or numerical calculation processing (processing of deriving a spectrum for each time by multiplying a window function while shifting the window function) on a composite signal such as a temporal waveform, and transforming it into into three-dimensional information including a time, a frequency, and an intensity (spectrum intensity) of a signal component. In the present embodiment, the transform result (time, frequency, and spectrum intensity) is defined as a "spectrogram".

Examples of time-frequency transform include a short-time Fourier transform (STFT), a wavelet transform (Haar wavelet transform, Gabor wavelet transform, Mexican-hat wavelet transform, or Morlet wavelet transform), and the like.

A target spectrogram $TargetSG_0(\omega,t)$ generated in advance in accordance with the desired wavelength band is read from the target generation unit 29. The target spectrogram $TargetSG_0(\omega,t)$ is roughly equivalent to a target temporal waveform (a temporal intensity waveform and its constituent frequency component) and is generated by the target spectrogram function of the process number (15b).

Next, the waveform function correction unit 27 of the phase spectrum design unit 22 performs pattern matching between the spectrogram $SG_{0,k}(\omega,t)$ and the target spectrogram $TargetSG_0(\omega,t)$ to check a degree of similarity (how well they are aligned with each other). In the present embodiment, an evaluation value is calculated as an index presenting the degree of similarity. Further, in a subsequent process number (15c), it is determined whether or not the obtained evaluation value satisfies a predetermined end condition. When the condition is satisfied, the process proceeds to a process number (16), and when the condition is not satisfied, the process proceeds to a process number (15d). In the process number (15d), the temporal phase waveform function $\varphi_0(t)$ included in the second waveform function is changed to an arbitrary temporal phase waveform function $\varphi_{0,k}(t)$. The second waveform function after the temporal phase waveform function is changed is transformed into a spectrogram again by the time-frequency transform such as STFT. Subsequently, the process numbers (15a) to (15d) described above are repeatedly performed. In this way, the second waveform function is modified so as to bring the spectrogram $SG_{0,k}(\omega,t)$ gradually close to the target spectrogram $TargetSG_0(\omega,t)$.

Thereafter, the inverse Fourier transform unit 28 of the phase spectrum design unit 22 performs inverse Fourier transform on the modified second waveform function (arrow A4 in the drawing) to generate a third waveform function (k) in the frequency domain (process number (16)).

[Formula 11]

$$\sqrt{B_0(\omega)}\exp\{i\Phi_{0,k}(\omega)\} \quad (k)$$

A phase spectrum function $\Phi_{0,k}(\omega)$ included in the third waveform function (k) becomes an ultimately obtained desired phase spectrum function $\Phi_{TWC\text{-}TFD}(\omega)$. This phase spectrum function $\Phi_{TWC\text{-}TFD}(\omega)$ is provided to the modulation pattern generation unit 24.

Figure 20:
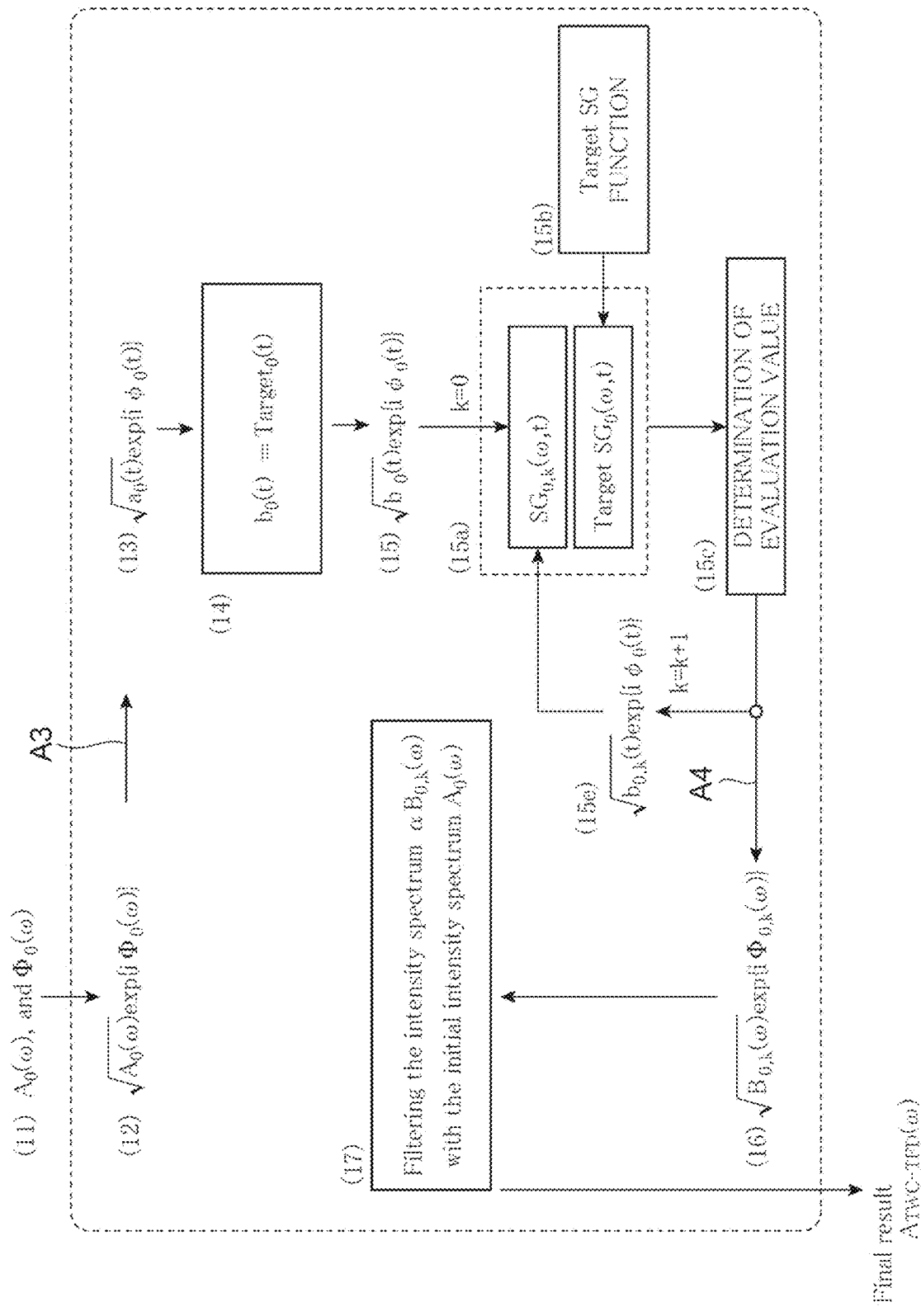
FIG. 20 is a diagram illustrating a procedure of calculation of an intensity spectrum function in the intensity spectrum design unit.

FIG. 20 is a diagram illustrating a procedure of calculation of an intensity spectrum function in the intensity spectrum design unit 23. Since the processes from the process number (11) to the process number (15c) are the same as the procedure of calculation of the spectrum phase in the phase spectrum design unit 22 described above, description thereof will be omitted. When an evaluation value indicating the degree of similarity between the spectrogram $SG_{0,k}(\omega,t)$ and the target spectrogram $TargetSG_0(\omega,t)$ does not satisfy the predetermined end condition, the waveform function correction unit 27 of the intensity spectrum design unit 23 changes the temporal intensity waveform function $b_0(t)$ to the arbitrary temporal intensity waveform function $b_{0,k}(t)$ while constraining the temporal phase waveform function $\varphi_0(t)$ included in the second waveform function by the initial value (process number (15e)). The second waveform function after changing the temporal intensity waveform function is transformed into a spectrogram again by time-frequency conversion such as STFT. Subsequently, the process numbers (15a) to (15c) and (15e) are repeatedly performed. In this way, the second waveform function is modified so as to bring the spectrogram $SG_{0,k}(\omega,t)$ gradually close to the target spectrogram $TargetSG_0(\omega,t)$.

Thereafter, the inverse Fourier transform unit 28 of the intensity spectrum design unit 23 performs inverse Fourier transform on the modified second waveform function (arrow A4 in the drawing) to generate a third waveform function (in) in the frequency domain (process number (16)).

[Formula 12]

$$\sqrt{B_{0,k}(\omega)}\exp\{i\Phi_{0,k}(\omega)\} \quad (m)$$

Next, in the process number (17), a filter processing unit of the intensity spectrum design unit 23 performs filter processing based on the intensity spectrum of input light on the intensity spectrum function $B_{0,k}(\omega)$ included in the third waveform function (m). Specifically, a portion exceeding a cutoff intensity for each wavelength, which is determined on the basis of the intensity spectrum of the input light, is cut from the intensity spectrum obtained by multiplying the intensity spectrum function $B_{0,k}(\omega)$ by a coefficient α. This is performed to prevent an intensity spectrum function $\alpha B_{0,k}(\omega)$ from exceeding the spectrum intensity of the input light in all wavelength regions. In an example, the cutoff intensity for each wavelength is set to be matched with the intensity spectrum of the input light (the initial intensity spectrum function $A_0(\omega)$ in the present embodiment). In that case, as shown in the following Formula (n), at a frequency where the intensity spectrum function $\alpha B_{0,k}(\omega)$ is larger than the intensity spectrum function $A_0(\omega)$, a value of the intensity spectrum function $A_0(\omega)$ is taken as the value of an intensity spectrum function $A_{TWC-TFD}(\omega)$. At a frequency where the intensity spectrum function $\alpha B_{0,k}(\omega)$ is equal to or smaller than the intensity spectrum function $A_0(\omega)$, a value of the intensity spectrum function $\alpha B_{0,k}(\omega)$ is taken as a value of the intensity spectrum function $A_{TWC-TFD}(\omega)$ (process number (17) in the drawing).

[Formula 13]

$$A_{TWC-TFD}(\omega) = \begin{cases} A_0(\omega) & A_0(\omega) < \alpha B_{0,k}(\omega) \\ \alpha B_{0,k}(\omega) & A_0(\omega) \geq \alpha B_{0,k}(\omega) \end{cases} \quad (n)$$

This intensity spectrum function $A_{TWC-TFD}(\omega)$ is provided to the modulation pattern generation unit 24 as an ultimately obtained desired spectrum intensity.

The modulation pattern generation unit 24 calculates a phase modulation pattern (for example, a computer-generated hologram) for applying a spectrum phase indicated by the phase spectrum function $\Phi_{TWC-TFD}(\omega)$ calculated in the phase spectrum design unit 22, and the spectrum intensity indicated by the intensity spectrum function $A_{TWC-TFD}(\omega)$ calculated in the intensity spectrum design unit 23 to the output light.

Figure 21:
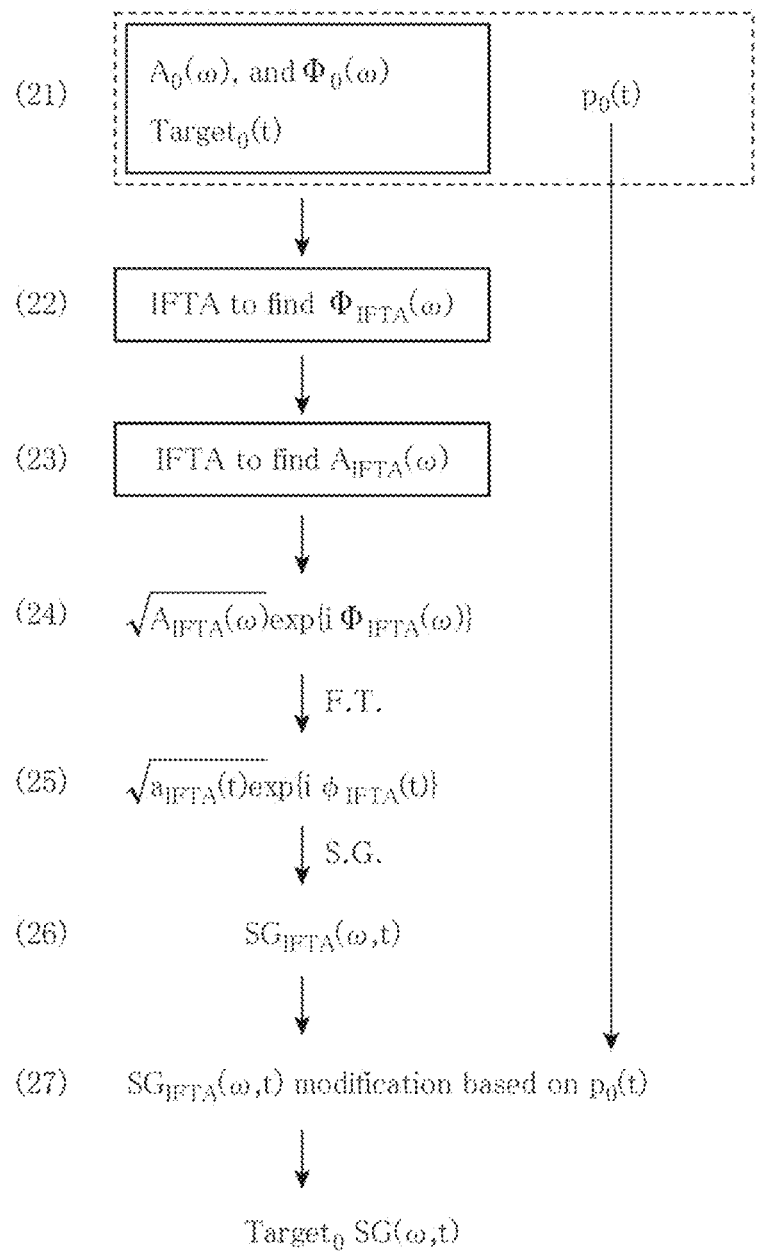
FIG. 21 is a diagram illustrating an example of a procedure of generation of a target spectrogram in a target generation unit.

FIG. 21 is a diagram illustrating an example of a procedure of generation of the target spectrogram TargetSG$_0$(ω,t) in the target generation unit 29. The target spectrogram TargetSG$_0$(ω,t) indicates a target temporal waveform. A temporal waveform includes a temporal intensity waveform and its constituent frequency component (wavelength band component). Therefore, the creation of a target spectrogram is a very important process for controlling the frequency component (wavelength band component). As illustrated in FIG. 21, the target generation unit 29 first inputs the spectral waveform (the initial intensity spectrum function $A_0(\omega)$ and the initial phase spectrum function $\Phi_0(\omega)$) and the desired temporal intensity waveform function Target$_0$(t). Furthermore, the target generation unit 29 inputs a temporal function $p_0$(t) including a desired frequency (wavelength) band information (process number (21)).

Next, the target generation unit 29 calculates a phase spectrum function $\Phi_{IFTA}(\omega)$ for realizing the temporal intensity waveform function Target$_0$(t) by using, for example, the iterative Fourier transform method illustrated in FIG. 18 (process number (22)).

Figure 22:
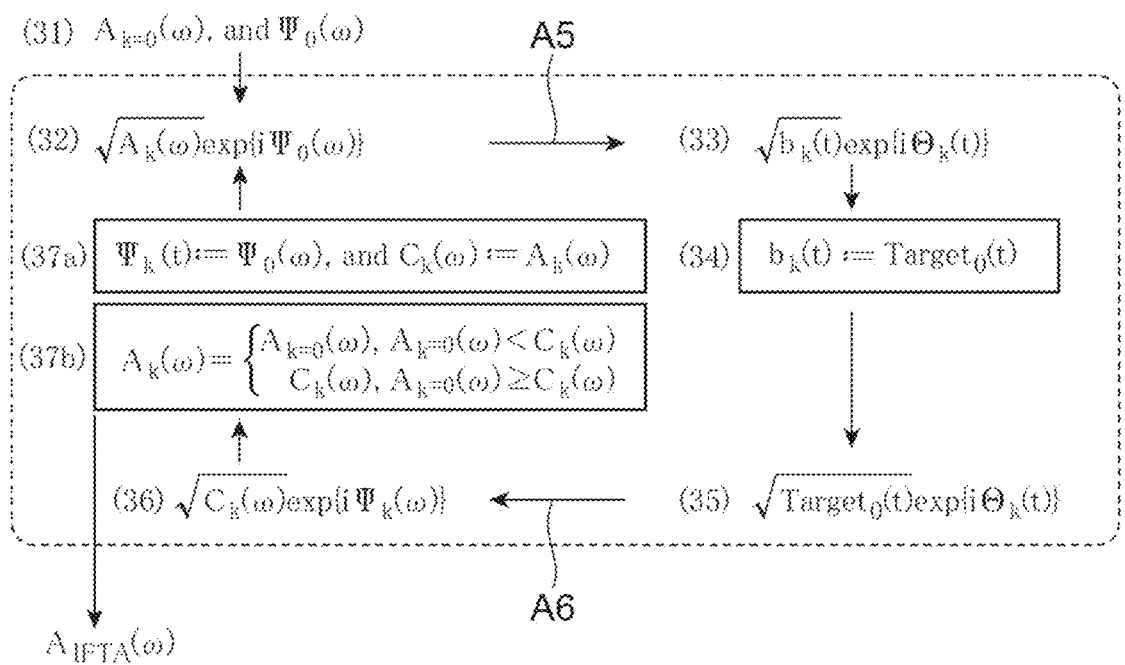
FIG. 22 is a diagram illustrating an example of a procedure of calculation of an intensity spectrum function.

Next, the target generation unit 29 calculates an intensity spectrum function $A_{IFTA}(\omega)$ for realizing the temporal intensity waveform function Target$_0$(t) by the iterative Fourier transform method using the above obtained phase spectrum function $\Phi_{IFTA}(\omega)$ (process number (23)). FIG. 22 is a diagram illustrating an example of a procedure of calculation of the intensity spectrum function $A_{IFTA}(\omega)$.

With reference to FIG. 22, first, the initial intensity spectrum function $A_{k=0}(\omega)$ and the phase spectrum function $\Psi_0(\omega)$ are prepared (process number (31) in the drawing). Next, a waveform function (o) of the frequency domain including an intensity spectrum function $A_k(\omega)$ and the phase spectrum function $\Psi_0(\omega)$ is prepared (process number (32) in the drawing).

[Formula 14]

$$\sqrt{A_k(\omega)}\exp\{i\Psi_0(\omega)\} \quad (o),$$

A subscript k represents after a k-th Fourier transform process. Before an initial (first) Fourier transform process, the initial intensity spectrum function $A_{k=0}(\omega)$ described above is used as the intensity spectrum function $A_k(\omega)$. The factor i is an imaginary number.

Next, a Fourier transform from the frequency domain to the time domain is performed on the function (o) (arrow A5 in the drawing). As a result, a waveform function (p) of the frequency domain including a temporal intensity waveform function $b_k$(t) is obtained (process number (33) in the drawing).

[Formula 15]

$$\sqrt{b_k(\omega)}\exp\{i\Theta_k(\omega)\} \quad (p)$$

Next, the temporal intensity waveform function $b_k$(t) included in the function (p) is replaced by the temporal intensity waveform function Target$_0$(t) based on the desired waveform (process numbers (34) and (35) in the drawing).

[Formula 16]

$$b_k(t):=\text{Target}_0(t) \quad (q)$$

[Formula 17]

$$\sqrt{\text{Target}_0(t)}\exp\{i\Theta_k(t)\} \quad (r)$$

Next, an inverse Fourier transform from the time domain to the frequency domain is performed on the function (r) (arrow A6 in the drawing). As a result, a waveform function (s) in the frequency domain including an intensity spectrum function $C_k(\omega)$ and a phase spectrum function $\Psi_k(\omega)$ is obtained (process number (36) in the drawing).

[Formula 18]

$$\sqrt{C_k(\omega)}\exp\{i\Psi_0(\omega)\} \quad (s)$$

Next, in order to constrain the phase spectrum function $\Psi_k(\omega)$ included in the foregoing function (s), it is replaced by the initial phase spectrum function $\Psi_0(\omega)$ (process number (37a) in the drawing).

[Formula 19]

$$\Psi_k(\omega):=\Psi_0(\omega)(t)$$

Furthermore, filter processing based on the intensity spectrum of input light is performed on the intensity spectrum function $C_k(\omega)$ in the frequency domain after the inverse Fourier transform. Specifically, in the intensity spectrums represented by the intensity spectrum function $C_k(\omega)$, a portion exceeding a cutoff intensity for each wavelength set based on the intensity spectrum of the input light is cut off. In an example, the cutoff intensity for each wavelength is set to be matched with the intensity spectrum of input light (for example, the initial intensity spectrum function $A_{k=0}(\omega)$). In that case, as shown in the following Formula (u), at a frequency where the intensity spectrum function $C_k(\omega)$ is larger than the intensity spectrum function $A_{k=0}(\omega)$, a value of the intensity spectrum function $A_{k=0}(\omega)$ is taken as a value of the intensity spectrum function $A_k(\omega)$. At a frequency where the intensity spectrum function $C_k(\omega)$ is equal to or smaller than the intensity spectrum function $A_{k=0}(\omega)$, a value of the intensity spectrum function $C_k(\omega)$ is taken as the value of the intensity spectrum function $A_k(\omega)$ (process number (37b) in the drawing).

[Formula 20]

$$A_k(\omega) = \begin{cases} A_{k=0}(\omega), & A_{k=0}(\omega) < C_k(\omega) \\ C_k(\omega), & A_{k=0}(\omega) \geq C_k(\omega) \end{cases} \quad (u)$$

The intensity spectrum function $C_k(\omega)$ included in the function (s) is replaced by the intensity spectrum function $A_k(\omega)$ after filter processing by the above Formula (u).

Subsequently, the above process (32) to (37b) are repeatedly performed, so that the shape of the intensity spectrum represented by the intensity spectrum function $A_k(\omega)$ in the waveform function can be brought close to the shape of the intensity spectrum corresponding to the desired temporal intensity waveform. Finally, an intensity spectrum function $A_{IFTA}(\omega)$ is obtained.

FIG. 21 will be referred again. A third waveform function (v) in the frequency domain including these functions is obtained by calculating the phase spectrum function $\Phi_{IFTA}(\omega)$ and the intensity spectrum function $A_{IFTA}(\omega)$ in the process numbers (22) and (23) described above (process number (24)).

[Formula 21]

$$\sqrt{A_{IFTA}(\omega)}\exp\{i\Phi_{IFTA}(\omega)\} \quad (v)$$

The Fourier transform unit 29a of the target generation unit 29 performs the Fourier transform on the above waveform function (v). As a result, a fourth waveform function ($\omega$) in the time domain is obtained (process number (25)).

[Formula 22]

$$\sqrt{a_{IFTA}(t)}\exp\{i\phi_{IFTA}(t)\} \quad (w)$$

The spectrogram correction unit 29b of the target generation unit 29 transforms the fourth waveform function (w) into a spectrogram $SG_{IFTA}(\omega,t)$ by the time-frequency transform (process number (26)). Then, in a process number (27), the target spectrogram $TargetSG_0(\omega,t)$ is generated by modifying the spectrogram $SG_{IFTA}(\omega,t)$ based on the temporal function $p_0(t)$ including the desired frequency (wavelength) band information. For example, a characteristic pattern appearing in the spectrogram $SG_{IFTA}(\omega,t)$ constituted of two-dimensional data is partially cut out, and the frequency component of the corresponding part is operated based on the temporal function $p_0(t)$. The specific example thereof will be described in detail.

Figure 23A:
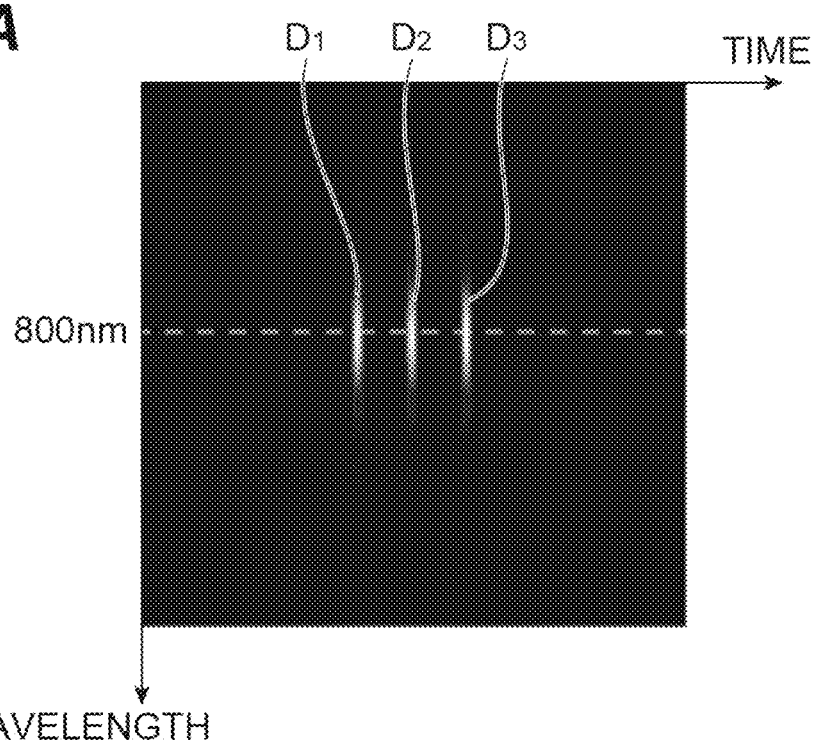
FIGS. 23A and 23B are diagrams illustrating spectrograms.

For example, the case in which triple pulses having time intervals of 2 picoseconds are set as the desired temporal intensity waveform function $Target_0(t)$ is considered. At that time, the spectrogram $SG_{IFTA}(\omega,t)$ has a result as shown in FIG. 23A. In FIG. 23A, the horizontal axis indicates the time (unit: femtosecond), and the vertical axis indicates the wavelength (unit: nm). A value of the spectrogram is indicated by light and dark in the drawing, and the brighter the part, the larger the value of the spectrogram. In this spectrogram $SG_{IFTA}(\omega,t)$, the triple pulses appear as domains $D_1$, $D_2$, and $D_3$ separated on the time axis at intervals of 2 picoseconds. A center (peak) wavelength of the domains $D_1$, $D_2$, and $D_3$ is 800 nm.

Figure 23B:
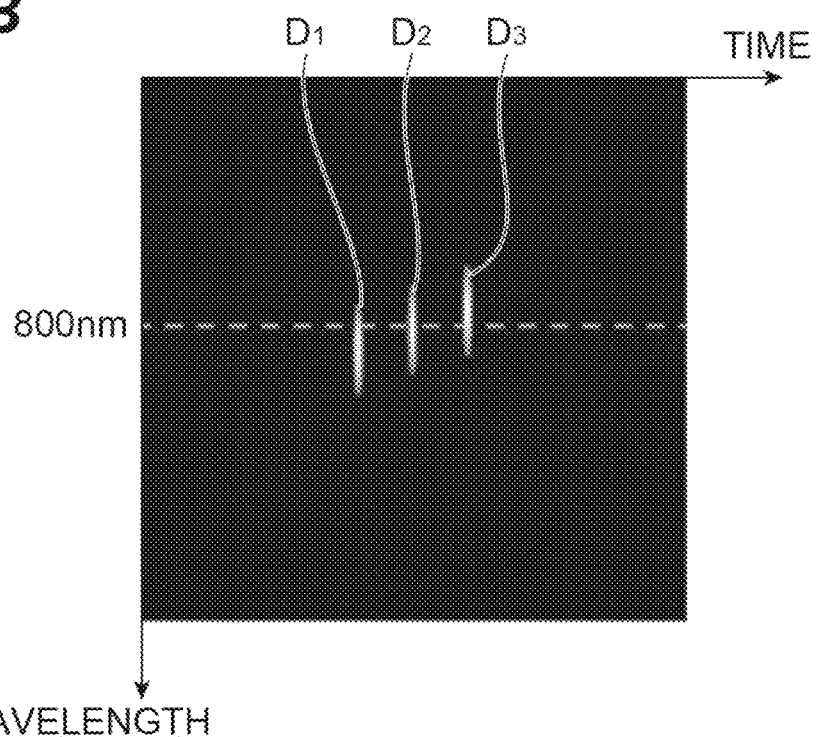

For instance, when it is desired to control only the temporal intensity waveform of the output light (it is simply desired to obtain triple pulses), it is not necessary to operate these domains $D_1$, $D_2$, and $D_3$. However, when it is desired to control the frequency (wavelength) band of each pulse, it is necessary to operate these domains $D_1$, $D_2$, and $D_3$. That is, as shown in FIG. 23B, moving the respective domains $D_1$, $D_2$, and $D_3$ independently in a direction along the wavelength axis (vertical axis) means changing the constituent frequency (wavelength band) of each pulse. The change of the constituent frequency (wavelength band) of each pulse is performed based on the temporal function $p_0(t)$.

For example, when the temporal function $p_0(t)$ is described so that the peak wavelength of the domain $D_2$ is fixed at 800 nm and the peak wavelengths of the domains $D_1$ and $D_3$ are moved in parallel by −2 nm and +2 nm, respectively, the spectrogram $SG_{IFTA}(\omega,t)$ changes to the target spectrogram $TargetSG_0(\omega,t)$ shown in FIG. 23B. For example, by performing such processing on the spectrogram, a target spectrogram in which the constituent frequency (wavelength band) of each pulse is arbitrarily controlled without changing the shape of the temporal intensity waveform.

Figure 24A:
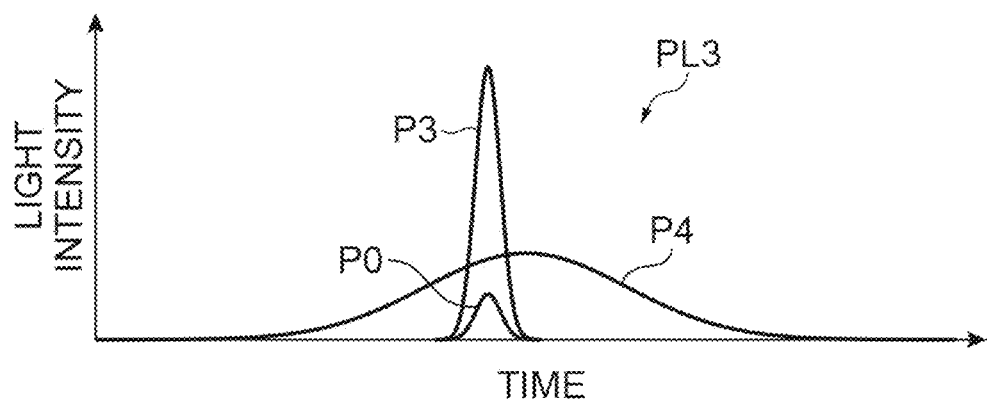
FIGS. 24A and 24B illustrate temporal waveforms of the third pulsed light and 0th-order light.

Points to note when the first pulsed light PL1, the second pulsed light PL2, and the third pulsed light PL3 are generated by the SLM 14 will be described. The SLM 14 outputs unmodulated 0th-order light in addition to 1st-order light, −1st-order light, and the like that are generated by phase modulation. Unlike the 1st-order light and the −1st-order light, the 0th-order light does not contribute to formation of the desired temporal waveform. Therefore, if pulsed light P0 constituted of the 0th-order light is temporally superimposed on the first pulsed light PL1, the second pulsed light PL2, and the third pulsed light PL3, the 0th-order light is detected together with the pump light and/or the probe light at the same time. For example, FIG. 24A illustrates a case in which the component pulse P3 of the third pulsed light PL3 is superimposed on the pulsed light P0 constituted of the 0th-order light. In such a case, the light intensity of the pump light and/or the probe light cannot be accurately detected.

Figure 24B:
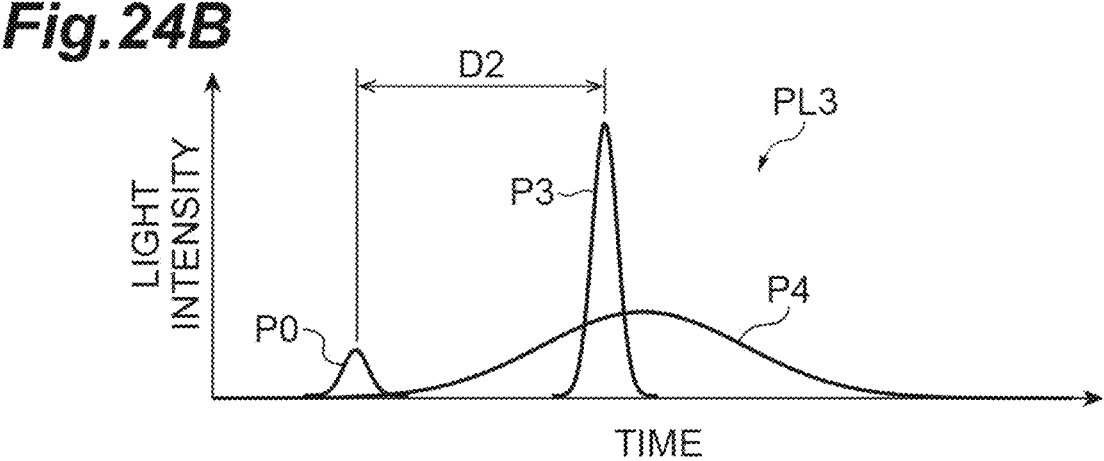

Therefore, it is better to generate the first pulsed light PL1, the second pulsed light PL2, and the third pulsed light PL3 in a manner of being temporally shifted from the pulsed light P0 constituted of the 0th-order light. For example, FIG. 24B illustrates a case in which the third pulsed light PL3 is generated after the pulsed light P0. The time interval between the intensity peak of each of the first pulsed light PL1 and the second pulsed light PL2 and the intensity peak of the pulsed light P0 is one time to 100 times the pulse widths W1 and W2 of the first pulsed light PL1 and the second pulsed light PL2, for example. The same as that, a time interval $D_2$ between the intensity peak of the third pulsed light PL3 (typically denotes the intensity peak of the component pulse P3) and the intensity peak of the pulsed light P0 is two times to 100 times the pulse width of the third pulsed light PL3 (typically denotes the pulse width W4 of component pulse P4), for example. In one Example, the time interval $D_2$ is −1.5 ps.

Figure 25:
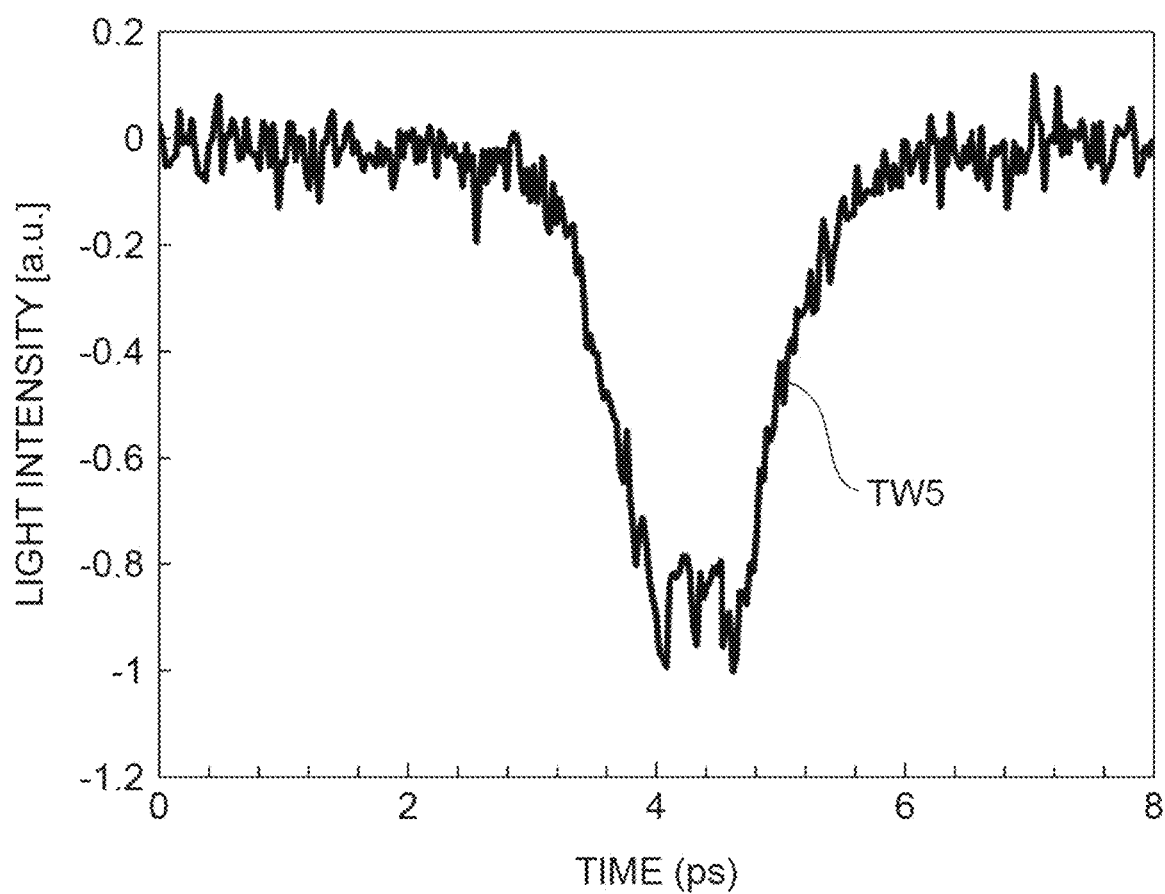
FIG. 25 is a graph illustrating an example of a temporal waveform obtained by subtracting the second temporal waveform and the first temporal waveform from the third temporal waveform and illustrates a case in which the first pulsed light, the second pulsed light, and the third pulsed light are temporally superimposed on 0th-order pulsed light.
Figure 26:
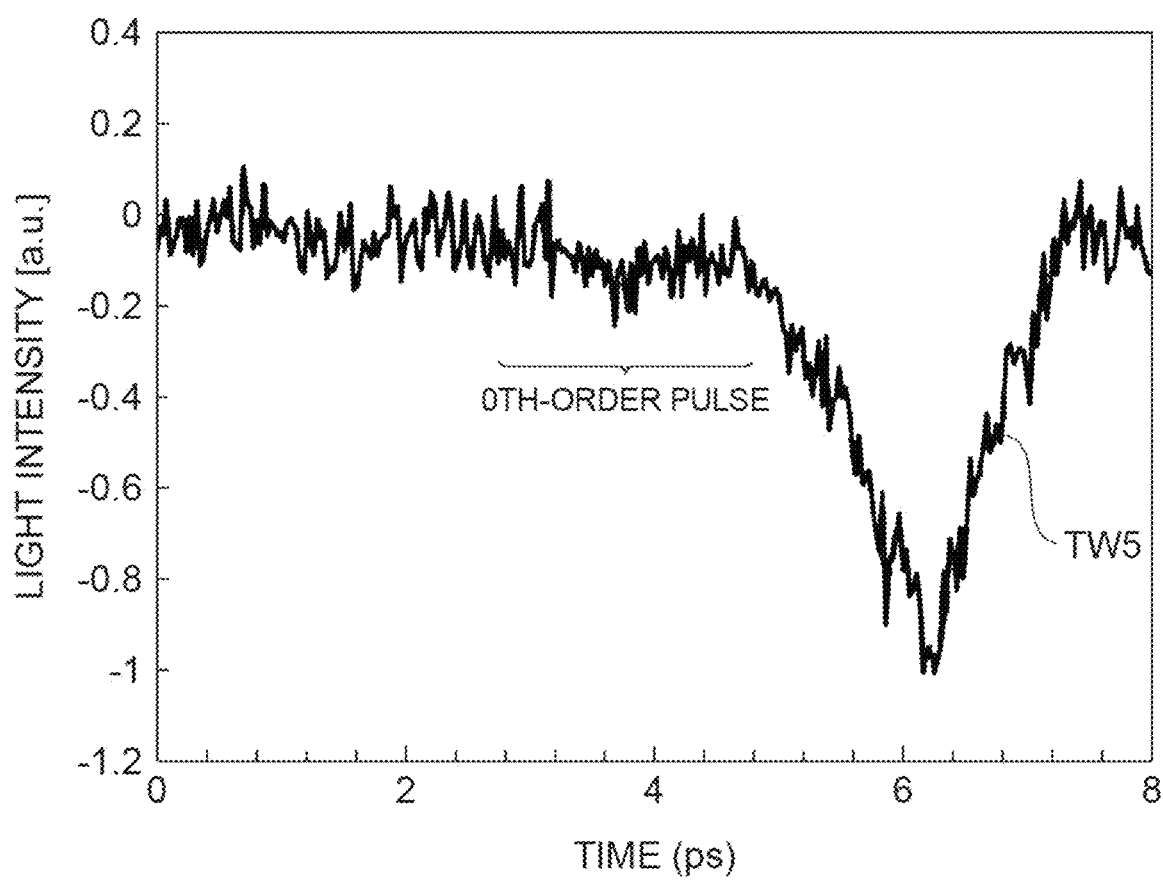
FIG. 26 is a graph illustrating an example of a temporal waveform obtained by subtracting the first temporal waveform and the second temporal waveform from the third temporal waveform.

FIG. 25 and FIG. 26 are graphs illustrating examples of the temporal waveform TW5 that is a temporal waveform obtained by subtracting the second temporal waveform TW2 and the first temporal waveform TW1 from the third temporal waveform TW3. FIG. 25 shows a case in which the first pulsed light PL1, the second pulsed light PL2, and the third pulsed light PL3 are temporally superimposed on the pulsed light P0. FIG. 26 shows a case in which the first pulsed light PL1, the second pulsed light PL2, and the third pulsed light PL3 are generated after 1.5 ps of the pulsed light P0. As shown in FIG. 25, when the first pulsed light PL1, the second pulsed light PL2, and the third pulsed light PL3 are temporally superimposed on the pulsed light P0, it is difficult to separate the component of the pulsed light P0 from the temporal waveform TW5. In contrast, as shown in FIG. 26, when the first pulsed light PL1, the second pulsed light PL2, and the third pulsed light PL3 are generated sufficiently behind the pulsed light P0, it is easy to separate the component of the pulsed light P0 from the temporal waveform TW5.

The first pulsed light PL1, the second pulsed light PL2, and the third pulsed light PL3 may be generated before the pulsed light P0 or may be generated after the pulsed light P0. However, since the time response of the sample B continues for a long time after the pump light is incident, the pulsed light P0 may be generated before the first pulsed light PL1, the second pulsed light PL2, and the third pulsed light PL3 (that is, the first pulsed light PL1, the second pulsed light PL2, and the third pulsed light PL3 may be generated after the pulsed light P0).

Figure 36:
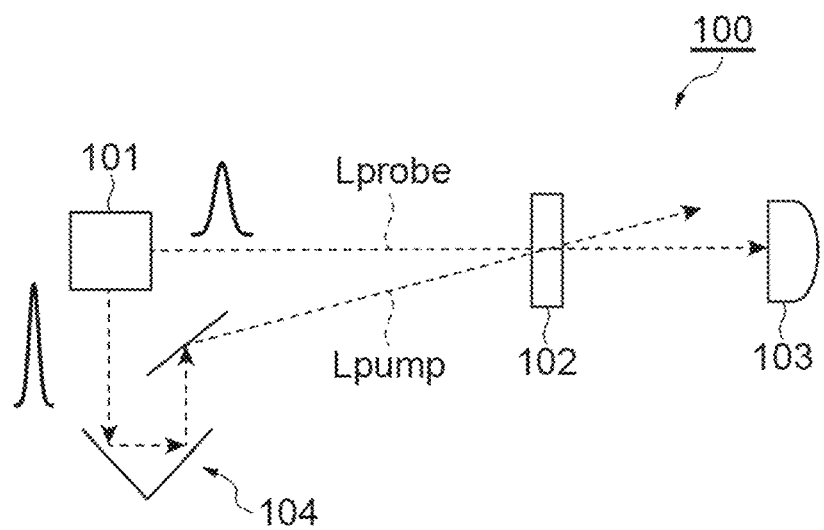
FIG. 36 is a simplified diagram of an apparatus used for a time-resolved spectroscopic measurement method in the related art.

Effects obtained by the time response measurement apparatus 1A and the time response measurement method according to the present embodiment described above will be described. As described above, in the apparatus 100 illustrated in FIG. 36, an optical axis of pump light Lpump when passing through a sample 102 is inclined with respect to an optical axis of probe light Lprobe. In this case, in order for an irradiation position of the pump light Lpump is aligned with an irradiation position of the probe light Lprobe inside the sample 102, it is necessary to adjust the irradiation positions thereof on a micrometer order. Therefore, accuracy of spatial and temporal optical adjustment is required, and thus work becomes very complicated.

In order to resolve that problem, it is conceivable that the optical axes of the pump light and the probe light be aligned with each other without being inclined and the pump light and the probe light be incident on the sample arranged on the aligned optical axis. Since it is not necessary to perform alignment work for the irradiation position of the pump light and the irradiation position of the probe light, measurement work can be simplified. However, in this case, the probe light is detected as light having the pump light superimposed thereon. Therefore, in order to measure the time response inside the sample caused by irradiation with the pump light by means of the probe light, it is desired to eliminate an influence of the pump light from the detection results. So, it is conceivable to remove only the pump light out of the pump light and the probe light that have passed through the sample B. However, since the light intensity of the pump light is usually much larger than the light intensity of the probe light. Therefore, even if only the pump light is attenuated using a wavelength filter for example, a light intensity of the remaining pump light cannot be disregarded with respect to the light intensity of the probe light.

In the time response measurement apparatus 1A and the time response measurement method of the present embodiment, the first pulsed light PL1 including a wavelength of the pump light, the second pulsed light PL2 including a wavelength of the probe light, and the third pulsed light PL3 including a wavelength of the pump light and a wavelength of the probe light are generated on the common optical axis. Further, after the first pulsed light PL1, the second pulsed light PL2, and the third pulsed light PL3 are incident on the sample B on the optical axis, the attenuation unit 4 attenuates the light intensity at a wavelength of the pump light. In this case, the first temporal waveform TW1 that is a temporal waveform of the first pulsed light PL1 having passed through the attenuation unit 4 includes only the temporal waveform of the attenuated pump light. The second temporal waveform TW2 that is a temporal waveform of the second pulsed light PL2 having passed through the attenuation unit 4 includes only the temporal waveform of the probe light when the pump light is not incident. The third temporal waveform TW3 that is a temporal waveform of the third pulsed light PL3 having passed through the attenuation unit 4 includes a temporal waveform in which the temporal waveform of the probe light when the pump light is incident and the temporal waveform of the attenuated pump light are superimposed. Based on these temporal waveforms, while an influence of the pump light is eliminated by calculation, the time response inside the sample B caused by incidence of the pump light can be obtained from the temporal waveform of the probe light.

Furthermore, according to the time response measurement apparatus 1A and the time response measurement method described above, the following operations and effects can also be achieved. In the apparatus 100 illustrated in FIG. 36, the optical axis of the pump light Lpump when passing through the sample 102 is inclined with respect to the optical axis of the probe light Lprobe. Therefore, a region inside the sample 102 in which property change occurs is limited to a region in which the optical axis of the pump light Lpump intersects with the optical axis of the probe light Lprobe, and the region is very small. Thus, an influence of property change in the corresponding region on the probe light Lprobe is also small. In contrast, in the time response measurement apparatus 1A of the present embodiment, the optical axis of the pump light is aligned with the optical axis of the probe light when the pump light Lpump and the probe light Lprobe pass through the sample B. Therefore, a portion in which the region inside the sample B in which the property change occurs that overlaps with the region irradiated with the probe light Lprobe extends along the optical axis of the probe light Lprobe, and a volume of the portion is larger than the portion in the case in FIG. 36. Thus, since an influence of property change in the portion on the probe light is also large, the time response inside the sample B can be more accurately obtained.

As in the present embodiment, in the analysis unit 6 and Step ST4, the time response of the sample B may be obtained based on a comparison between the second temporal waveform TW2 and the difference between the third temporal waveform TW3 and the first temporal waveform TW1. The temporal waveform of the probe light when the pump light is incident can be obtained while an influence of the pump light is eliminated by calculating the difference between the third temporal waveform TW3 and the first temporal waveform TW1. Further, by comparison between this difference and the second temporal waveform TW2, the temporal waveform of the probe light when the pump light is incident can be compared with the temporal waveform of the probe light when the pump light is not incident to obtain the time response inside the sample B more accurately.

As in the present embodiment, the pulse formation unit 3 may have the SLM 14 generating the first pulsed light PL1, the second pulsed light PL2, and the third pulsed light PL3 by simultaneously performing phase modulation and intensity modulation of the input pulsed light Pa. The same as that, in Steps ST1, ST2, and ST3, the first pulsed light PL1, the second pulsed light PL2, and the third pulsed light PL3 may be generated using the SLM 14 simultaneously performing phase modulation and intensity modulation of the input pulsed light Pa. In this case, the first pulsed light PL1, the second pulsed light PL2, and the third pulsed light PL3 can be selectively generated by simply changing the modulation pattern displayed in the SLM 14. Therefore, pulsed light generated in the pulse formation unit 3 can be easily changed between the first pulsed light PL1, the second pulsed light PL2, and the third pulsed light PL3.

As in the present embodiment, the waveform measurement unit 5 may have the correlation optical system 50. The correlation optical system 50 is disposed at a stage subsequent to the attenuation unit 4 and outputs the correlation light including a cross-correlation or an auto-correlation of the first pulsed light PL1, the correlation light including a cross-correlation or an auto-correlation of the second pulsed light PL2, and the correlation light including a cross-correlation or an auto-correlation of the third pulsed light PL3. Further, the analysis unit 6 may calculate the time response of the sample B based on the correlation light. In this case, even if the time widths of the first pulsed light PL1, the second pulsed light PL2, and the third pulsed light PL3 are on a femtosecond order or a picosecond order, for example, the temporal waveforms correlated with these pulse waveforms can be accurately measured. Hence, the property change inside the sample B can be accurately measured.

As in the present embodiment, the attenuation unit 4 may have the wavelength filter 41 having a cutoff band including a wavelength of the pump light and having a transmission band including a wavelength of the probe light. In this case, the light intensity at a wavelength of the pump light can be attenuated by a simple configuration.

As in the present embodiment, a time interval D1 between the intensity peak of the component pulse P3 and the intensity peak of the component pulse P4 may be made variable in the pulse formation unit 3. In that case, the time interval D1 between the component pulse P3 and the component pulse P4 can be easily set suitably in accordance with type or characteristics of the sample B.

As in the present embodiment, in the pulse formation unit 3, the ratio (W3/W4) of the pulse width W3 of the component pulse P3 to the pulse width W4 of the component pulse P4 may be made variable. In that case, the ratio between the pulse width of the pump light included in the third pulsed light PL3 and the pulse width of the probe light included in the third pulsed light PL3 can be easily set suitably in accordance with type or characteristics of the sample B.

As in the present embodiment, the pulse width W3 of the component pulse P3 may be smaller than the pulse width W4 of the component pulse P4. For example, it is conceivable to adopt a method in which the third pulsed light PL3 is detected a plurality of times while changing the time difference between the component pulse P3 and the component pulse P4 having the pulse width W4 approximately the same as the pulse width W3. According to the present embodiment, being different from such a method, measurement is completed by simply detecting the third pulsed light PL3 only once. Therefore, since the number of times of irradiation and the number of times of detection of the third pulsed light PL3 can be reduced, measurement work can be further simplified.

Figure 27:
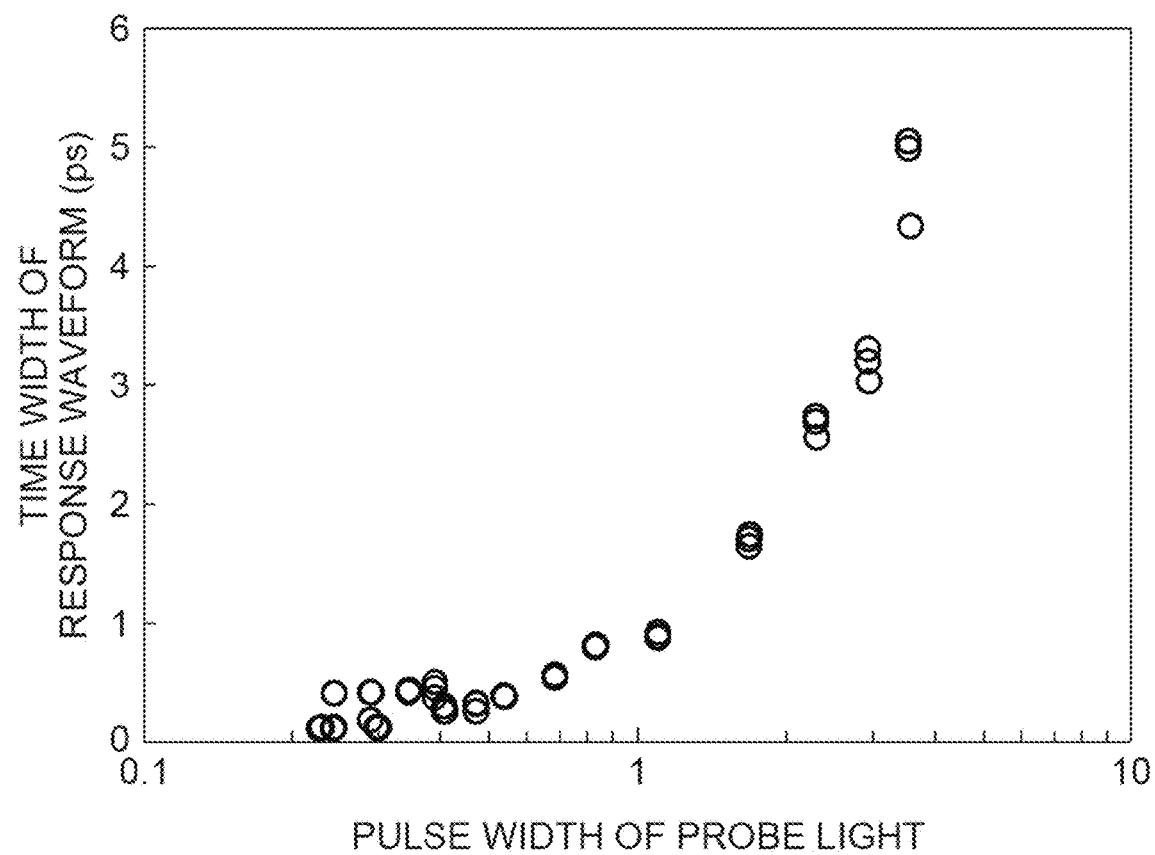
FIG. 27 is a graph illustrating a relationship between a pulse width of the probe light and a time width of a time response waveform of the sample.
Figure 28:
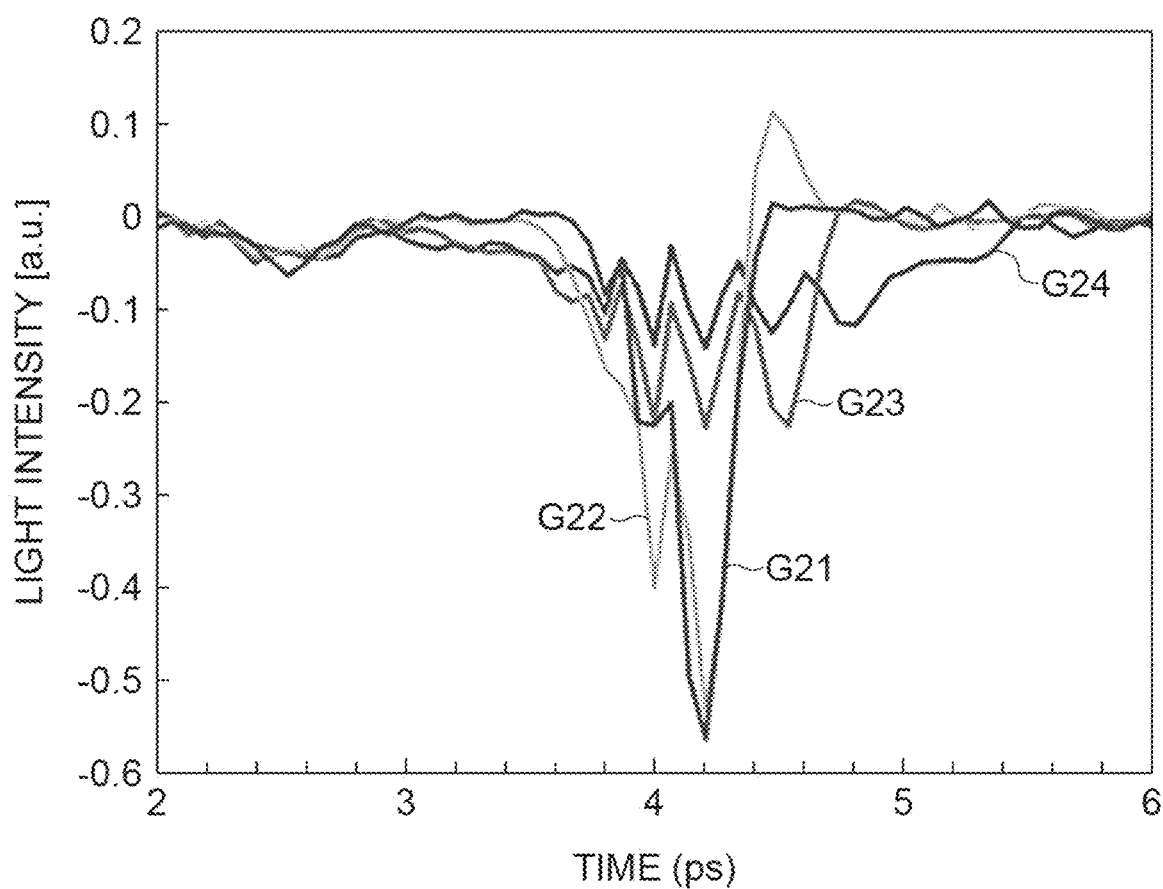
FIG. 28 is a graph illustrating a temporal waveform on which some plotting included in FIG. 27 is based.
Figure 29A:
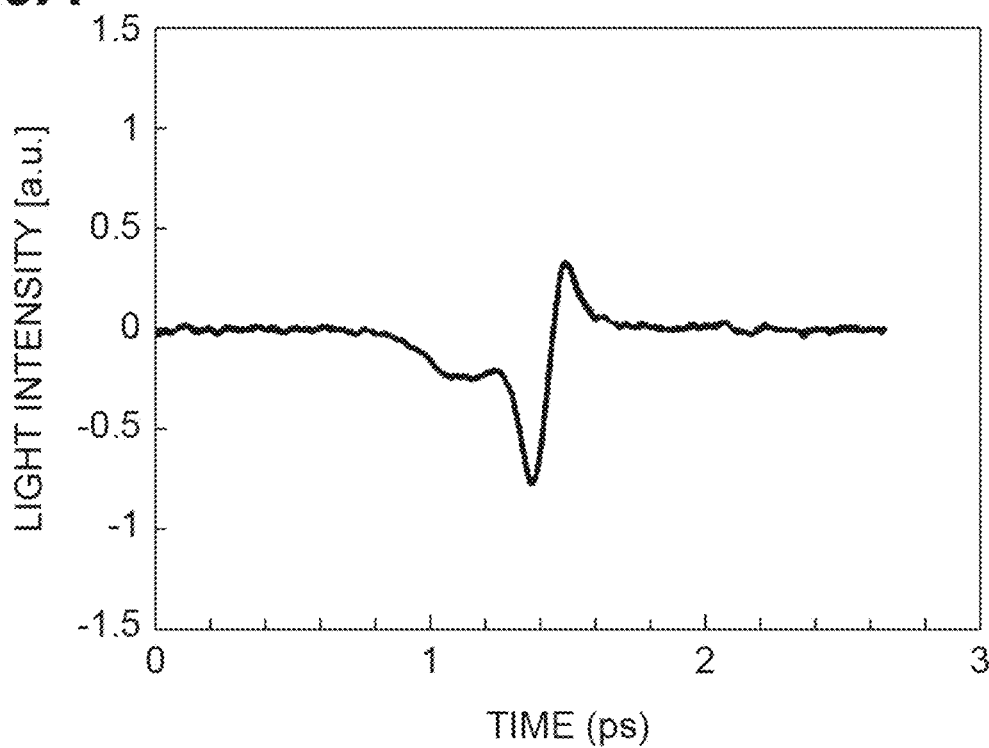
FIGS. 29A and 29B are graphs illustrating temporal waveforms obtained by subtracting temporal waveforms of the first pulsed light and the second pulsed light from a temporal waveform of the third pulsed light in a state in which a chirp amount of the probe light is respectively set to −5,000 fs$^2$ and −2,500 fs$^2$.
Figure 29B:
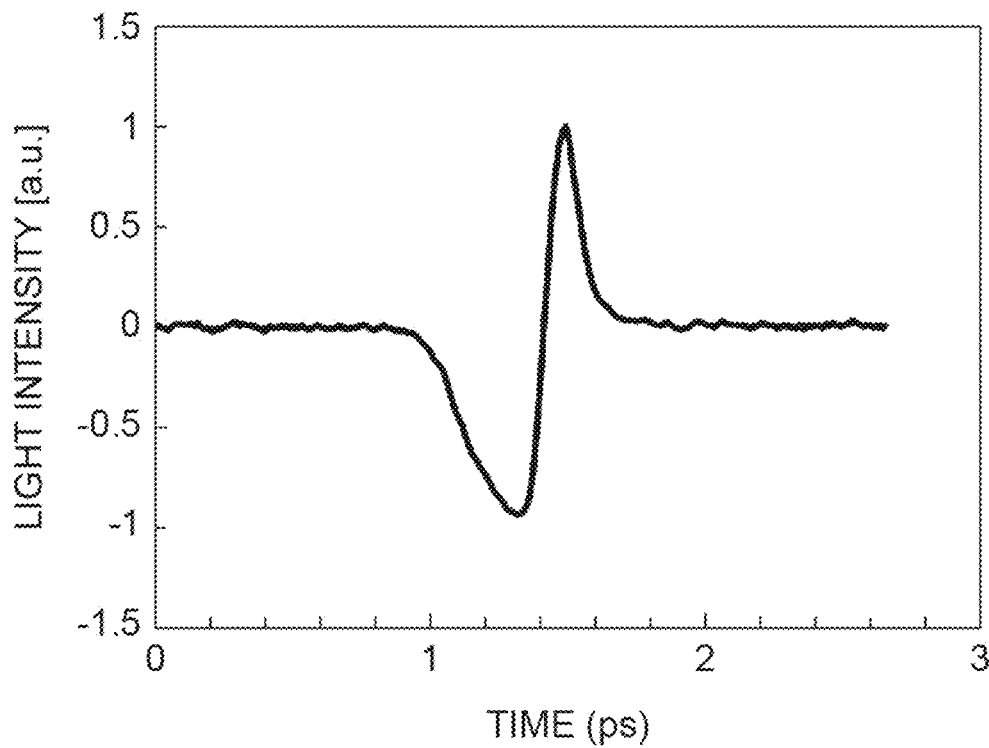
Figure 30A:
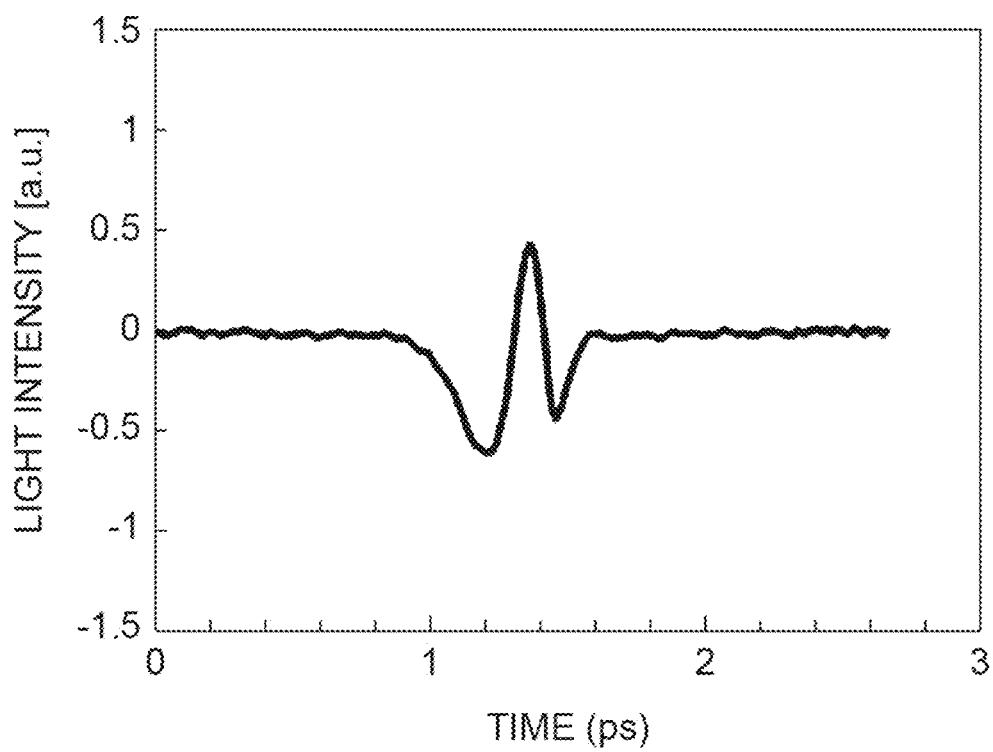
FIGS. 30A and 30B are graphs illustrating temporal waveforms obtained by subtracting temporal waveforms of the first pulsed light and the second pulsed light from a temporal waveform of the third pulsed light in a state in which a chirp amount of the probe light is respectively set to 0 fs$^2$ and 2,500 fs$^2$.
Figure 30B:
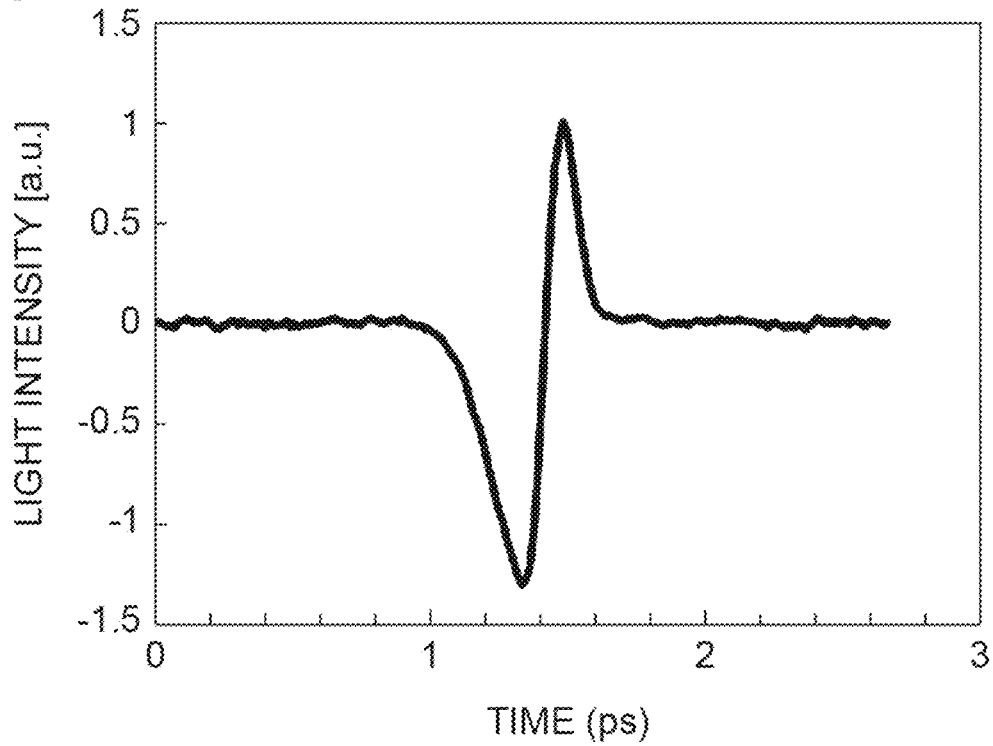
Figure 31A:
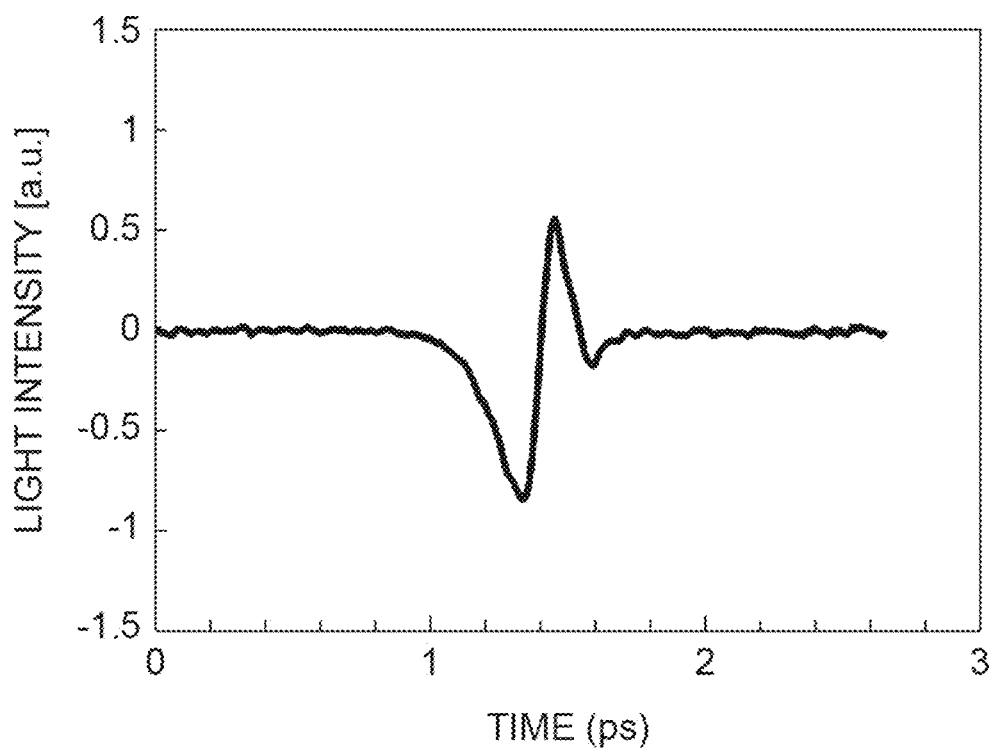
FIGS. 31A and 31B are graphs illustrating temporal waveforms obtained by subtracting temporal waveforms of the first pulsed light and the second pulsed light from a temporal waveform of the third pulsed light in a state in which a chirp amount of the probe light is respectively set to 5,000 fs$^2$ and 10,000 fs$^2$.
Figure 31B:
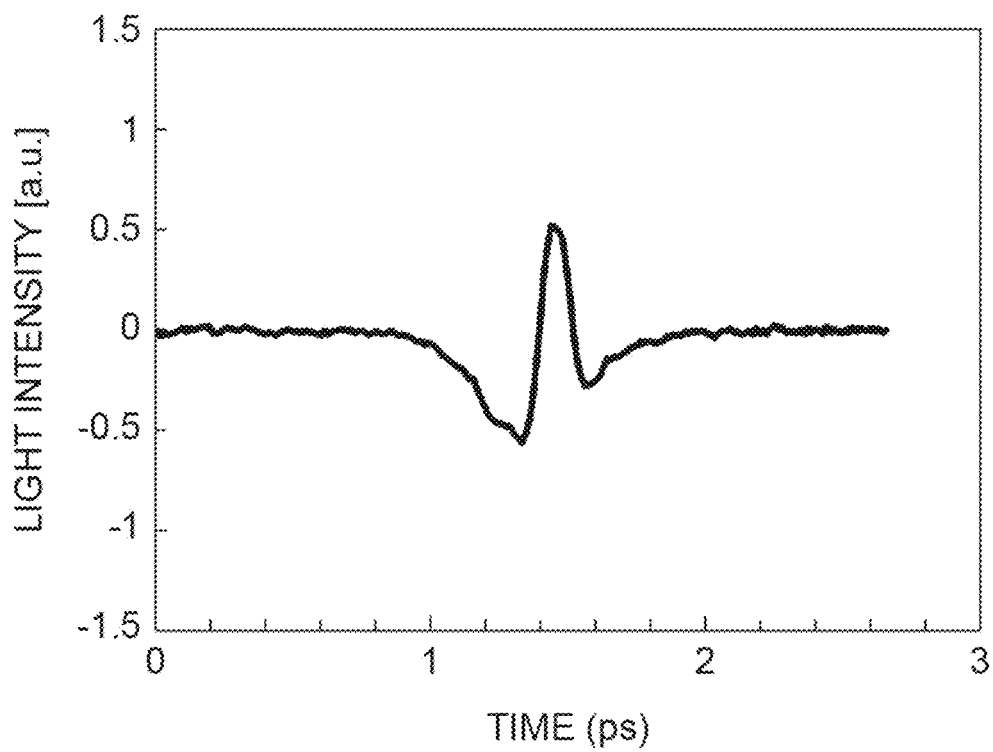

Here, an example of a method for determining the pulse width of the probe light, that is, the pulse width W2 of the second pulsed light PL2 and the pulse width W4 of component pulse P4 will be described. FIG. 27 is a graph illustrating a relationship between the pulse widths W2 and W4 and a time width Δt of the time response waveform of the sample B included in the temporal waveform TW5. FIG. 27 shows the pulse widths W2 and W4 (ps) on the horizontal axis, and the time width Δt (ps) on the vertical axis. FIG. 27 shows experimental results obtained by using a ZnTe crystal having a thickness of 1 mm as the sample B. FIG. 28 is a graph illustrating the temporal waveform TW5 on which some plotting included in FIG. 27 is based. FIG. 28 shows the time (ps) on the horizontal axis, and the light intensity (arbitrary units) on the vertical axis. In FIG. 28, the line G21 shows a result obtained by setting chirp amounts of the second pulsed light PL2 and the component pulse P4 to 15,000 fs$^2$. The line G22 shows a result obtained by setting chirp amounts of the second pulsed light PL2 and the component pulse P4 to 20,000 fs$^2$. The line G23 shows a result obtained by setting chirp amounts of the second pulsed light PL2 and the component pulse P4 to 40,000 fs$^2$. The line G24 shows a result obtained by setting chirp amounts of the second pulsed light PL2 and the component pulse P4 to 60,000 fs$^2$. The larger the chirp amount, the larger the pulse width.

With reference to FIG. 27, as the pulse widths W2 and W4 of the probe light increase, the time width Δt of the time response waveform of the sample B substantially increases. However, the time width Δt has substantially a constant value within a range in which the pulse widths W2 and W4 of the probe light are 400 fs to 600 fs. That is, it can be said that the temporal waveform TW5 does not change substantially within the range. The time width Δt within the range is 200 fs. From that, the time response of the sample B can be more accurately measured by determining the pulse widths W2 and W4 of the probe light within a range of two to three times the time response width of the sample B.

[First Modification]

The time response measurement apparatus 1A according to the above embodiment measures only the time response of the sample B. As described below, the time response measurement apparatus 1A may also measure a third-order nonlinear coefficient χ (3) of the sample B together by changing the pulse widths W2 and W4 of the probe light.

FIGS. 29A, 29B, 30A, 30B, 31A, and 31B are graphs illustrating the temporal waveform TW5 in cases in which the chirp amounts of the second pulsed light PL2 and the component pulse P4 are individually set to −5,000 fs$^2$, −2,500 fs$^2$, 0 fs$^2$, 2,500 fs$^2$, 5,000 fs$^2$, and 10,000 fs$^2$. The diagrams show the time (ps) on the horizontal axis and the light intensity (arbitrary units) on the vertical axis. With reference to the diagrams, it is ascertained that the phase of the time response waveform of the sample B changes in accordance with change in chirp amounts of the second pulsed light PL2 and the component pulse P4, that is, change in pulse widths W2 and W4 of the probe light. Such a phenomenon remarkably occurs when the pulse widths W2 and W4 of the probe light are relatively small (for example, 400 fs or shorter).

When the pump light is incident on the sample B, a refractive index of the sample B changes in the irradiation region thereof. As a result, the temporal waveform of the probe light is distorted when passing through the sample B.

Such a phenomenon is referred to as cross-phase modulation (XPM). The magnitude of XPM depends on the third-order nonlinear coefficient $\chi$ (3) of the sample B. It is conceivable that a phase change of the time response waveform of the sample B be caused by the XPM. Therefore, the third-order nonlinear coefficient $\chi$ (3) of the sample B can be measured by detecting the phase change of the time response waveform of the sample B included in the temporal waveform TW5. The analysis unit 6 shown in FIG. 1 may calculate the third-order nonlinear coefficient $\chi$ (3) of the sample B based on the temporal waveform TW5. Information being a calculation source of the third-order nonlinear coefficient $\chi$ (3) is not limited to the temporal waveform TW5 and may be various types of information derived from the first temporal waveform TW1, the second temporal waveform TW2, and the third temporal waveform TW3.

[Second Modification]

Figure 32:
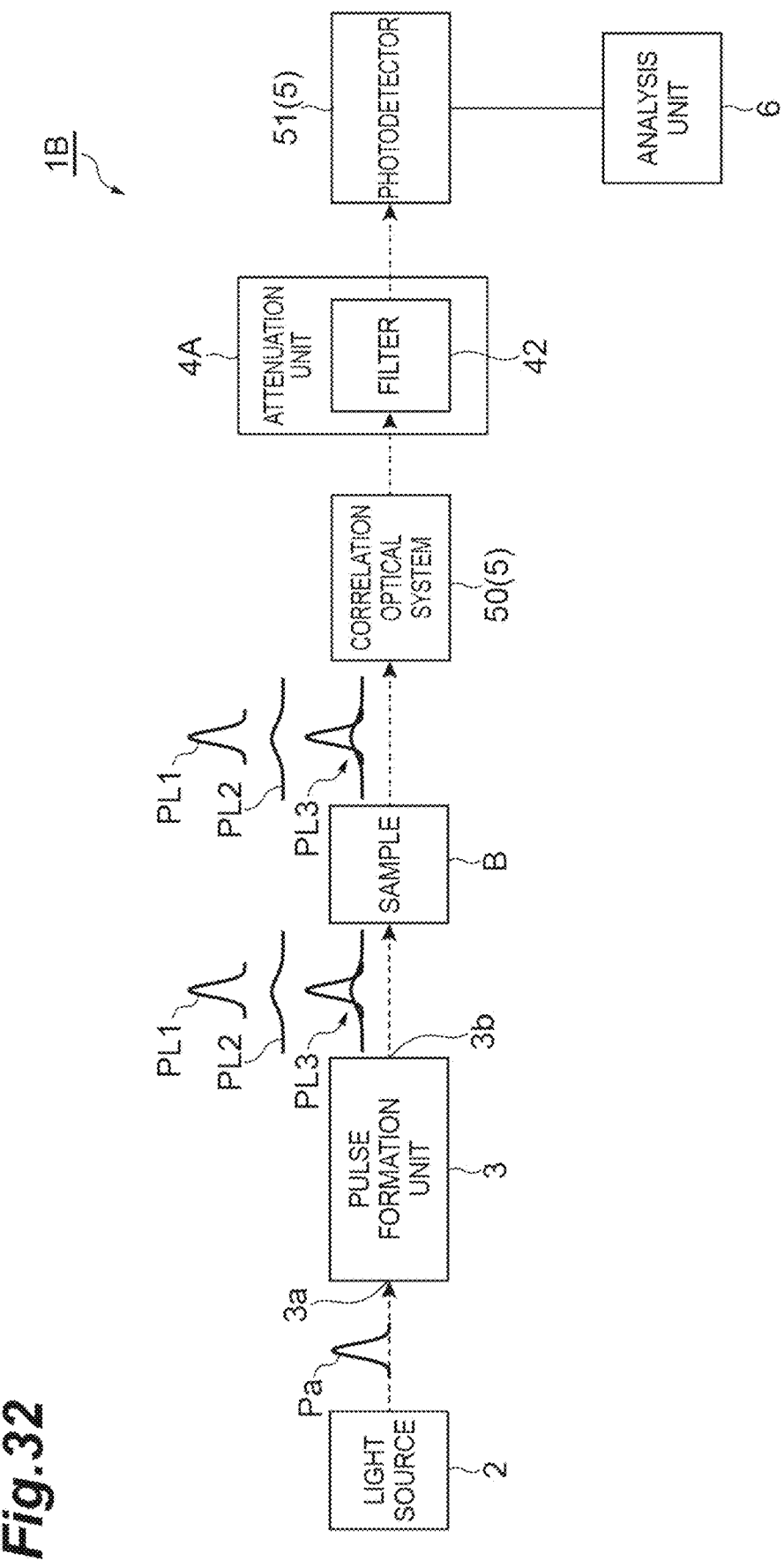
FIG. 32 is a diagram illustrating a configuration of a time response measurement apparatus according to a second modification of the present disclosure.

FIG. 32 is a diagram illustrating a configuration of a time response measurement apparatus 1B according to a second modification of the present disclosure. In the time response measurement apparatus 1B, arrangement of the correlation optical system 50 differs from that in the time response measurement apparatus 1A of the foregoing embodiment. That is, in the time response measurement apparatus 1B, the correlation optical system 50 is arranged on an optical path between the sample B and an attenuation unit 4A. In that case, the correlation optical system 50 receives the first pulsed light PL1, the second pulsed light PL2, and the third pulsed light PL3 output from the sample B and generates correlation light of each of the first pulsed light PL1, the second pulsed light PL2, and the third pulsed light PL3 before attenuation.

These correlation lights reach the attenuation unit 4A. The attenuation unit 4A passes the correlation lights output from the correlation optical system 50. At that time, the attenuation unit 4A transmits the wavelength component caused by the probe light, which is included in the correlation light of each of the third pulse light PL2 and the second pulse light PL3, typically is the correlation light of each of the second pulse light PL2 and the component pulse P4, substantially without being attenuated. Further, the attenuation unit 4A attenuates the wavelength component caused by the pump light, which is included in the correlation light of each of the first pulsed light PL1 and the third pulsed light PL3, typically, is the correlation light of each of the first pulsed light PL1 and the component pulse P3. In other words, in the attenuation unit 4A, an attenuation rate with respect to the wavelength component of the correlation light caused by the pump light is larger than an attenuation rate with respect to the wavelength component of the correlation light caused by the probe light. In an example, the attenuation unit 4A has a wavelength filter 42. The wavelength filter 42 has a cutoff band including a wavelength of the correlation light caused by the pump light and has a transmission band including a wavelength of the correlation light caused by the probe light. The wavelength filter 42 may be any of a band-pass filter, a high-pass filter, and a low-pass filter.

[Third Modification]

Figure 33:
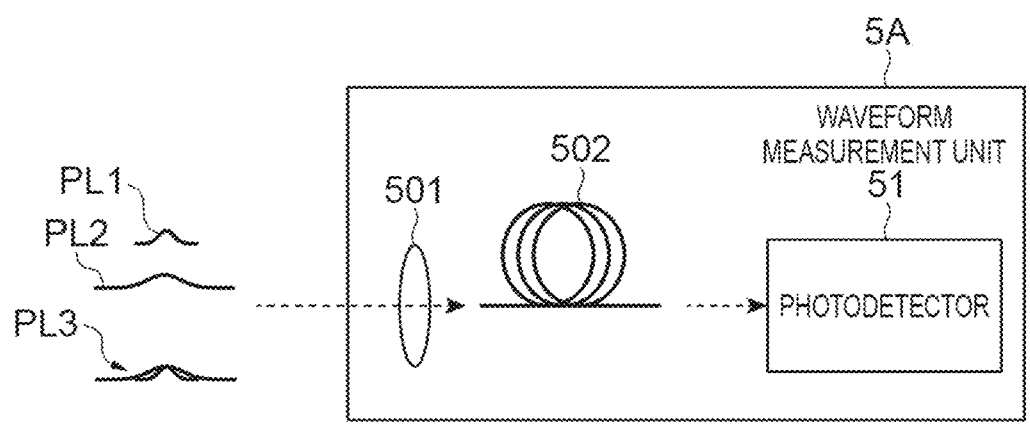
FIG. 33 is a diagram schematically illustrating a configuration of a waveform measurement unit according to a third modification of the present disclosure.

FIG. 33 is a diagram schematically illustrating a configuration of a waveform measurement unit 5A according to a third modification of the present disclosure. The time response measurement apparatus 1A of the foregoing embodiment may include the waveform measurement unit 5A in place of the waveform measurement unit 5. The waveform measurement unit 5A has an elongated optical fiber 502 as an optical component in place of the correlation optical system 50. The elongated optical fiber 502 is an optical fiber having a sufficient length (for example, a length of several kilometers). The elongated optical fiber 502 is arranged at a stage subsequent to the attenuation unit 4, and one end of the elongated optical fiber 502 is optically coupled to the attenuation unit 4 via a lens 501. The other end of the elongated optical fiber 502 is optically coupled with the photodetector 51.

The pulsed light PL having passed through the attenuation unit 4 is incident on the elongated optical fiber 502. The elongated optical fiber 502 extends the time width of the pulsed light PL propagated inside the elongated optical fiber 502. For example, the elongated optical fiber 502 extends the pulse width on a femtosecond order to a nanosecond order. The temporal waveforms of the first pulsed light PL1, the second pulsed light PL2, and the third pulsed light PL3 having extended time widths are detected by the photodetector 51. Since the length and the refractive index of the elongated optical fiber 502 are already known, the analysis unit 6 calculates the temporal waveforms of the first pulsed light PL1, the second pulsed light PL2, and the third pulsed light PL3 before the time widths are extended, from each of detected temporal waveforms. The analysis unit 6 measures the time response of the sample B based on the temporal waveforms. The time response measurement apparatus 1B according to the second modification may have the elongated optical fiber 502 as an optical component in place of the correlation optical system 50. That is, the elongated optical fiber 502 may be arranged on the optical path between the sample B and the attenuation unit 4.

As in the present modification, the waveform measurement unit 5A may have an optical component (elongated optical fiber 502) which is arranged between the sample B and the attenuation unit 4 or at a stage subsequent to the attenuation unit 4 and extends the time widths of the first pulsed light PL1, the second pulsed light PL2, and the third pulsed light PL3. In this case, for example, even if the time widths of the first pulsed light PL1, the second pulsed light PL2, and the third pulsed light PL3 are on a femtosecond order or a picosecond order, the temporal waveforms thereof can be accurately measured. Hence, time response of the sample B can be accurately measured.

According to the present modification, since the first pulsed light PL1, the second pulsed light PL2, and the third pulsed light PL3 having extended time widths are detected, it is not necessary to use a complicated optical system such as a correlation optical system. When a correlation optical system is used, it is necessary to perform detection while setting a plurality of time differences between reference pulsed light and each of the first pulsed light PL1, the second pulsed light PL2, and the third pulsed light PL3. However, according to the present modification, the temporal waveform of the first pulsed light PL1, the second pulsed light PL2, and the third pulsed light PL3 can be detected by performing a fewer times of detection. As a result, measurement work can be further simplified.

[Fourth modification]

Figure 34:
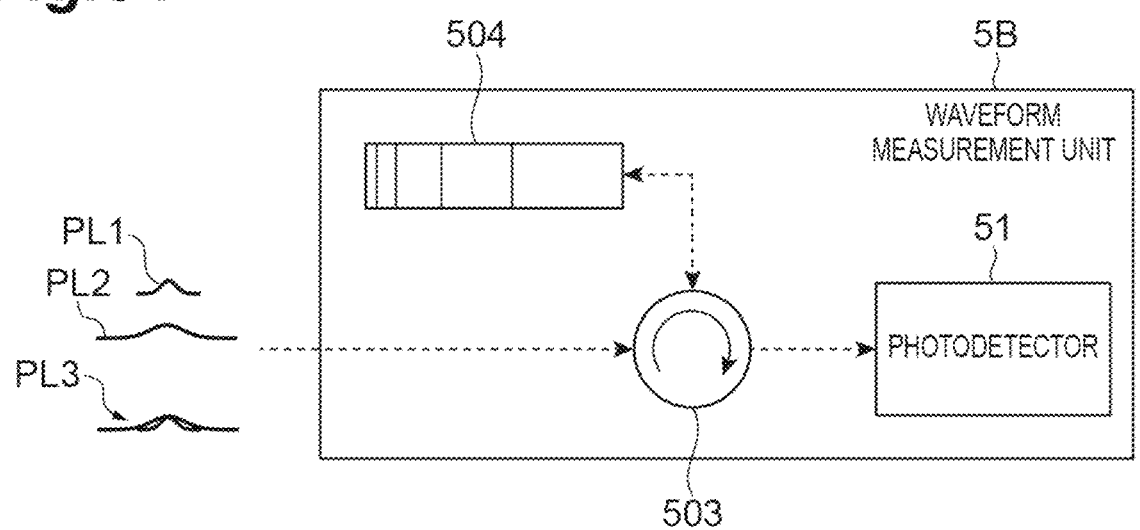
FIG. 34 is a diagram schematically illustrating a configuration of a waveform measurement unit according to a fourth modification of the present disclosure.

FIG. 34 is a diagram schematically illustrating a configuration of the waveform measurement unit 5B according to a fourth modification of the present disclosure. An optical component for extending the time widths of the first pulsed light PL1, the second pulsed light PL2, and the third pulsed light PL3 is not limited to the elongated optical fiber 502. For example, as shown in FIG. 34, a chirped fiber Bragg grating (CFBG) 504 may be arranged in place of the elongated optical fiber 502 (or together with the elongated optical fiber 502). The CFBG 504 is an optical fiber in which a diffraction grating pattern is described. In an example, the CFBG 504 is arranged together with an optical circulator 503 between the attenuation unit 4 and the photodetector 51. A first port of the optical circulator 503 is optically coupled with the attenuation unit 4, and the first pulsed light PL1, the second pulsed light PL2, and the third pulsed light PL3 that have passed through the sample B and the attenuation unit 4 are input to the first port. A second port of the optical circulator 503 is optically coupled with the CFBG 504. The first pulsed light PL1, the second pulsed light PL2, and the third pulsed light PL3 input to the first port of the optical circulator 503 are output from the second port of the optical circulator 503 and input to the CFBG 504. The same as the elongated optical fiber 502 described above, the CFBG 504 extends the time widths of the first pulsed light PL1, the second pulsed light PL2, and the third pulsed light PL3, for example, in nanosecond order. The first pulsed light PL1, the second pulsed light PL2, and the third pulsed light PL3 that have extended time widths are input to the second port of the optical circulator 503 again. A third port of the optical circulator 503 is optically coupled to the photodetector 51, and the first pulsed light PL1, the second pulsed light PL2, and the third pulsed light PL3 that have extended time widths are output from the third port and input to the photodetector 51. The first port of the optical circulator 503 may be optically coupled with the sample B, and the third port may be optically coupled with the attenuation unit 4.

According to the configuration of the present modification, the same effects as those of the third modification described above can be achieved. Furthermore, since the CFBG 504 is much smaller than the elongated optical fiber 502, the time response measurement apparatus can be miniaturized. A propagation loss can be reduced compared to the elongated optical fiber 502.

[Fifth Modification]

The waveform measurement unit 5 of the foregoing embodiment may have a spectral interference optical system as an optical system in place of the correlation optical system 50. The spectral interference optical system divides the probe light into two and generates interfere fringes by causing the two divided probe light to interfere with each other. Further, the interfere fringes are measured using a spectrometer. In that case, a signal including the time response of the sample B can be obtained by analyzing a difference between an interference fringe of the second pulse light PL2 which is the probe light when the pump light is not incident on the sample B, and the interference fringe of the component pulse P4 which is the probe light when the pump light is incident on the sample B.

[Sixth Modification]

Figure 35:
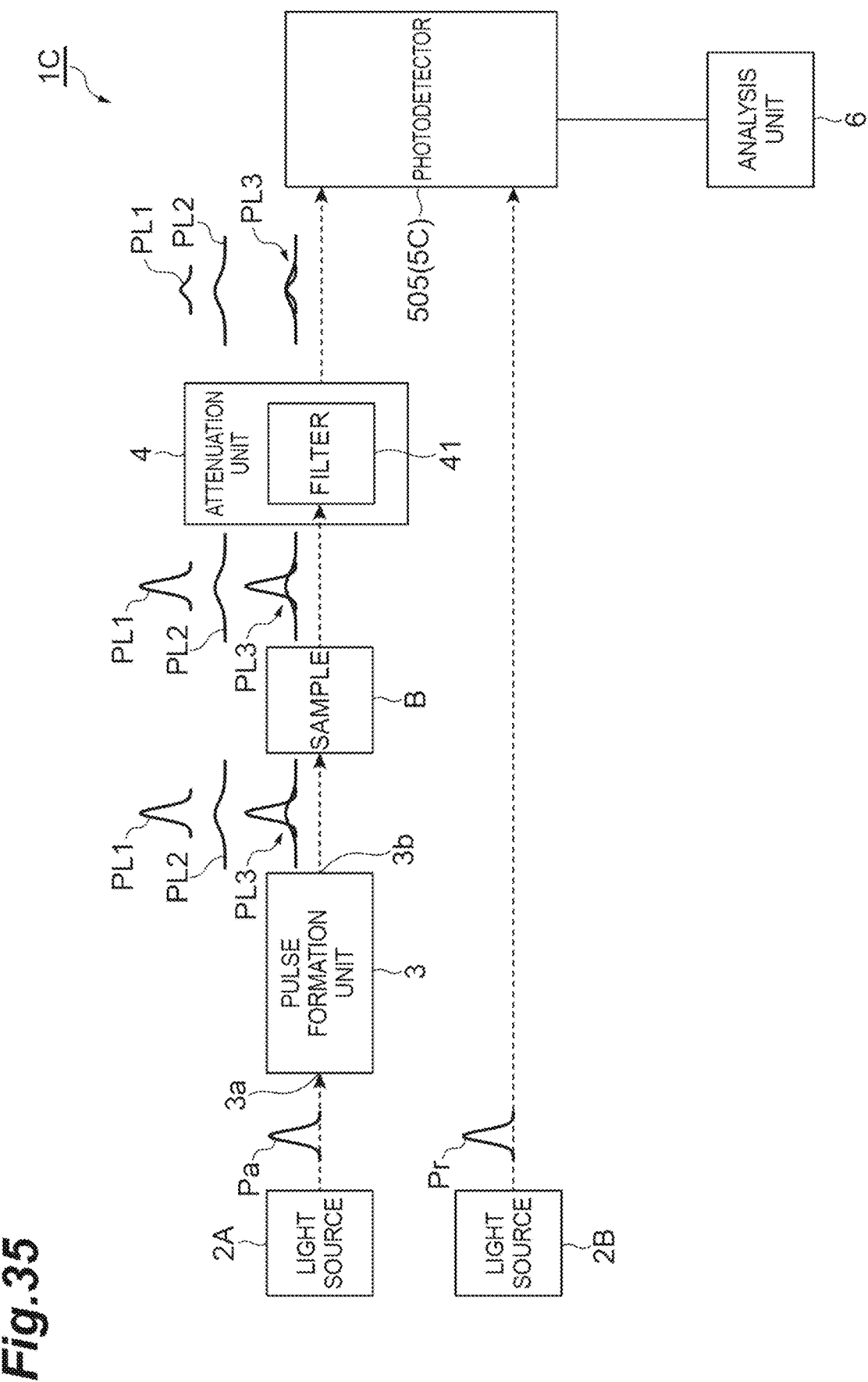
FIG. 35 is a diagram schematically illustrating a configuration of a time response measurement apparatus according to a sixth modification of the present disclosure.

FIG. 35 is a diagram schematically illustrating a configuration of a time response measurement apparatus 1C according to a sixth modification of the present disclosure. The time response measurement apparatus 1C differs from the time response measurement apparatus 1A according to the foregoing embodiment in utilizing a dual comb spectral dispersion technology in place of the correlation optical system 50. That is, the time response measurement apparatus 1C according to the present modification includes a waveform measurement unit 5C in place of the waveform measurement unit 5 of the foregoing embodiment and includes a first pulsed laser light source 2A and a second pulsed laser light source 2B in place of the pulsed laser light source 2 of the foregoing embodiment.

Both the first pulsed laser light source 2A and the second pulsed laser light source 2B are optical frequency comb light sources in which a pulse cycle and an offset frequency are made stable and regularly outputs a femtosecond light pulse constituted of a group of modes (group of comb modes) arranged at equal frequency intervals. The phases of the first pulsed laser light source 2A and the second pulsed laser light source 2B are synchronized, and the periods thereof for outputting a femtosecond light pulse are slightly different from each other. The first pulsed laser light source 2A outputs the pulsed light Pa, and the second pulsed laser light source 2B outputs the reference pulsed light Pr. The pulsed light Pa output from the first pulsed laser light source 2A is transformed into the first pulsed light PL1, the second pulsed light PL2, and the third pulsed light PL3 by the pulse formation unit 3. After passing through the sample B and the attenuation unit 4, the first pulsed light PL1, the second pulsed light PL2, and the third pulsed light PL3 are input to the waveform measurement unit 5C.

Meanwhile, the reference pulsed light Pr output from the second pulsed laser light source 2B is directly input to the waveform measurement unit 5C without going through the pulse formation unit 3, the sample B, and the attenuation unit 4. At that time, the first pulsed light PL1, the second pulsed light PL2, and the third pulsed light PL3 interfere with the reference pulsed light Pr and are transformed into interference light. The waveform measurement unit 5C has a photodetector 505. The photodetector 505 detects the interference light of each of the first pulsed light PL1, the second pulsed light PL2, and the third pulsed light PL3. The interference light is correlation light including a cross-correlation of each of the first pulsed light PL1, the second pulsed light PL2, and the third pulsed light PL3. Therefore, the second pulsed laser light source 2B, the optical system guiding the first pulsed light PL1, the second pulsed light PL2, and the third pulsed light PL3 to the waveform measurement unit 5C, and the optical system guiding the reference pulsed light Pr to the waveform measurement unit 5C constitute a correlation optical system.

Here, both the first pulsed laser light source 2A and the second pulsed laser light source 2B periodically output a femtosecond light pulse, and the periods thereof are slightly different from each other. Therefore, a difference occurs between a timing when each of the first pulsed light PL1, the second pulsed light PL2, and the third pulsed light PL3 is input to the photodetector 505 and a timing when the reference pulsed light Pr is input to the photodetector 505, and the difference changes over time. Therefore, the photodetector 505 consecutively outputs an electrical signal representing an intensity of correlation light while changing a time delay of the reference pulsed light Pr to each of the first pulsed light PL1, the second pulsed light PL2, and the third pulsed light PL3. As a result, an electrical signal corresponding to an optical signal obtained by sampling the temporal waveform of each of the first pulsed light PL1, the second pulsed light PL2, and the third pulsed light PL3 at different timings can be consecutively acquired. The waveform measurement unit 5C measures the temporal waveforms of the first pulsed light PL1, the second pulsed light PL2, and the third pulsed light PL3 by processing the electrical signals which have been consecutively acquired in this manner.

In the correlation optical system 50B illustrated in FIG. 12, in order to perform sampling of the temporal waveforms of the first pulsed light PL1, the second pulsed light PL2, and the third pulsed light PL3, it is necessary to change the optical path length (that is, time delay) of the reference pulsed light Pr by moving the mirror 58 mounted on the movable stage 59. Since there is limitation on a movement length and a movement speed of the mirror 58, there is also limitation on a dynamic range of time response measurement and a time required for time response measurement.

In contrast, in the time response measurement apparatus 1C according to the present modification, since no movable reflector is used, compared to the time response measurement apparatus 1A including the correlation optical system 50B illustrated in FIG. 12, the dynamic range of time response measurement can be extended, and the time required for time response measurement can be shortened.

The time response measurement apparatus and the time response measurement method according to the present disclosure are not limited to the embodiment described above, and various other modifications can be made. For example, the embodiment and each of the modifications described above may be combined in accordance with necessary purpose and effect.

What is claimed is:

1. A time response measurement apparatus for measuring a time response inside a sample caused by irradiation with light, the time response measurement apparatus comprising:
    a pulse shaper configured to generate first pulsed light including a wavelength of pump light, second pulsed light including a wavelength of probe light, and third pulsed light including the wavelength of the pump light and the wavelength of the probe light, on a common optical axis;
    an optical filter configured to transmit the first pulsed light, the second pulsed light, and the third pulsed light output from the sample arranged on the optical axis after being incident on the sample, an attenuation rate of the optical filter with respect to the wavelength of the pump light being larger than an attenuation rate of the optical filter with respect to the wavelength of the probe light;
    a waveform measurement unit including a photodetector and configured to measure a first temporal waveform that is a temporal waveform of the first pulsed light having passed through the optical filter, a second temporal waveform that is a temporal waveform of the second pulsed light having passed through the optical filter, and a third temporal waveform that is a temporal waveform of the third pulsed light having passed through the optical filter; and
    an analyzer configured to obtain the time response of the sample based on the first temporal waveform, the second temporal waveform, and the third temporal waveform.

2. The time response measurement apparatus according to claim 1,
    wherein the analyzer configured to obtain a time response of the sample based on a comparison between the second temporal waveform and a difference between the third temporal waveform and the first temporal waveform.

3. The time response measurement apparatus according to claim 1,
    wherein the pulse shaper has a spatial light modulator that is configured to generate the first pulsed light, the second pulsed light, and the third pulsed light by simultaneously performing phase modulation and intensity modulation of input pulsed light.

4. The time response measurement apparatus according to claim 1,
    wherein in the pulse shaper, a time interval between an intensity peak of a component of the wavelength of the pump light included in the third pulsed light and an intensity peak of a component of the wavelength of the probe light included in the third pulsed light is variable.

5. The time response measurement apparatus according to claim 1,
    wherein in the pulse shaper, a ratio of a pulse width of a component of the wavelength of the pump light included in the third pulsed light to a pulse width of a component of the wavelength of the probe light included in the third pulsed light is variable.

6. The time response measurement apparatus according to claim 1,
    wherein a pulse width of a component of the wavelength of the pump light included in the third pulsed light is smaller than a pulse width of a component of the wavelength of the probe light included in the third pulsed light.

7. The time response measurement apparatus according to claim 1,
    wherein the waveform measurement unit has a correlation optical system arranged between the sample and the optical filter or at a stage subsequent to the optical filter and transforming the first pulsed light, the second pulsed light, and the third pulsed light into correlation light including a cross-correlation or an auto-correlation, and
    wherein the analyzer configured to obtain the time response of the sample based on the first pulsed light, the second pulsed light, and the third pulsed light that are transformed into the correlation light.

8. The time response measurement apparatus according to claim 1,
    wherein the waveform measurement unit has an elongated optical fiber arranged between the sample and the optical filter or at a stage subsequent to the optical filter and extending time widths of the first pulsed light, the second pulsed light, and the third pulsed light.

9. The time response measurement apparatus according to claim 1,
    wherein the optical filter has a wavelength filter having a cutoff band including the wavelength of the pump light and a transmission band including the wavelength of the probe light.

10. A time response measurement method for measuring a time response inside a sample caused by irradiation with light, the time response measurement method comprising:
    irradiating the sample with first pulsed light including a wavelength of pump light along a predetermined optical axis, and measuring a first temporal waveform that is a temporal waveform of the first pulsed light output from the sample and having passed through an optical filter attenuating a light intensity in a wavelength of the pump light, an attenuation rate of the optical filter with respect to the wavelength of the pump light being larger than an attenuation rate of the optical filter with respect to a wavelength of probe light;
    irradiating the sample with second pulsed light including the wavelength of the probe light along the predetermined optical axis, and measuring a second temporal waveform that is a temporal waveform of the second pulsed light output from the sample and having passed through the optical filter;
    irradiating the sample with third pulsed light including the wavelength of the pump light and the wavelength of the probe light along the predetermined optical axis, and measuring a third temporal waveform that is a temporal waveform of the third pulsed light output from the sample and having passed through the optical filter; and obtaining the time response of the sample based on the first temporal waveform, the second temporal waveform, and the third temporal waveform.

11. The time response measurement method according to claim 10,
wherein in the obtaining, the time response of the sample is obtained based on a comparison between the second temporal waveform and a difference between the third temporal waveform and the first temporal waveform.

12. The time response measurement method according to claim 10,
wherein in the measuring the first temporal waveform, the measuring the second temporal waveform, and the measuring the third temporal waveform, the first pulsed light, the second pulsed light, and the third pulsed light are generated using a spatial light modulator that simultaneously performs phase modulation and intensity modulation of input pulsed light.

13. The time response measurement method according to claim 10,
wherein a pulse width of a component of the wavelength of the pump light included in the third pulsed light is set to be smaller than a pulse width of a component of the wavelength of the probe light included in the third pulsed light.

14. The time response measurement method according to claim 10,
wherein the measuring the third temporal waveform is performed after the measuring the first temporal waveform and the measuring the second temporal waveform.

* * * * *